(12) United States Patent
Yokomakura et al.

(10) Patent No.: US 8,699,319 B2
(45) Date of Patent: Apr. 15, 2014

(54) BASE STATION DEVICE, RECEPTION DEVICE, WIRELESS COMMUNICATION SYSTEM, AND WIRELESS COMMUNICATION METHOD

(75) Inventors: Kazunari Yokomakura, Osaka (JP); Yasuhiro Hamaguchi, Osaka (JP); Shimpei To, Osaka (JP); Minoru Kubota, Osaka (JP); Hideo Namba, Osaka (JP); Seiichi Sampei, Ikeda (JP); Shinichi Miyamoto, Takatsuki (JP); Shinsuke Ibi, Toyonaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 594 days.

(21) Appl. No.: 12/673,340

(22) PCT Filed: Aug. 13, 2008

(86) PCT No.: PCT/JP2008/064545
§ 371 (c)(1),
(2), (4) Date: Feb. 12, 2010

(87) PCT Pub. No.: WO2009/022709
PCT Pub. Date: Feb. 19, 2009

(65) Prior Publication Data
US 2011/0212743 A1    Sep. 1, 2011

(30) Foreign Application Priority Data

Aug. 13, 2007  (JP) .................................. 2007-210936
Aug. 13, 2007  (JP) .................................. 2007-210937

(51) Int. Cl.
*H04J 11/00* (2006.01)
(52) U.S. Cl.
USPC ................ 370/210; 455/45; 455/59; 455/206

(58) Field of Classification Search
USPC ............ 455/522, 68–70, 126, 127.1, 45, 229, 455/509, 59, 206; 375/45, 141–148; 370/210, 480, 356, 362
See application file for complete search history.

(56) References Cited

U.S. PATENT DOCUMENTS 7,548,356 B2 *   6/2009  Han et al. ....................... 358/497
7,701,839 B2 *   4/2010  Nangia et al. .................. 370/208

(Continued)

FOREIGN PATENT DOCUMENTS

EP     1 775 901 A1     4/2007
JP    2006-520109 A     8/2006

(Continued)

OTHER PUBLICATIONS

Korean Office Action dated Mar. 30, 2011 for Application No. 10-2010-7003181.

(Continued)

*Primary Examiner* — Dominic E Rego
(74) *Attorney, Agent, or Firm* — Birch, Stewart, Kolasch & Birch, LLP

(57) ABSTRACT

A base station device may include, but is not limited to: a mapping unit; and at least one reception antenna. The mapping unit is configured to assign a plurality of first subcarriers to a first communication device, and assign a part of the plurality of first subcarriers to at least one other communication device. The at least one reception antenna is configured to receive from one of the first communication device and the at least one other communication device, a plurality of frequency signals allocated to the plurality of first subcarriers. Each of the plurality of frequency signals is converted from coded transmission data of the one of the first communication device and the at least one other communication device.

20 Claims, 42 Drawing Sheets

(56) References Cited

U.S. PATENT DOCUMENTS

| | | | |
|---|---|---|---|
| 7,706,350 B2* | 4/2010 | Gorokhov et al. | 370/344 |
| 7,796,695 B2* | 9/2010 | Lee et al. | 375/260 |
| 7,848,356 B2* | 12/2010 | Melis et al. | 370/480 |
| 8,134,914 B2* | 3/2012 | Kim et al. | 370/208 |
| 2003/0128658 A1 | 7/2003 | Walton et al. | |
| 2004/0174812 A1* | 9/2004 | Murakami et al. | 370/215 |
| 2005/0002369 A1* | 1/2005 | Ro et al. | 370/342 |
| 2005/0207385 A1* | 9/2005 | Gorokhov et al. | 370/344 |
| 2005/0232183 A1* | 10/2005 | Sartori et al. | 370/319 |
| 2006/0171354 A1* | 8/2006 | Tee et al. | 370/329 |
| 2006/0246916 A1* | 11/2006 | Cheng et al. | 455/450 |
| 2006/0250935 A1* | 11/2006 | Hamamoto et al. | 370/203 |
| 2006/0256839 A1* | 11/2006 | Tsai et al. | 375/131 |
| 2007/0060161 A1* | 3/2007 | Chindapol et al. | 455/450 |
| 2007/0082633 A1* | 4/2007 | Carbone et al. | 455/166.2 |
| 2007/0117529 A1* | 5/2007 | Oe | 455/296 |
| 2007/0223603 A1* | 9/2007 | Honda et al. | 375/260 |
| 2007/0258394 A1* | 11/2007 | Hamaguchi | 370/310 |
| 2007/0263738 A1* | 11/2007 | Jitsukawa et al. | 375/260 |
| 2007/0281700 A1* | 12/2007 | Deguchi et al. | 455/436 |
| 2008/0031376 A1* | 2/2008 | Ban | 375/271 |
| 2008/0101214 A1* | 5/2008 | Jitsukawa et al. | 370/208 |
| 2009/0103483 A1* | 4/2009 | Higuchi et al. | 370/329 |
| 2009/0202010 A1* | 8/2009 | Fu et al. | 375/260 |
| 2009/0279486 A1* | 11/2009 | Kishigami et al. | 370/329 |
| 2010/0157937 A1* | 6/2010 | Muharemovic et al. | 370/330 |
| 2010/0159940 A1* | 6/2010 | Gorokhov et al. | 455/450 |
| 2010/0202562 A1* | 8/2010 | Murakami et al. | 375/295 |
| 2010/0226334 A1* | 9/2010 | Ma et al. | 370/329 |
| 2010/0317305 A1* | 12/2010 | Sahlin | 455/181.1 |
| 2011/0194502 A1* | 8/2011 | Sung et al. | 370/329 |

FOREIGN PATENT DOCUMENTS

| | | |
|---|---|---|
| WO | WO-2006/011524 A1 | 2/2006 |
| WO | WO-2006/055718 A2 | 5/2006 |
| WO | WO 2006/132835 A2 | 12/2006 |

OTHER PUBLICATIONS

Keigo Mashima et al., "A Study on Broadband Single Carrier Transmission Technique using Dynamic Spectrum Control", The Institute of Electronics, Information and Communication Engineers, RCS 2006, Jan. 2007, pp. 1-6.

Michael Tuchler et al., "Linear time and frequency domain Turbo equalization", Proc. VTC, Oct. 2001, pp. 2773-2777.

Hokuto Itoh et al., "A Study on Dynamic Spectrum Control based Co-Channel Interference Suppression Technique for Multi-User MIMO Systems", Proceedings of the IEICE General Conference in 2006, Mar. 2007, pp. 444.

Kazunari Yokomakura et al.; "A Spectrum-Overlapped Resource Management using Dynamic Spectrum Control", Mar. 5, 2008 vol. 1, p. 437.

Keigo Mashima et al., "A Study on Broadband Single Carrier Transmission Technique using Dynamic Spectrum Control", Jan. 19, 2007, vol. 106, No. 477, p. 97-102.

Seiichi Sampei et al.; "Flexible Spectrum Control and Receiver Performance Improvement Technologies for B3G Wireless Systems", Personal, Indoor and Mobile Radio Communications, 2006 the 17th Annual IEEE International Symposium on, Sep. 14, 2006.

* cited by examiner

FIG. 4
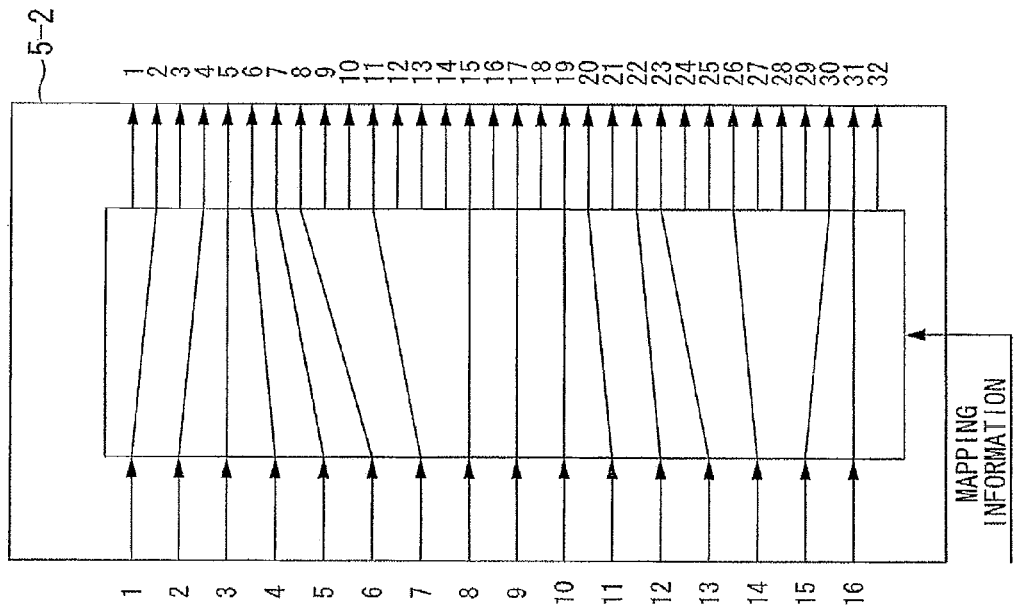
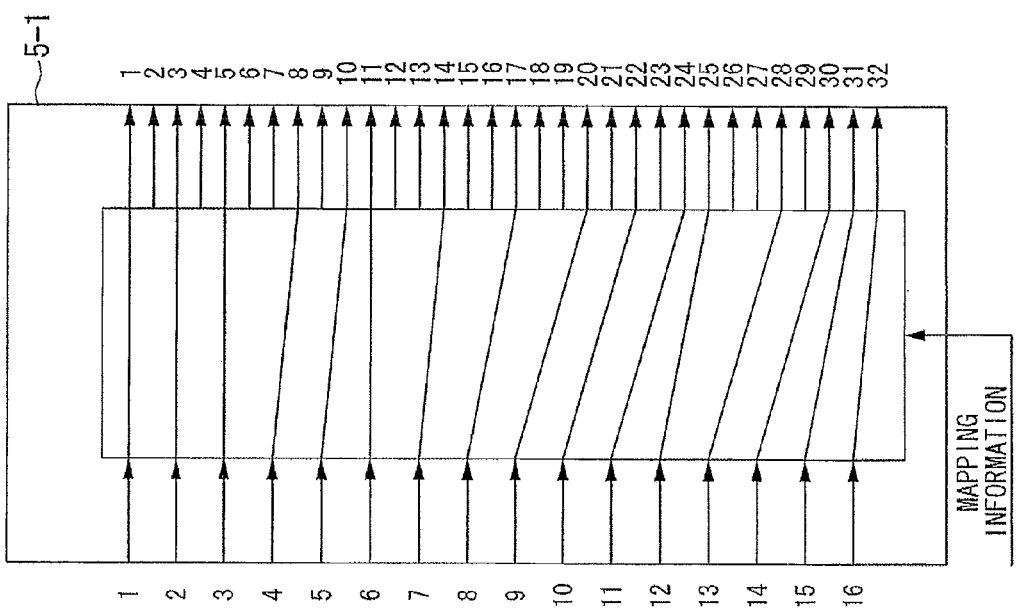

OPERATION SYSTEM 1
(SIGNAL EQUALIZING-AND-DEMULTIPLEXING UNIT 201-1)

OPERATION SYSTEM 2
(SIGNAL EQUALIZING-AND-DEMULTIPLEXING UNIT 201-2)

US 8,699,319 B2

BASE STATION DEVICE, RECEPTION DEVICE, WIRELESS COMMUNICATION SYSTEM, AND WIRELESS COMMUNICATION METHOD

TECHNICAL FIELD

The present invention relates to a base station device, a reception device, a wireless communication system, and a wireless communication method.

Priority is claimed on Japanese Patent Application Nos. 2007-210936 and 2007-210937, both filed Aug. 13, 2007, the content of which are incorporated herein by reference.

BACKGROUND ART

Recently, next-generation mobile communication systems have been actively studied. As a method for enhancing the frequency utilization efficiency of a system, a single-frequency reuse cellular system has been proposed in which each cell uses the same frequency band so that each cell can use the entire band allocated to the system.

OFDMA (Orthogonal Frequency Division Multiple Access) is a front-runner in a downlink (communication from a base station device to a mobile station device). OFDMA is a communication system in which information data are modulated by use of different modulation schemes, such as 64 QAM (64-ary Quadrature Amplitude Modulation) and BPSK (Binary Phase Shift Keying), according to reception conditions to generate an OFDM signal, and radio resources defined by time-and-frequency axes are flexibly allocated to multiple mobile station devices.

Since an OFDM signal is used in this case, a PAPR (Peak to Average Power Ratio) becomes greatly high in some cases. The high peak power is not a severe problem for downlink communication having a relatively-high transmission-power amplifying function. However, the high peak power is a fatal problem for uplink communication (from the mobile station device to the base station device) having a relatively-low transmission-power amplifying function.

For this reason, a single-carrier-based communication scheme with a low PAPR is suitable to the uplink (communication from the mobile station device to the base station device).

However, the use of the single-carrier scheme causes a problem that flexible resource allocation using time-and-frequency axes cannot be performed such as in the case of OFDM. To solve the problem, SC-ASA (Single Carrier-Adaptive Spectrum Allocation), which is also called DFT-S-OFDM (Discrete Fourier Transform-Spread OFDM), has been proposed (see, for example, Non-Patent Document 1).

Such a communication scheme uses the same scheme as the single-carrier communication scheme, resulting in a lower PAPR. Additionally, a cyclic prefix is inserted as in the case of OFDM signals, enabling data processing without inter-block interference (in this description, an interval at which a cyclic prefix is inserted, i.e., data processing unit by which DFT is performed, is called a DFT-S-OFDM symbol). Further, frequency waves are generated once by use of DFT, thereby simplifying resource control per subcarrier.

FIG. 40 illustrates a configuration of a transmission device when MIMO (Multi-Input Multi-Output) transmission using SC-ASA is performed. FIG. 40 may be regarded as illustrating one transmission device including multiple transmission systems or as illustrating different transmission devices. This respect is explained hereinafter. In FIG. 41A, one base station wirelessly communicates with two mobile stations. Each of the base station and the mobile stations includes two antennas. If the configuration of the transmission device shown in FIG. 40 is regarded as one transmission device including multiple transmission systems, FIG. 40 is regarded as illustrating a case of single-user MIMO shown in FIG. 41C. If the configuration of the transmission device is regarded as different transmission devices, FIG. 40 is regarded as illustrating a case of multi-user MIMO shown in FIG. 41B. Subcarriers to be used are denoted as white blocks. Subcarriers corresponding to the numbers, which are not denoted as white blocks, are ones not selected in SC-ASA.

Regarding each transmission system shown in FIG. 40, transmission data 1 and 2 are encoded by encoders 1000 and 1001, and then modulated by modulators 1002 and 1003, respectively. The modulated signals are converted into parallel signals by S/P (Serial/Parallel) converters 1004 and 1005, and then converted into frequency-domain signals by DFT units 1006 and 1007, respectively. Spectral mapping units 1008 and 1009 perform mapping such that the transmission data 1 and 2 use the same frequency subcarriers as shown in FIGS. 41B and 41C. Subcarriers having high received SNR or SINR are used in the case of SC-ASA. However, MIMO transmission causes signals transmitted from the two transmission systems to interfere with each other on the receiving side. For this reason, common subcarriers having good conditions have to be selected for the transmission antennas (users) in consideration of the degree of the interference and all channels among the two transmission systems and the two reception systems.

Then, the mapped frequency-domain signals are converted into time-domain signals by IDFT units 1010 and 1011, and then converted into serial signals by P/S (parallel/signal) converters 1012 and 1013. Then, cyclic prefixes are inserted by CP inserters 1014 and 1015, and then converted into analog signals by D/A converters 1016 and 1017. Finally, the analog signals are upconverted into radio-frequency signals by radio units 1018 and 1019, and then transmitted from the transmission antennas 1020 and 1021.

FIG. 42 is a schematic block diagram illustrating a configuration of a reception device receiving signals transmitted by the MIMO systems. Since the reception device shown in FIG. 42 includes a canceller, the reception device having such a configuration can achieve better reception characteristics. The device shown in FIG. 42 includes: antennas 1100 and 1101; RF units 1102 and 1103; A/D converters 1104 and 1105; CP removers 1106 and 1107; S/P converters 1108, 1109, 1133, and 1134; DFT units 1110, 1111, 1116, 1117, 1135, and 1136; channel estimators 1112 and 1113; a canceller 1114; a signal equalizing-and-demultiplexing unit 1115; a spectral demapping unit 1118; IDFT units 1119, 1120, 1138, and 1139; P/S converters 1121 and 1122; demodulators 1123 and 1124; decoders 1125 and 1126; repetition controllers 1127 and 1128; determining units 1129 and 1130; replica generators 1131 and 1132; a spectral mapping unit 1137; and a channel multiplier 1140.

The signals transmitted from the transmission device shown in FIG. 40 are received by the antennas 1100 and 1101 of the reception device, downconverted from radio-frequency signals by the RF units 1102 and 1103, and then converted into digital signals by the A/D converters 1104 and 1105. Then, the cyclic prefixes CP (GI) added on the transmitting side are removed by the CP removers 1106 and 1107. Then, the signals with the cyclic prefixes removed are converted into parallel signals by the S/P converters 1108 and 1109, and then converted into frequency-domain signals by being subjected to DFT performed by the DFT units 1110 and 1111. Channel estimation between each transmission antenna and each reception antenna is performed using a known signal added on the transmitting side as a signal for channel estimation, the known signal being included in the converted frequency-domain signal. In this case, channel estimation values for the number of subcarriers are calculated with respect to 4 channels=the number of transmission antennas×the number of reception antennas.

The data signals subjected to DFT and then converted into the frequency-domain signals are input to the canceller 1114. The canceller 1114 subtracts, from the received signals, replicas of received signals, which are generated based on the reliability of demodulated data. If a perfect replica (transmitted signal) is generated, an output of the canceller 1114 includes only noise elements. This calculation can be expressed as an expression (100) where R denotes a reception-data vector received by the two antennas, Ξ denotes a channel matrix, and S' denotes a replica of a transmission-data vector (generated by a replica generator to a spectral mapping unit as will be explained later).

$$Q = R - \Xi S' \qquad (100)$$

Q denotes a vector indicating an output of the canceller 1114 at the time of second-or-more repeated operation (i.e., a residual after cancelling). R, Ξ, S' are shown in the following expressions (101) to (103), where a figure in a parenthesis denotes the subcarrier number, and an index denotes the transmission-and-reception antenna number. Two indexes of Ξ denote a combination of reception-and-transmission antennas. For example, $\Xi_{21}$ denotes a channel from the transmission antenna 1 to the reception antenna 2. These expressions may be used for both single-user MIMO and multi-user MIMO.

$$R = \begin{bmatrix} R_1(1) \\ R_1(2) \\ R_1(3) \\ R_1(4) \\ R_2(1) \\ R_2(2) \\ R_2(3) \\ R_2(4) \end{bmatrix} \qquad (101)$$

$$\Xi = \begin{bmatrix} \Xi_{11}(1) & 0 & 0 & 0 & \Xi_{12}(1) & 0 & 0 & 0 \\ 0 & \Xi_{11}(2) & 0 & 0 & 0 & \Xi_{12}(2) & 0 & 0 \\ 0 & 0 & 0 & 0 & 0 & 0 & 0 & 0 \\ 0 & 0 & 0 & \Xi_{11}(4) & 0 & 0 & 0 & \Xi_{12}(4) \\ \Xi_{21}(1) & 0 & 0 & 0 & \Xi_{22}(1) & 0 & 0 & 0 \\ 0 & \Xi_{21}(2) & 0 & 0 & 0 & \Xi_{22}(2) & 0 & 0 \\ 0 & 0 & 0 & 0 & 0 & 0 & 0 & 0 \\ 0 & 0 & 0 & \Xi_{21}(4) & 0 & 0 & 0 & \Xi_{22}(4) \end{bmatrix} \qquad (102)$$

$$S' = \begin{bmatrix} S'_1(1) \\ S'_1(2) \\ 0 \\ S'_1(4) \\ S'_2(1) \\ S'_2(2) \\ 0 \\ S'_2(4) \end{bmatrix} \qquad (103)$$

The reason that replicas (ΞS') of all signals including desired signals to be extracted are cancelled is that the signal equalizing-and-demultiplexing unit 1115 that will be explained later performs an inverse matrix calculation, and therefore the inverse matrix calculation has to be performed a number of times corresponding to the number of desired signals included in a block if cancelling and equalization are repeated without cancelling the desired signals. On the other hand, if the residual Q after the canceling of all replicas is input, the residual can be equally treated in the block, and therefore all weights can be calculated with one inverse matrix calculation with respect to the block. For this reason, the replica is independently input and reconfigured to decrease the amount of the inverse calculation. However, a replica of the firstly received signal cannot be generated. In this case, the reception-data vector (R) passes through the canceller 1115 as it is.

The signal output from the canceller 1114 is input to the signal equalizing-and-demultiplexing unit 1115, and then subjected to equalization using frequency-domain signals. When the repeated operation is performed, the signal equalizing-and-demultiplexing unit 1115 performs, with use of an expression (104), MMSE equalization on each signal generated by a replica of the received signal for each data vector transmitted from the antennas 1 and 2 shown in FIG. 43 being added to the output (Q) of the canceller. FIG. 43 illustrates, as an example of subcarrier selection, a case where subcarriers 1, 2, and 4 are transmitted from the antennas 1 and 2.

$$z = (1 + \gamma_{Tn}\delta_{Tn})^{-1}[\gamma_{Tn}s'_{Tn} + + F^H\Psi_{Tn}Q] \qquad (104)$$

Tn (n=1, 2 in the above case) denotes a transmission antenna. $\gamma_{Tn}$ and $\delta_{Tn}$ denote real numbers used when tap coefficients are calculated. Similarly, $\Psi_{Tn}$ denotes a complex square matrix having a size of the DFT block length, which is used when tap coefficients are calculated. $s'_{Tn}$ denotes a replica of the signal transmitted from the antenna Tn. Q denotes a result (residual) of subtracting replicas of all the received signals from the received signals. Since a replica of a received signal cannot be generated ($s'_{Tn}$ is a zero vector) in the first operation, the signal R output from the canceller 1114 without being subjected to subtraction is subjected to equalization. When calculating $\Psi_{Tn}$ and the like shown in the expression (104), channel matrices $\Xi_{T1}$ and $\Xi_{T2}$ corresponding to the transmission-data vectors 1 and 2 are used in addition to the channel matrix shown in the expression (102). $\Xi_{T1}$ and $\Xi_{T2}$ are channel matrices for respective transmission antennas, which are used for equalizing the transmission-data vectors 1 and 2.

$$\Xi_{T1} = \begin{bmatrix} \Xi_{11}(1) & 0 & 0 & 0 \\ 0 & \Xi_{11}(2) & 0 & 0 \\ 0 & 0 & 0 & 0 \\ 0 & 0 & 0 & \Xi_{11}(4) \\ \Xi_{21}(1) & 0 & 0 & 0 \\ 0 & \Xi_{21}(2) & 0 & 0 \\ 0 & 0 & 0 & 0 \\ 0 & 0 & 0 & \Xi_{21}(4) \end{bmatrix} \qquad (105)$$

$$\Xi_{T2} = \begin{bmatrix} \Xi_{12}(1) & 0 & 0 & 0 \\ 0 & \Xi_{12}(2) & 0 & 0 \\ 0 & 0 & 0 & 0 \\ 0 & 0 & 0 & \Xi_{12}(4) \\ \Xi_{22}(1) & 0 & 0 & 0 \\ 0 & \Xi_{22}(2) & 0 & 0 \\ 0 & 0 & 0 & 0 \\ 0 & 0 & 0 & \Xi_{22}(4) \end{bmatrix} \qquad (106)$$

By the equalization with use of the expression (104), the equalized time-domain signals are output from the signal equalizing-and-demultiplexing unit 1115 for each transmission data (see, for example, Non-Patent Document 3).

The signals that have been transmitted from the respective transmission antennas and equalized for the respective signals are input to the DFT units 1116 and 1117, converted into frequency-domain signals by the DFT units 1116 and 1117, and then input to the spectral demapping unit 1118. The spectral demapping unit 1118 performs demapping common to spectra transmitted from the antennas 1 and 2 based on spectral mapping information. Then, the demapped signals are converted into time-domain signals by the IDFT units 1119 and 1120, converted into serial signals by the P/S converters 1121 and 1122, and then subjected to demodulation and decoding.

The demodulators 1123 and 1124 calculate LLRs (Log Likelihood Ratios) indicative of the reliability of the reception data subjected to error coding. The decoders 1125 and 1126 perform error correction decoding on the LLRs to update the LLRs. The repetition controllers 1127 and 1128 receiving the LLRs determine whether or not the repeated operation has been performed the predetermined number of times. If the repeated operation has been performed the predetermined number of times, the repetition controllers 1127 and 1128 output the LLRs to the determining units 1129 and 1130. On the other hand, if the repeated operation has not yet been performed the predetermined number of times, the repetition controllers 1127 and 1128 output the LLRs to the replica generators 1131 and 1132, and proceeds to a process of generating replicas of received signals. Assuming that a CRC (Cyclic Redundancy Check) is used, the repeated operation may end if no error is detected.

The replica generators 1131 and 1132 generate signal replicas (replicas of transmitted signals) corresponding to the respective LLRs. The generated replicas are passed through the S/P converters 1133 and 1134, and then converted by the DFT units 1135 and 1136 into frequency-domain replicas of signals transmitted from the respective antennas.

Then, the frequency-domain signal replicas generated in this manner are mapped by the spectral mapping unit 1137 based on mapping information received from a spectrum determining unit (not shown) in a similar manner as done on the transmitting side. Then, the replicas S' subjected to the spectral mapping are input to the channel multiplier 1140, and then input to the signal equalizing-and-demultiplexing unit 1115 through the IDFT units 1138 and 1139. The signal equalizing-and-demultiplexing unit 1115 receiving the replicas S' subjected to the spectral mapping reconfigures the received signals of the transmission-data vectors 1 and 2 using the replicas as explained above, and uses the reconfigured received signals for equalizing the respective transmission-data vectors. To generate replicas of the received signals to be used for subtraction from the received signals performed by the canceller 1114, the channel multiplier 1140 multiplies the replicas subjected to the spectral mapping by the channel matrix ($\Xi$ shown in the expression (102)). Then, the replicas ($\Xi$S') of the received signals, which are output from the channel multiplier 1140, are input to the canceller 1114, and then subtraction shown in the expression (100) is performed as explained above.

The reception device shown in FIG. 42 repeats a series of operations, such as the cancelling of replicas, the equalization, the spectrum demapping, the decoding, and the generation of replicas, and thereby gradually increases the reliability of the decoded bits. After the series of operations are performed the predetermined number of times, the determining units 207 and 208 perform hard determination on bits, and then the transmission data are reproduced as decoded data.

As a system for multiplexing transmission data pieces transmitted from multiple transmission stations with use of SC-ASA, an FDMA (Frequency Division Multiple Access)-based system has been also proposed in which the point number of IDFT (Inverse Discrete Fourier Transform) is set by the transmission station to be greater than that of DFT, and subcarriers added null data are used by another transmission station (see, for example, Non-Patent Document 3).

FIGS. 44A and 44B are schematic block diagrams illustrating configurations of a transmission station device and a reception station device when user multiplexing is performed by two conventional transmission stations with use of SC-ASA. Regarding the transmission device shown in FIG. 44A, two pieces of transmission data 1 and 2 are encoded by the encoders A1000-1 and A1000-2, and the encoded transmission data pieces are modulated by modulators A1001-1 and A1001-2, respectively. The signals modulated by the modulators A1001-1 and A1001-2 are converted into parallel signals by the S/P converters A1002-1 and A1002-2, and then converted into frequency-domain signals by DFT units A1003-1 and A1003-2. Then, the frequency-domain signals are mapped by the spectral mapping units A1004-1 and A1004-2 so that the transmission data 1 and 2 are not transmitted using the same frequency subcarriers. In this case, the frequency-domain signals are mapped onto subcarriers that have good SNR (Signal to Noise Ratio) or SNIR (Signal to Noise Interference Ratio) and have frequencies not used by other users.

The mapped frequency-domain transmitted signals are converted into time-domain signals by IDFT units A1005-1 and A1005-2, and then converted into serial signals by the P/S converters A1006-1 and A1006-2. Then, cyclic prefixes are inserted into the serial signals by the CP (Cyclic Prefix) inserter A1007-1 and A1007-2. Then, the serial signals are converted into analog signals by the D/A converters A1008-1 and A1008-2. Finally, the analog signals are upconverted into radio frequency signals by radio units A1009-1 and A1009-2, and transmitted from transmission antennas 1010-1 and 1010-2.

Regarding the reception device shown in FIG. 44B, a received signal generated by multiplexing two signals simultaneously transmitted is received by a reception antenna 1100. Then, the received signal is downconverted by a radio unit A1111. The downconverted received signal is converted into a digital signal by an A/D converter A1101. Then, a cyclic prefix is removed from the digital signal by a CP (Cyclic Prefix) remover A1102. Then, the digital signal from which the cyclic prefix has been removed is converted into parallel signals by the S/P converter A1103. The parallel digital signals are converted into frequency-domain signals by a DFT unit A1104. Then, subcarriers of the respective frequency-domain signals are reversely allocated, and thereby frequency-domain signals transmitted from the respective transmission stations are demultiplexed. Then, the frequency-domain signals are independently equalized for the respective pieces of transmission data by signal equalizers A1106-1 and A1106-2, and then converted into time-domain signals by IDFT units A1107-1 and A1107-2. Then, the time-domain signals are converted into serial signals by P/S converters A1108-1 and A1108-2, and then demodulated by demodulators A1109-1 and A1109-2. Thus, decoded data 1 and 2 transmitted from the respective transmission stations are obtained from decoders A1110-1 and 1110-2.

As an equalization method performed by the signal equalizer A1106, MMSE (Minimum Mean Square Error)-based equalization is used. Generally, a tap minimizing an evaluation function J shown in an expression (107) is calculated in MMSE equalization.

$$J=E[|W^H r-s|^2] \quad (107)$$

In an expression (107), E[x] denotes a mean value of x. W denotes a complex tap matrix including column vectors each being an optimal tap vector for each symbol included in DFT-S-OFDM symbols. r denotes a complex-time-domain received signal vector. s denotes a time-domain transmitted signal vector. $A^H$ denotes a Hermitian transpose of a matrix A. In this case, an optimal tap coefficient W is called a Wiener solution expressed by an expression (108).

$$W=H(HH^H+\sigma^2 I)^{-1} \quad (108)$$

In the expression (108), H denotes a time-domain channel matrix. $\sigma^2$ denotes noise variance. I denotes a unit matrix. Particularly when a frequency-domain signal operation is performed, a matrix having diagonal elements identical to frequency responses calculated by use of Fourier transform from channel impulse responses may be used as a channel matrix. Therefore, when frequency-domain received signals are used, the tap coefficients expressed by the expression (108) can be transformed as the following expression (109) where $\Xi$ denotes channel frequency responses.

$$W=F^H\Xi(\Xi\Xi^H+\sigma^2 I)^{-1}F \quad (109)$$

In the expression (109), F denotes a matrix for performing DFT and $F^H$ denotes a matrix for performing inverse DFT. When a time-domain received signal r is multiplied by the tap matrix, the equalized received signal z can be expressed as an expression (110).

$$z=F^H\Xi(\Xi\Xi^H+\sigma^2 I)^{-1}Fr=F^H\Xi(\Xi\Xi^H+\sigma^2 I)^{-1}R \quad (110)$$

In the above expression, R=Fr, i.e., R denotes the received signal r converted by DFT into a frequency-domain signal. According to the expression (110), when a normal received signal is input and equalized in the frequency domain, the received signal is converted by DFT, multiplied by a Hermitian transpose of a matrix obtained by removing both $F^H$ and F of the expression (109), and then converted by IDFT into a time-domain signal again. Accordingly, a normal MMSE filter receives a frequency-domain received signal and a channel frequency response, and outputs a signal equalized in the frequency domain.

On the other hand, when a reception device is configured to include a canceller, such as SC/MMSE (Soft Canceller followed by MMSE), which performs repeated operation, interference waves are cancelled from received signals by use of replicas of signals generated based on the reliability of bits received from the decoder, and thereby the precision of signals input to the equalizer. Accordingly, signals input to the equalizer differ for each repletion operation. For this reason, the term corresponding to the received signal r of the evaluation function expressed by the expression (107) becomes one generated by signals other than desired signals being cancelled. Therefore, the equalized signal can be expressed as an expression (111).

$$z=(1+\gamma\delta)^{-1}[\gamma s_{rep}(k)+F^H\Psi R_{rest}] \quad (111)$$

In the expression (111), $R_{rest}$ denotes a residual that remains without being cancelled and is generated by subtracting, from actual time-domain received signals, replicas of the received signals generated by multiplying replicas of the time-domain signals by channel characteristics. $s_{rep}(k)$ denotes a replica of a transmitted signal for the k-th sample. $\gamma$ and $\delta$ are real numbers used when tap coefficients are calculated. Similarly, $\Psi$ denotes a complex square matrix having the size of the DFT-S-OFDM symbol length, which is used when tap coefficients are calculated. These are calculated by use of the frequency-domain channel characteristics and the replicas of frequency-domain signals (see, for example, Non-Patent Document 2). Since a replica is not input in the first operation in the expression (111) (i.e., $s_{rep}(k)=0$), this case is a case of the optimal tap in the expression (107), and therefore the expression (111) becomes identical to the expression (109).

Accordingly, in the case of SC/MMSE equalization, a frequency-domain residual is input as an input signal, a replica of a time-domain signal and frequency-domain channel characteristics are input, and then a time-domain signal is output. As shown in the expression (111), the operation of canceling elements other than desired elements is performed by firstly calculating the residual $R_{rest}$, and then reconfiguring the desired elements by use of the replicas of the transmitted signals and the channel characteristics. Consequently, the desired elements can be uniquely expressed among the DFT-S-OFDM symbols. Further, the same residual $R_{rest}$ can be used for the DFT-S-OFDM symbols, thereby enabling a reduction in the amount of calculation including inverse matrix calculation.

[Non-Patent Document 1] "A Study on Broadband Single Carrier Transmission Technique using Dynamic Spectrum Control," RCS 2006, January 2007.

[Non-Patent Document 2] M. Tuchler and J. Hagenauer, "Linear time and frequency domain turbo equalization," Proc. VTC, pp. 2773-2777, Rhodes, Greece, October 2001.

[Non-Patent Document 3] "A Study on Dynamic Spectrum Control based Co-Channel Interference Suppression Technique for Multi-User MIMO Systems," Proceedings of the IEICE General Conference in 2006, March, 2007.

DISCLOSURE OF THE INVENTION

Problems to be Solved by the Invention

Regarding the conventional multi-user or single-user MIMO, as explained above, transmission has been performed from multiple antennas using selected frequencies. In this case, control has been performed such that all channels between multiple transmission systems and multiple reception systems are considered, and subcarriers having relatively good channel conditions among the considered channels are used (or users are allocated). Specifically, in a case of 2×2 MIMO transmission (which may be any one of multi-user and single-user MIMO) including transmission antennas Tx1 and Tx2 and reception antennas Rx1 and Rx2, all of four channels H11, H21, H12, and H22 are considered, subcarriers having relatively good channel conditions are selected for both transmission antennas Tx1 and Tx2, and then different data is simultaneously transmitted from the transmission antennas Tx1 and Tx2. This is because signals transmitted from multiple transmission antennas interfere with one another in the case of MIMO transmission, and therefore all channels have to be considered to select subcarriers having good conditions.

When SC-ASA is adapted to the MIMO transmission, however, a selection by such a control does not achieve the highest diversity effect, thereby causing a problem that excellent frequency utilization efficiency cannot be achieved. In other words, SC-ASA is generally a scheme in which optimal subcarriers are selected for each transmission device (transmission antenna), and then the selected subcarriers are transmitted, thereby achieving a high diversity effect and therefore enhancing the frequency utilization efficiency. When SC-ASA is adapted to the conventional MIMO transmission (multi-user or single user MIMO) as explained above, optimal subcarriers are not selected independently for each transmission antenna, thereby causing a problem that excellent frequency utilization efficiency cannot be achieved.

Conventionally, when transmission is performed by multiple transmission devices using SC-ASA, subcarriers are allocated to the transmission devices so that the same frequency is not used by two or more transmission devices. For this reason, even if subcarriers have good received SNR or SINR for one transmission device, and if the subcarriers have been already allocated to another transmission device, the former transmission device cannot use the subcarriers. Thus, even if subcarriers having good received SNR or SINR are included in a transmittable band, and if the subcarriers are used by another device, the subcarriers cannot be used, thereby causing a decrease in the frequency utilization efficiency and causing a problem that excellent frequency utilization efficiency cannot be achieved.

A problem to be solved is that excellent frequency utilization efficiency has to be achieved even when SC-ASA is adapted to transmission from multiple transmission devices or MIMO transmission.

Means for Solving the Problems (1) According to one embodiment, a base station device may include, but is not limited to: a mapping unit; and at least one reception antenna. The mapping unit is configured to assign a plurality of first subcarriers to a first communication device, and assign a part of the plurality of first subcarriers to at least one other communication device. The at least one reception antenna is configured to receive from one of the first communication device and the at least one other communication device, a plurality of frequency signals allocated to the plurality of first subcarriers. Each of the plurality of frequency signals is converted from coded transmission data of the one of the first communication device and the at least one other communication device.

(2) Regarding the above base station device, the at least one other communication device may include a second communication device. The mapping unit may be configured to assign a plurality of second subcarriers including at least one of the plurality of first subcarriers to the second communication device. The number of the plurality of second subcarriers may differ from the number of the plurality of first subcarriers.

(3) Regarding the above base station device, the number of the at least one reception antenna may be smaller than the total number of the first communication device and the at least one other communication device.

(4) According to another embodiment a base station device may include, but is not limited to: a mapping unit; and at least one reception antenna. The mapping unit is configured to assign a plurality of first subcarriers to a first transmission antenna of a plurality of transmission antennas of a first communication device. The mapping unit is configured to assign a plurality of second subcarriers to a second transmission antenna of the plurality of transmission antennas. At least one of the plurality of second subcarriers overlaps in frequency a part of the plurality of first subcarriers. The at least one reception antenna is configured to receive a reception signal including a plurality of first frequency signals and a plurality of second frequency signals transmitted from the first and second transmission antennas, respectively. Each of the plurality of first frequency signals is converted from first coded transmission data of the first communication device. The plurality of first frequency signals are allocated to the plurality of first subcarriers. Each of the plurality of second frequency signals is converted from second coded transmission data of the first communication device. The plurality of second frequency signals are allocated to the plurality of second subcarriers.

(5) Regarding the above base station device, the mapping unit may be configured to refer to a channel capacity of each of a plurality of third subcarriers including the plurality of first subcarriers, in order to assign the plurality of first subcarriers to the first transmission antenna.

(6) Regarding the above base station device, the channel capacity may be given by:

$$C_m(k) = \log_2\left(1 + \frac{E_S}{N_T}\hat{1}_m^H(k)\hat{1}_m(k)\sum_m^{-1}(k)\right).$$

m is a number allocated to each of the plurality of transmission antennas, k is a number allocated to each of the plurality of first subcarriers. $N_T$ is the number of the plurality of transmission antennas. $E_s$ is a transmission energy of the communication device. $\zeta_m(k)$ is a channel vector for a first subcarrier allocated with k. The first subcarrier is transmitted from a transmission antenna allocated with m. $\Sigma_m(k)$ is an interference noise power for the first subcarrier.

(7) Regarding the above base station device, the mapping unit may be configured to refer to a ratio of received signal power to an interference-and-noise power for at least one of a plurality of third subcarriers including the plurality of first subcarriers, in order to assign the plurality of first subcarriers to the first transmission antenna.

(8) According to another embodiment, a reception device may include, but is not limited to: a receiver; a canceller; and an equalizing unit. The receiver is configured to receive a reception signal including a plurality of first frequency signals and a plurality of second frequency signals transmitted from first and second communication devices, respectively. Each of the plurality of first frequency signals is converted from first coded transmission data of the first communication device. The plurality of first frequency signals are allocated to the plurality of first subcarriers. Each of the plurality of second frequency signals is converted from second coded transmission data of the second communication device. The plurality of second frequency signals are allocated to the plurality of second subcarriers. The canceller is configured to cancel a predetermined signal from the reception signal if at least one of the plurality of first subcarriers overlaps in frequency the plurality of second subcarriers. The equalizing unit is configured to perform a first equalization process on the reception signal from which the predetermined signal is cancelled.

(9) Regarding the above reception device, the receiver may include at least one reception antenna configured to receive the reception signal. The canceller may be configured to cancel at least one of the plurality of first frequency signals, if the number of the at least one reception antenna is smaller than the number of transmission streams including the plurality of first frequency signals and the plurality of second frequency signals.

(10) Regarding the above reception device, the canceller may cancel the at least one of the plurality of first frequency signals, based on characteristics of the plurality of first frequency signals and the plurality of second frequency signals.

(11) Regarding the above reception device, the equalizing unit may be configured to perform the first equalization process to generate first and second equalized signals associated with the first and second signals, respectively. The above reception device may further include a demodulating unit configured to extract first and second reliabilities of first and second coded transmission data from the first and second equalized signals, respectively. In this case, the equalizing unit may be configured to use the first and second reliabilities to perform the first equalization process on the reception signal from which the predetermined signal cancelled.

(12) Regarding the above reception device, the equalizing unit may be configured to perform the first equalization process on the reception signal from which the predetermined signal is cancelled, to detect a first one of the first and second signals before performing a second equalization process on the reception signal from which the predetermined signal is cancelled, to detect a second one of the first and second signals. The first one is associated with a higher one of the first and second reliabilities. The second one is associated with a lower one of the first and second reliabilities.

(13) The above reception device may further include: a channel estimating unit: and a channel reconfiguring unit. The channel estimating unit is configured to calculate a plurality of channel estimation values for a plurality of channels between the first and second communication devices and the reception device. The channel reconfiguring unit is configured to generate a virtual sub-channel including the plurality of first subcarriers transmitted from one of the first and second communication devices. The channel reconfiguring unit is configured to extract a channel estimation value for the virtual sub-channel among the plurality of the channel estimation values. The equalizing unit is configured to use the channel estimation value extracted, to perform the first equalization process.

(14) According to another embodiment, a wireless communication system may include, but is not limited to: a base station device; a first communication device; and a second communication device. The base station device may include, but is not limited to: a first mapping unit configured to assign a plurality of first subcarriers to the first communication device, and assign a plurality of second subcarriers to the second communication device. At least one of the plurality of second subcarriers partially overlaps in frequency at least one of the plurality of first subcarriers. The first communication device may include, but is not limited to: a first spreading unit; a second mapping unit; and a first transmission antenna. The first spreading unit is configured to convert first transmission data into a plurality of first frequency signals. The second mapping unit is configured to allocate the plurality of first frequency signals to the plurality of first subcarriers. The first transmission antenna is configured to transmit to the base station device, the plurality of first frequency signals allocated to the plurality of first subcarriers. The second communication device may include, but is not limited to: a second spreading unit; a third mapping unit; and a second transmission antenna. The second spreading unit is configured to convert second transmission data into a plurality of second frequency signals. The third mapping unit is configured to allocate the plurality of second frequency signals to the plurality of second subcarriers. The second transmission antenna is configured to transmit, to the base station device, the plurality of second frequency signals allocated to the plurality of second subcarriers.

(15) According to another embodiment, a wireless communication system may include, but is not limited to: a first transmission device; a second transmission device; and a reception device. The first transmission device may include, but is not limited to: a first spreading unit; a first mapping unit; and a first transmission antenna. The first spreading unit is configured to convert first transmission data into a plurality of first frequency signals. The first mapping unit is configured to allocate the plurality of first frequency signals to a plurality of first subcarriers. The first transmission antenna is configured to transmit, to the reception device, the plurality of first frequency signals allocated to the plurality of first subcarriers. The second communication device may include, but is not limited to: a second spreading unit; a second mapping unit; and a second transmission antenna. The second spreading unit is configured to convert second transmission data into a plurality of second frequency signals. The second mapping unit is configured to allocate the plurality of second frequency signals to a plurality of second subcarriers. The second transmission antenna is configured to transmit, to the reception device, the plurality of second frequency signals allocated to the plurality of second subcarriers to the reception device. The reception device may include, but is not limited to: a reception antenna; and an equalizing unit. The reception antenna is configured to receive a reception signal including the plurality of first frequency signals and the plurality of second frequency signals. The equalizing unit is configured to perform an equalization process on the reception signal if at least one of the plurality of first subcarriers overlaps in frequency at least one of the plurality of second subcarriers.

(16) According to another embodiment, a wireless communication method for a base station device ma include but is not limited to the following processes. A plurality of subcarriers are assigned to a first communication device. At least one of the plurality of subcarriers is assigned to a second communication device. A plurality of frequency signals allocated to the plurality of first subcarriers are received from the first communication device. Each of the plurality of frequency signals is converted from coded transmission data of the first communication device.

(17) The above wireless communication method may further include a process of determining a ratio between the at least one of the plurality of subcarriers and the plurality of subcarriers.

(18) According to another embodiment, a wireless communication method for a reception device may include, but is not limited to the following processes. A reception signal is received. The reception signal includes a plurality of first frequency signals and a plurality of second frequency signals transmitted from first and second communication devices, respectively. Each of the plurality of first frequency signals is converted from first coded transmission data of the first communication device. The plurality of first frequency signals are allocated to the plurality of first subcarriers. Each of the plurality of second frequency signals is converted from second coded transmission data of the second communication device. The plurality of second frequency signals are allocated to the plurality of second subcarriers. An equalization process is performed on the reception signal when at least one of the plurality of first subcarriers overlaps in frequency at least one of the plurality of second subcarriers.

Effects of the Invention

According to the present invention, even when SC-ASA is adapted to transmission from multiple transmission devices or MIMO transmission, adequate subcarriers can be selected, and thereby excellent frequency utilization efficiency can be achieved.

BRIEF DESCRIPTION OF THE DRAWINGS

FIG. 4 illustrates operations of mapping units 5-1 and 5-2 according to the first embodiment.

Figure 1:
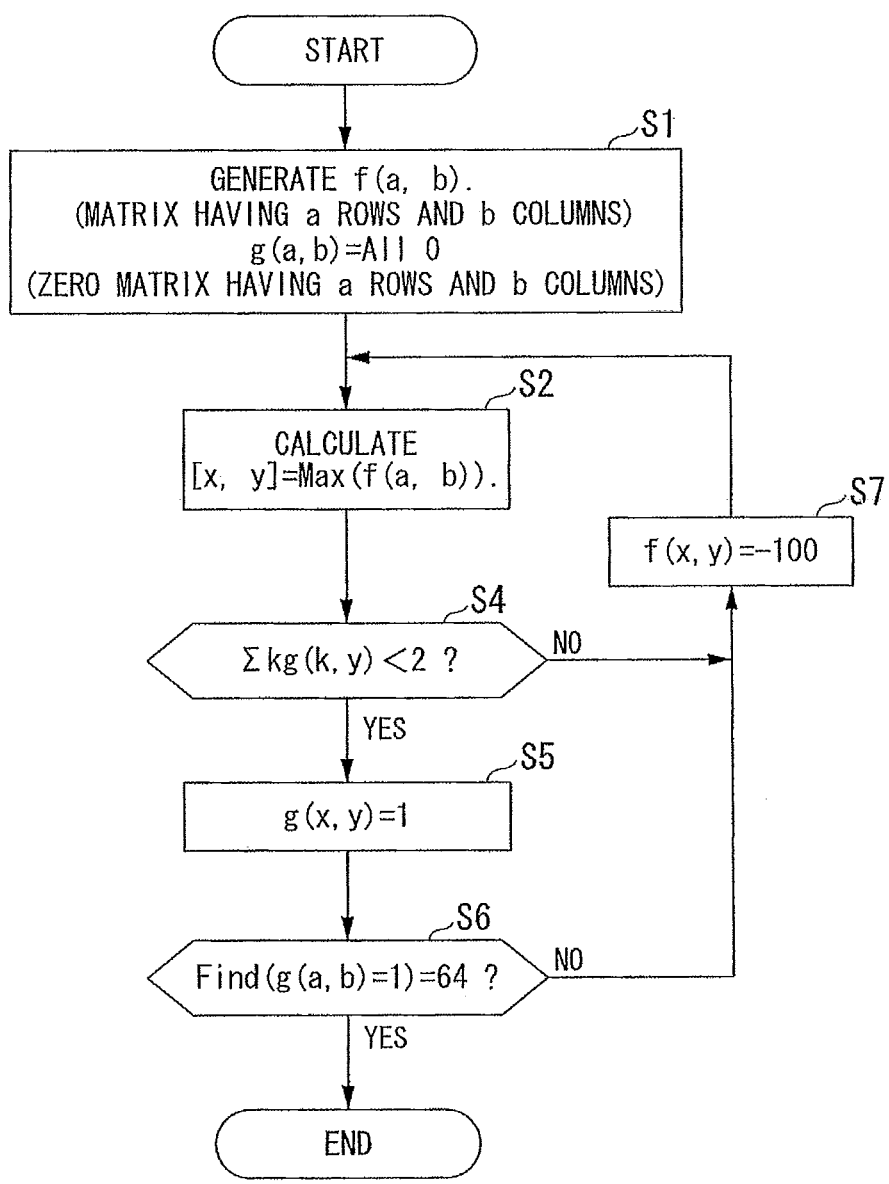
FIG. 1 is a flowchart indicative of a control flow illustrating a method of selecting subcarriers to be used for transmission of data according to a first embodiment of the present invention.

DESCRIPTION OF REFERENCE NUMERALS 1 encoder
2 modulator
3 S/P converter
4-1 and 4-2 DFT unit
5-1, 5-2, and 5-3 mapping unit
6-1 and 6-2 IDFT unit
7-1 and 7-2 GI inserter
8-1 and 8-2 P/S converter
9-1 and 9-2 D/A converter
10-1 and 10-2 RF unit
11 receiver
100, 101, 310, and 311 antenna
102, 103, 312, and 313 RF unit
104, 105, 314, and 315 A/D converter
106, 107, 316, and 317 CP remover
108, 109, 135, 136, 318, 319, and 212 S/P converter
110, 111, 116, 117, 137, 138, 139, 140, 215, 216, 320, and 321 DFT unit
112 and 113 channel estimator
114 and 200 canceller
115, 201-1, 201-2, and 300 signal equalizing-and-demultiplexing unit
118 and 500 spatial-and-spectral demapping unit
301 spectral demapping unit
119, 120, 121, 122, 142, and 143 IDFT unit
123 and 124 P/S converter
125 and 126 demodulator
127 and 128 decoder
129, 130, and 205 repetition controller
131, 132, and 207 determining unit
133, 134, and 210 replica generator
141 spectral mapping unit
144 and 220 channel multiplier
145 and 221 channel reconfiguring unit
146 spectrum determining unit
147 interference power estimator
148 transmitter
500, 501, and 502 mobile station device
510, 511, 512, 513, and 514 base station device
A1, A200a, and A200b encoder
A2, A32-1, A32-2, A117, A201, and A230 interleaver
A3 and A202 modulator
A4, A34-1, A34-2, A203, and A232 S/P converter
A5, A24, A35-1, A35-2, A109, A120, A204, A224, 2A33 DFT unit
A6, A122, and A206 spectral mapping unit
A7, A123, and A207 IDFT unit
A8, A124, and A208 P/S converter
A9 pilot signal generator
A10 and A210 pilot multiplexer
A11 and A211 CP inserter
A12 and A212 D/A converter
A13, A39, A126, A213, and A241 radio unit
A14, A15, A100, A214, and A240 antenna
A16, A101, and A216 A/D converter
A17, A102, and A217 CP remover
A18, A103, and A218 pilot demultiplexer
A19, A104-1, A104-2, A219-1, and A219-2 channel estimator
A20, A127, and A220 spectrum-allocation determining unit
A21-1, A21-2, A221-1, and A221-2 channel-characteristic demapping unit
A22-1, A22-2, A222-1, and A222-2 channel characteristic selector
A23, A108, A119, and A223 S/P converter
A25, A110, and A225 spectral demapping unit
A26-1 and A26-2 signal canceller
A27-1, A27-2, A112, A226, and A236 signal equalizer
A28-1, A28-2, A113, A227, and A237 demodulator
A29-1, A29-2, A114, A228, and A238 deinterleaver
A30-1, A30-2, A115, A229, and A239 decoder
A31-1, A31-2, and A116 repeated-number controller
A33-1, A33-2, A118, and A231 replica generator
A36-1, A36-2, A121, and A234 interference spectrum selector
A37-1, A37-2, and A125 determining unit
A38, A128, and A242 transmitter
A42 and A215 receiver
A50 demapping unit
A60 signal detector
A70, A71, and A72 base station device
A80a, A80b, A82a, A82b, and A83 mobile station device
A105-1 and A105-2 channel-characteristic demapping-and-selecting unit
A106 user change controller
A107 and A235 interference signal canceller
A111 desired signal canceller
A300 spreading-and-multiplexing unit

BEST MODE FOR CARRYING OUT THE INVENTION

First Embodiment

A first embodiment explains a method of determining subcarriers used for transmitting data from respective antennas based on channel conditions for respective subcarriers and for respective antennas. A radio communication system of the first embodiment includes multiple mobile station devices and a base station device. The base station device is a reception device of the first embodiment. The mobile station device is a transmission device of the first embodiment. The number of mobile station devices simultaneously connected to the base station device is two. The number of transmission antennas included in each mobile station device is also two. Signals are transmitted from a total of four transmission antennas.

A transmission method used by the mobile station device is DFT-S-OFDM. The total number of subcarriers is 32. The number of subcarriers used for each antenna of each mobile station device is 16. The number of reception antennas of the base station device is also two. To demultiplex a signal received by the two antennas for each transmission antenna, it is assumed in the first embodiment that any two of the total of four transmission antennas are used for simultaneously transmitting signals on one subcarrier.

FIG. 1 is a control flow illustrating a method of selecting subcarriers used for transmission of data according to the first embodiment. It is assumed for convenience that the two transmission antennas of a user 1 are assigned the antenna numbers "1" and "2", respectively, and that the two transmission antennas of a user 2 are assigned the antenna numbers "3" and "4", respectively. Step S1 shown in FIG. 1 denotes an operation of generating two functions of f(a, b) and g(a, b). Each of the functions is an a×b matrix. a is the number of users×the number of transmission antennas, which is 2×2=4 in the case of the first embodiment. b is the number of subcarriers, which is 32 in the case of the first embodiment. As a value of the function f, channel capacity $C_m(k)$ of each subcarrier to be transmitted from each transmission antenna, which can be expressed as the following expression (1), or a value corresponding to the channel capacity when calculation is simplified by, for example, omitting a constant term from the expression (1) so that the magnitude relationship does not change. m denotes the transmission antenna number. k denotes the subcarrier number. $N_T$ is the number of transmission antennas. $E_s$ denotes transmission energy for one user. $\xi_m(k)$ denotes a channel vector of the k-th subcarrier to be transmitted from the m-th transmission antenna. $\Sigma m(k)$ denotes interference noise power of the k-th subcarrier to be transmitted from the m-th transmission antenna. $\Sigma_m(k)$ can be expressed as an expression (1') where η(k) denotes an interference noise vector of each reception antenna.

$$C_m(k) = \log_2\left(1 + \frac{E_S}{N_T}\xi_m^H(k)\xi_m(k)\sum_m^{-1}(k)\right) \quad (1)$$

$$\sum_m(k) = E\left[\|\xi_m(k)^H \eta(k)\|^2\right] \quad (1')$$

In the expression (1'), E[x] denotes an ensemble mean, and ∥x∥ denotes a norm of a vector x.

The expression (1) denotes channel capacity for each subcarrier to be transmitted from each transmission antenna at the time of SIMO (Single Input Multi Output) transmission. This expression can be used as a criterion for selecting subcarriers to be used when all interference elements among signals transmitted from the respective transmission antennas can be cancelled by an operation on a receiving side that will be explained later. Such a case is called a complete convergence state of reception processing, and can achieve reception characteristics at the time of SIMO transmission. Accordingly, transmission subcarriers are selected independently for each transmission antenna based on the expression (1), thereby achieving a diversity effect that is more flexible and higher than that achieved by the conventional selection method.

The function g initializes all values to 0. By performing the operation shown in the flowchart of FIG. 1, the function g becomes a function indicative of presence or absence of signal transmission for a combination of the input antenna number and the subcarrier number. For example, if g(2, 5)=1, then a signal is transmitted on the fifth subcarrier from the second antenna. Step S2 is a step of extracting the element number of a matrix having the maximum value of the function f. In other words, x and y of a matrix having x rows and y columns to which elements for the maximum value are assigned are calculated. Then, step S4 is a step of determining whether or not the number of transmission antennas already assigned to the y column of the function g is 1 or less. In other words, it is a step of determining whether or not the number of transmission antennas from which signals are transmitted on the y-th subcarrier is 1 or less. This determination is performed by adding each element of the y column and thereby calculating the number of transmission antennas from which signals are transmitted on the y-th subcarrier.

The condition of step S4 that the number is 1 or less depends on the aforementioned assumption that the maximum number of antennas assigned to the same subcarrier is set to two. If it is determined in step S4 that the number is 1 or less, and if assignment can be still performed (S4: YES), then g(x, y)=1 in step S5 and a fact that assignment has been done is reflected in the function g. In step S6, the number of the function g having the value of 1 is counted and compared to 64. Since this value is incremented by 1, the time when the value becomes 64 indicates completion of all assignments. It is noted that 64=the number of subcarriers used for each antenna (16)×the total number of antennas of mobile station devices simultaneously connected to the base station devices (4).

If two antennas have already been assigned in step S4 and if it is determined in step S6 that assignment is still required, a value of the function f with respect to elements x and y currently selected in step S7 is set to −100. The value of −100 has no significant meaning and indicates that the value is changed to a small value so that the same elements are not selected again in step S2.

Figure 2:
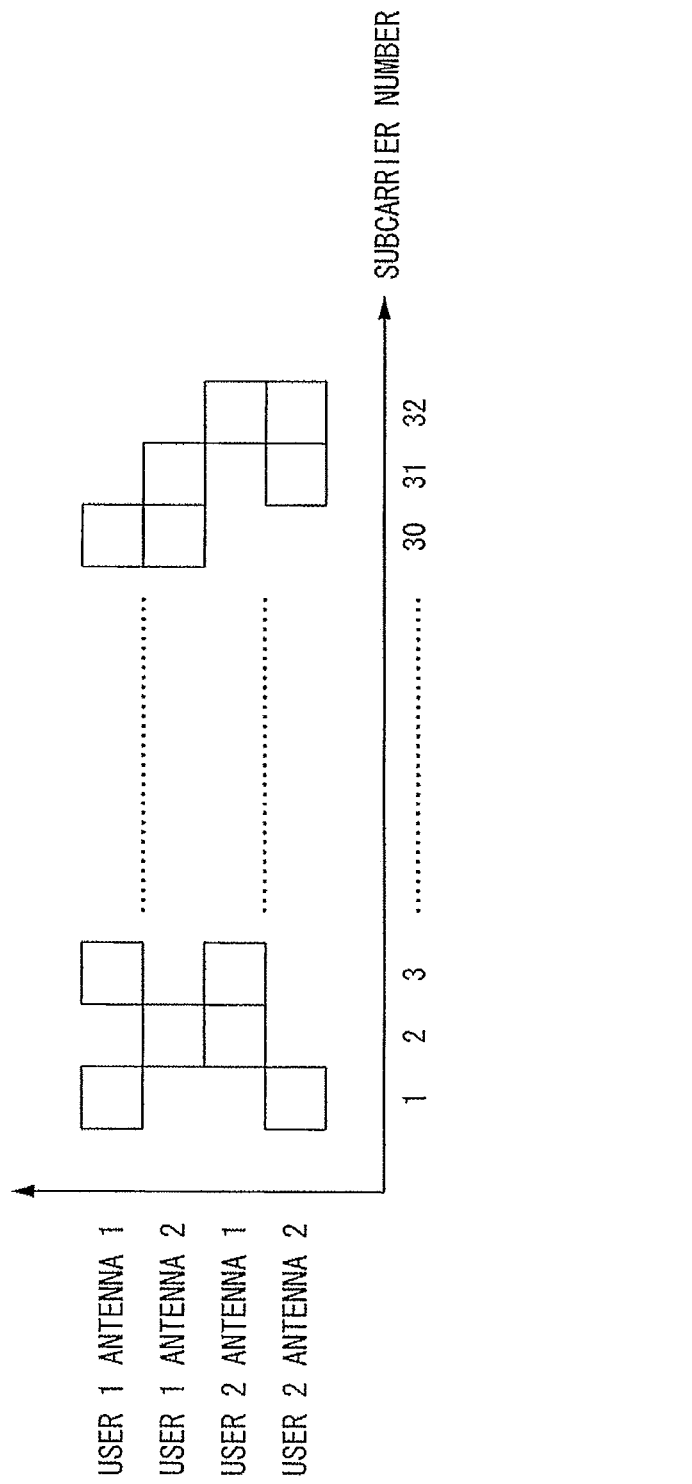
FIG. 2 illustrates an example result of subcarrier selection according to the first embodiment.

A result of the selection performed in this manner is shown in FIG. 2. In FIG. 2, the vertical axis denotes the antenna number for each mobile station, and the horizontal axis denotes the subcarrier number. Subcarriers each surrounded by a square indicate subcarriers to be used for transmission of signals. In the case of FIG. 2, the 30th and 32nd subcarriers correspond to the case of single-user MIMO in which one mobile station device multiplexes signals. In other words, the subcarrier 30 is used by the antennas 1 and 2 of the user 1. The subcarrier 32 is used by the antennas 1 and 2 of the user 2. The 1st, 2nd, 3rd, and 31st subcarriers correspond to the case of multi-user MIMO in which multiple mobile station devices share subcarriers to be used with one another and multiplex signals. In other words, for example, subcarrier 1 is used by the antenna 1 of the user 1 and the antenna 2 of the user 2. Thus, subcarriers to be independently used for each antenna are selected based on only the channel conditions, thereby enabling transmission of data in a good condition.

Although an antenna for transmitting a subcarrier is determined here based on only channel conditions without setting likelihoods to all antennas, if there is a large difference in channel conditions between the first and second mobile station devices, one of the mobile station devices cannot always select subcarriers having good channel conditions. To cope with this situation, the function f is provided for each mobile station device so that each mobile station device sequentially selects a subcarrier.

Although the result of the calculation by the expression (1) is used as a value of the function f in the above case, alternatively, a channel condition (channel gain), SINR (Signal to Interference Noise Ratio) (this interference means unknown interference elements received from an adjacent cell or the like), or the like for each transmission antenna and for each subcarrier may be substituted as a value of the function f. However, two channels are present for one transmission antenna in the first embodiment (since the base station device has two reception antennas). For this reason, channel conditions or SINRs monitored by the two reception antennas are added or averaged for each subcarrier to be used as each element of the function f. Even when a simple criterion such as an average of SINR for each reception antenna is used, a subcarrier to be transmitted can be selected independently for each transmission antenna similarly to the case of using the expression (1).

Figure 3:
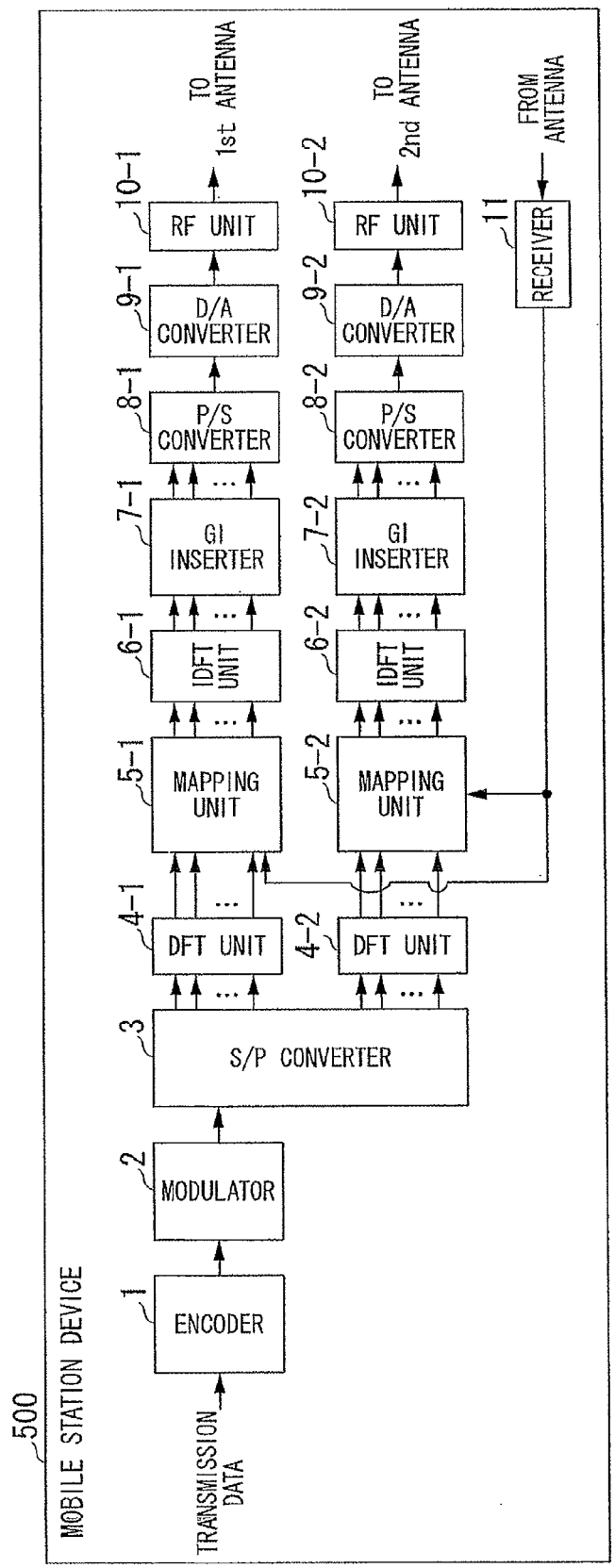
FIG. 3 is a schematic block diagram illustrating a configuration of a mobile station device 500 according to the first embodiment.

FIG. 3 is a schematic block diagram illustrating a configuration of a mobile station device 500 for performing transmission using the subcarriers independently selected for each transmission antenna of each mobile station device based on the control flow shown in FIG. 1. As shown in FIG. 3, a reference numeral 11 denotes a receiver that receives, from the base station device through an antenna, mapping information indicative of a subcarrier to be used for transmission of a signal with respect to each transmission antenna. A reference numeral 1 denotes an encoder that performs error correction coding on transmission data. A reference numeral 2 denotes a modulator (hereinafter called "a first modulator") that performs modulation, such as BPSK (Binary Phase Shift Keying) on an output of the encoder 1. A reference numeral 3 denotes an S/P (Serial/Parallel) converter that converts the modulated signal output from the modulator 2, which is serial input data, into parallel data corresponding to MIMO. The receiver 11 may use the first or second antennas.

Since it is assumed that two transmission antennas are included in the following circuit, there are two systems (x-1 and x-2). A reference numeral 4 denotes a DFT unit that performs DFT (Discrete Fourier Transform) on the modulated signals received from the S/P converter 3 for frequency spreading. Reference numerals 5-1 and 5-2 denote mapping units that allocate the signals subjected to the frequency spreading performed by the DFT units 4-1 and 4-2 onto subcarriers to be used based on the mapping information received by the receiver 11 from the base station device, respectively. Subcarriers are specified independently for the mapping units 5-1 and 5-2, which are subcarriers calculated by the function g. "0" is input to subcarriers onto which no data is mapped.

Reference numerals 6-1 and 6-2 are IDFT units that perform IDFT (Inverse Discrete Fourier Transform) on the signals mapped onto subcarriers by the mapping units 5-1 and 5-2, respectively. Reference numerals 7-1 and 7-2 are GI inserters that insert guard intervals into the outputs of the IDFT units 6-1 and 6-2, respectively. The GI inserters 7-1 and 7-2 copy the last part of the input data to a GI section, which is called a cyclic prefix. The reason that a cyclic prefix is used is explained here. Waves to be subjected to DFT in the DFT section are required to have a period that is an integral multiple of one period of a periodical function. For this reason, if delayed-wave elements are present in multipath channels, the functional periodicity of the delayed-wave elements of the received signal collapses on the receiving side. Consequently, the received signal cannot be demultiplexed into subcarriers by DFT, and therefore subcarriers cannot be independently processed.

On the other hand, if a cyclic prefix corresponding to the maximum delay time of the channel is preliminarily inserted on the transmitting side, the cyclic prefix is removed on the receiving side so that the functional periodicity with respect to the delayed elements can be maintained. Consequently, each subcarrier can be independently processed. In other words, even if each subcarrier is allocated to an arbitral frequency, the subcarrier can be reproduced on the receiving side.

Reference numerals 8-1 and 8-2 are P/S (Parallel/Serial) converters that convert the outputs of the GI inserters 7-1 and 7-2, which are parallel data, into serial data, respectively. Reference numerals 9-1 and 9-2 are D/A (Digital/Analog) converters that convert the outputs of the P/S converters 8-1 and 8-2, which are digital data, into analog data. Reference numerals 10-1 and 10-2 are RF (Radio Frequency) units that convert data into a frequency band to be transmitted. The first and second independent antennas are connected to the RF units 10-1 and 10-2, respectively. Although one encoder 1 is used for multiple transmitted signals in the first embodiment, different encoders may be used for respective signals transmitted from the transmission antennas.

As shown in FIG. 3, the mobile station device 500 includes the encoder 1, the converter 2, the S/P converter 3, the DFT units 4-1 and 4-2, the mapping units 5-1 and 5-2, the IDFT units 6-1 and 6-2, the GI inserters 7-1 and 7-2, the P/S converters 8-1 and 8-2, the D/A converters 9-1 and 9-2, the RF units 10-1 and 10-2, and the receiver 11.

According to the configuration, transmission of data is enabled according to allocation of subcarriers determined for each antenna based on the flow shown in FIG. 1.

Hereinafter, operations of the mapping units 5-1 and 5-2 are explained to explain the state of mapping onto subcarriers with reference to the user 1 shown in FIG. 2. It is assumed that subcarriers used by the "user 1, antenna 1" shown in FIG. 2 are 16 subcarriers (corresponding to the subcarrier numbers 1, 3, 5, 8, 10, 11, 14, 17, 20, 22, 24, 25, 28, 30, 31, and 32). It is assumed that subcarriers used by the "user 1, antenna 2" are 16 subcarriers (corresponding to the subcarrier numbers 2, 4, 5, 6, 7, 8, 11, 15, 17, 19, 20, 22, 23, 26, 30, and 31). The user 1 indicates the mobile station device 500 corresponding to the mobile station number of 1. The antenna 1 indicates the antenna corresponding to the antenna number of 1. The similar applies to the user 2 and the antenna 2.

FIG. 4 illustrates operations of the mapping units 5-1 and 5-2. Information concerning subcarriers to be used (mapping information) for each antenna is input from the receiver 11 to the mapping units 5-1 and 5-2. As shown in FIG. 4, the left side of the mapping units 5-1 and 5-2 is the input side (there are 16 inputs since the number of subcarriers to be used is assumed to be 16). The right side of the mapping units 5-1 and 5-2 is the output side (there are 32 outputs since selection is made from 32 subcarriers). Output signals to which no input signal is connected is a null signal. In the example of the mapping unit 5-1 shown in FIG. 4, the first and second input signals are allocated to the first and third subcarriers, respectively. Since no input signal is allocated to the second subcarrier, 0 is output from the second subcarrier. Although the mapping units 5-1 and 5-2 are configured in the case of FIG. 4 such that inputs and outputs are connected based on selection, the mapping units 5-1 and 5-2 may be configured such that input signals are input to memory, and are then read out on the output side based on the mapping information.

Figure 5:
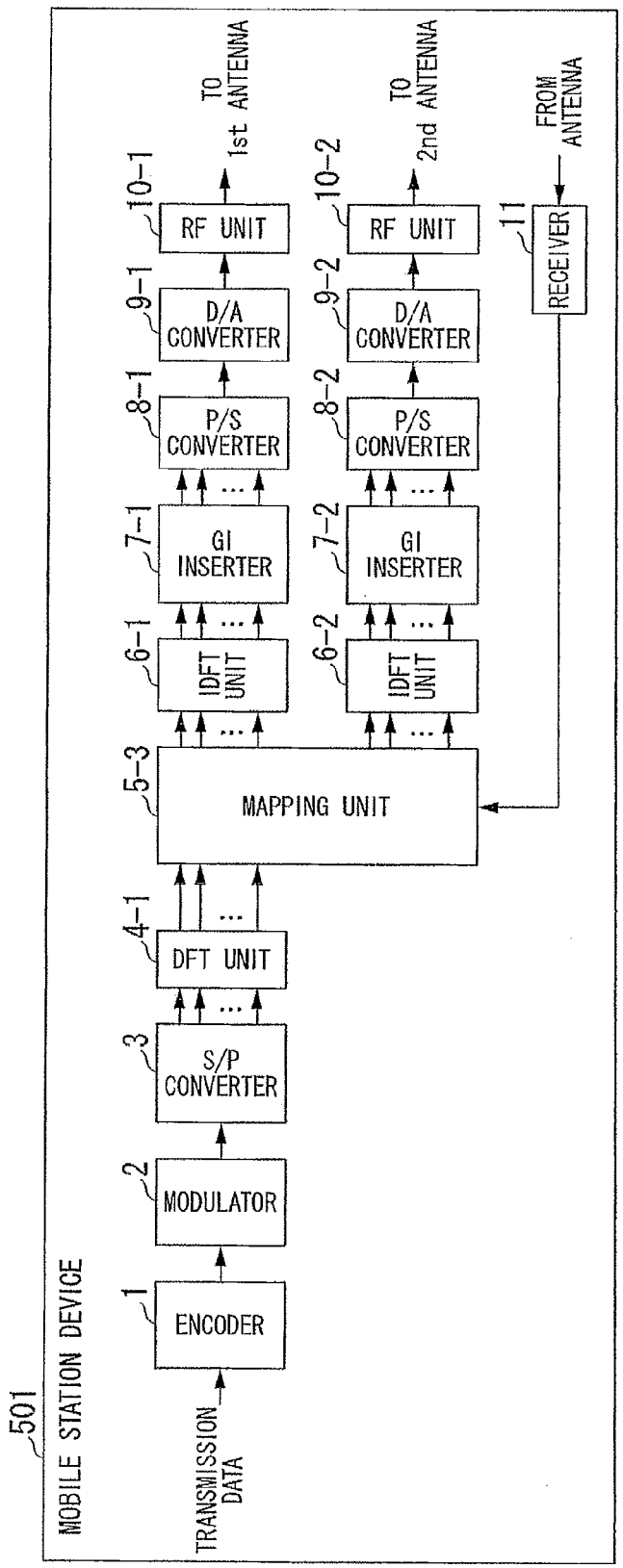
FIG. 5 is a schematic block diagram illustrating a configuration of a mobile station device 501 according to the first embodiment.

FIG. 5 is a schematic block diagram illustrating a configuration of a mobile station device 501 that is another example of a configuration of the mobile station device 500. Like reference numerals denote blocks having the same functions in FIGS. 3 and 5. Different from FIG. 3, the DFT unit 4-2 is not included, and instead only the DFT unit 4-1 is included in FIG. 5. The mapping units 5-1 and 5-2 are not included, and only the mapping unit 5-3 is included in FIG. 5. This is because the mapping unit 5-3 of the mobile station device 501 simultaneously maps two symbols of a spectrum output from the DFT unit 4-1. Transmitted signals to be transmitted from multiple transmission antennas are configured in this manner. The DFT unit 4-1 shown in FIG. 5 may have the input-output size which is double that of the DFT unit 4-1 shown in FIG. 3.

Although subcarriers to be used are determined based on the control flow shown in FIG. 1 in the first embodiment, the determination of subcarriers may be performed for each frame of a target radio communication system. Thus, subcarriers are selected for each frame, thereby enabling selection of subcarriers corresponding to a time variation of channel conditions, and therefore further enhancing the frequency utilization efficiency.

Explanations of the base station device will be given in the following embodiments.

According to the first embodiment, transmission subcarriers are selected independently for each transmission antenna as in the flowchart shown in FIG. 1, thereby enabling selection of subcarriers having the best conditions among transmittable channels, and therefore achieving higher frequency utilization efficiency for each mobile station device and for the entire system.

Second Embodiment

The second embodiment explains a configuration of a reception device to which SC/MMSE (Soft Canceller/MMSE)-technique is applied, in which with respect to single-user-MIMO-and-multi-user-MIMO-mixed signals subjected to the spatial-and-spectral mapping of the present invention, replicas of received signals are generated based on the reliability of demodulated data, unnecessary interference (replicas) are subtracted from the received signals, and then a series of operations, such as equalization and demodulation, is repeated, thereby gradually increasing the reliability of the demodulated data.

Similar to the first embodiment, it is assumed in the second embodiment that the number of mobile station devices simultaneously connected to the base station device is two. The number of transmission antennas included in each mobile station device is also two. Signals are transmitted from a total of four transmission antennas. A transmission method used by the mobile station device is DFT-S-OFDM. The total number of subcarriers is 32. The number of subcarriers used for each antenna of each mobile station device is 16. The number of reception antennas of the base station device is also two. To demultiplex a signal received by the two antennas for each transmission antenna, it is assumed in the second embodiment that any two of the total of four transmission antennas are used for simultaneously transmitting signals on one subcarrier.

Figure 6:
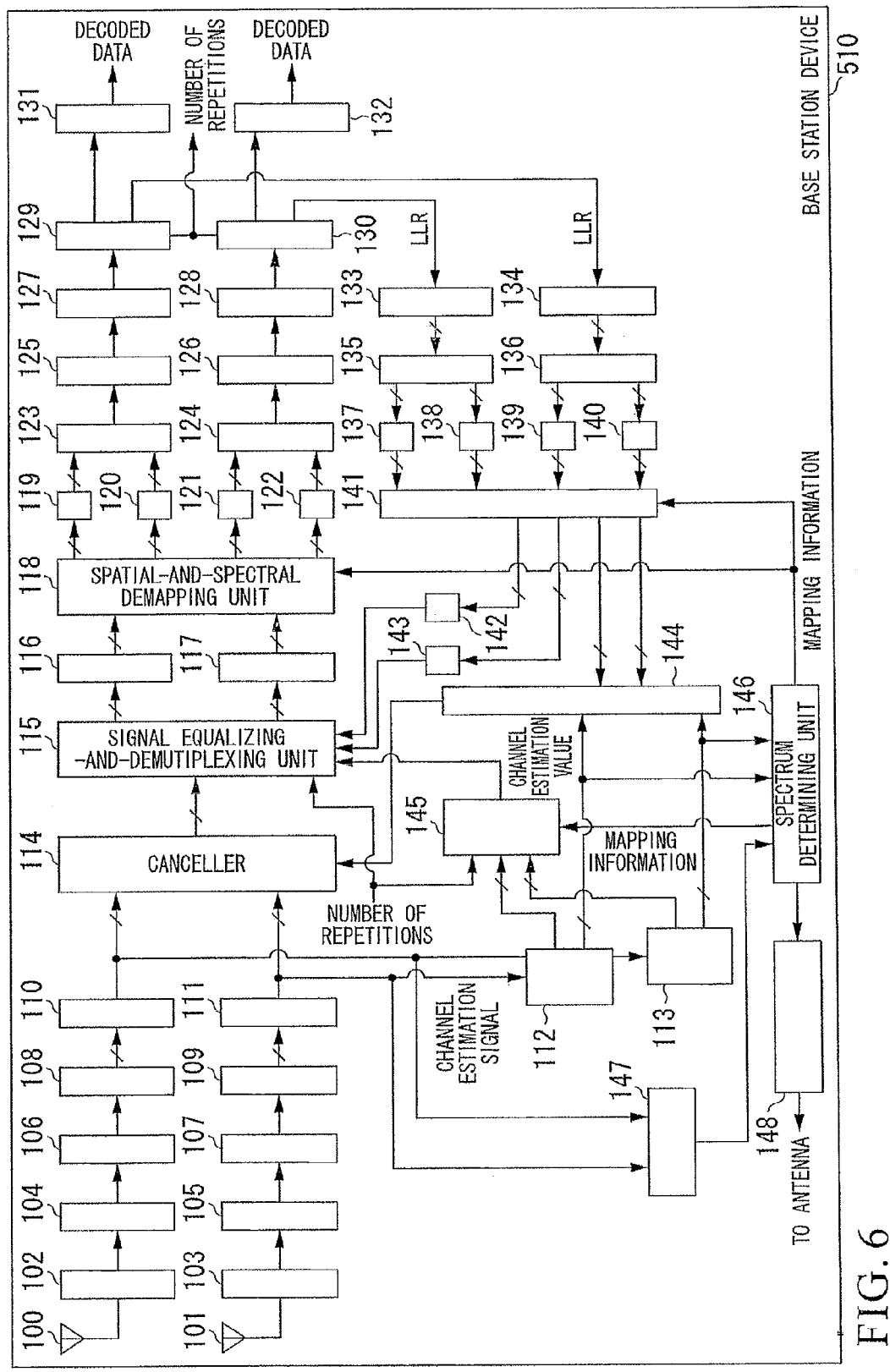
FIG. 6 is a schematic block diagram illustrating a configuration of a base station device 510 according to a second embodiment of the present invention.

FIG. 6 is a schematic block diagram illustrating a configuration of a base station device 510 that is a reception device according to the second embodiment. As shown in FIG. 6, the reception device according to the second embodiment includes: antennas 100 and 101; RF units 102 and 103; A/D converters 104 and 105; CP removers 106 and 107; S/P converters 108, 109, 135, and 136; DFT units 110, 111, 116, 117, 137, 138, 139, and 140; channel estimators 112 and 113; a canceller 114; signal equalizing-and-demultiplexing unit 115; a spatial-and-spectral demapping unit 118; IDFT units 119, 120, 121, 122, 142, and 143; P/S converters 123 and 124; demodulators 125 and 126; decoders 127 and 128; repetition controllers 129 and 130; determining units 131 and 132; replica generators 133 and 134; a spatial-and-spectral mapping unit 141; a channel multiplier 144; a channel reconfiguring unit 145; a spectrum determining unit 146; an interference-power measuring unit 147; and a transmitter 148.

Regarding the base station device 510 shown in FIG. 6, signals received by the antennas 100 and 101 pass through the CP removers 106, 107, and the like, and then are converted into frequency-domain signals by DFT performed by the DFT units 110 and 111. Then, the frequency-domain signals are input to the canceller 114. The canceller 114 subtracts replicas of the received signals generated based on the reliability of demodulated data from the frequency-domain signals that are the received signals.

If a perfect replica (transmitted signal) is generated, an output of the canceller 114 includes only noise elements. This calculation can be expressed as an expression (2) where R denotes a reception-data vector received by the two antennas, $\Xi$ denotes a virtual channel matrix (a matrix generated by the channel reconfiguring unit 221 mapping, based on the mapping information, channel variations estimated by the channel estimators 112 and 113), and S' denotes a replica of a pseudo transmission-data vector (generated by replica generators 133 and 134 to the spatial-and-spectral mapping unit 141 as will be explained later) generated by gathering signals to be transmitted from all the transmission antennas into one vector.

$$Q = R - \Xi S' \quad (2)$$

In the above expression, Q denotes a vector indicative of an output of the canceller 114 (residual after cancelling) at the time of the second-or-more repeated operation. R, $\Xi$, and S' are expressed as the following expressions (3) to (5).

$$R = \begin{bmatrix} R_1(1) \\ R_1(2) \\ R_1(3) \\ R_1(4) \\ R_2(1) \\ R_2(2) \\ R_2(3) \\ R_2(4) \end{bmatrix} \quad (3)$$

$$\Xi = \begin{bmatrix} \Xi_{13}(1) & 0 & 0 & 0 & \Xi_{14}(1) & 0 & 0 & 0 \\ 0 & \Xi_{12}(2) & 0 & 0 & 0 & \Xi_{13}(2) & 0 & 0 \\ 0 & 0 & \Xi_{11}(3) & 0 & 0 & 0 & \Xi_{14}(3) & 0 \\ 0 & 0 & 0 & \Xi_{11}(4) & 0 & 0 & 0 & \Xi_{12}(4) \\ \Xi_{23}(1) & 0 & 0 & 0 & \Xi_{24}(1) & 0 & 0 & 0 \\ 0 & \Xi_{22}(2) & 0 & 0 & 0 & \Xi_{23}(2) & 0 & 0 \\ 0 & 0 & \Xi_{21}(3) & 0 & 0 & 0 & \Xi_{24}(3) & 0 \\ 0 & 0 & 0 & \Xi_{21}(4) & 0 & 0 & 0 & \Xi_{22}(4) \end{bmatrix} \quad (4)$$

$$S' = \begin{bmatrix} S'_3(1) \\ S'_2(2) \\ S'_1(3) \\ S'_1(4) \\ S'_4(1) \\ S'_3(2) \\ S'_4(3) \\ S'_2(4) \end{bmatrix} \quad (5)$$

The reason that all replicas ($\Xi S'$) including desired signals to be extracted are cancelled is that the signal equalizing-and-demultiplexing unit 115 that will be explained later performs an inverse matrix calculation, and therefore the inverse matrix calculation has to be performed a number of times corresponding to the number of desired signals included in a block if cancelling and equalization are repeated without cancelling the desired signals. On the other hand, if the residual Q after cancelling all the replicas is input, the residual can be equally treated in the block, and therefore all weights can be calculated with one inverse calculation for the block. For this reason, the replica is independently input and reconfigured to decrease the amount of the inverse calculation. However, a replica of the received signal cannot be generated for the first operation. In this case, the reception-data vector (R) passes through the canceller 114 as it is.

The signal output from the canceller 114 is input to the signal equalizing-and-demultiplexing unit 115, and then subjected to equalization using frequency-domain signals. If the repeated operation is performed, the signal equalizing-and-demultiplexing unit 115 performs equalization on an output (Q) of the canceller 114 to which a replica of the received signal for each transmission-data vector is added. The transmission-data vector targeted for the equalization performed by the signal equalizing-and-demultiplexing unit 115 when the spatial-and-spectral mapping of the present invention is performed is not a transmission data stream in the case of normal single-user MIMO or multi-user MIMO, i.e., transmission data for each transmission antenna or for each mobile station device, but is a data stream generated by demultiplexing two signals actually multiplexed into one spectrum irrespective of transmission sources and then gathering those demultiplexed signals with respect to the entire spectrum.

Figure 7:
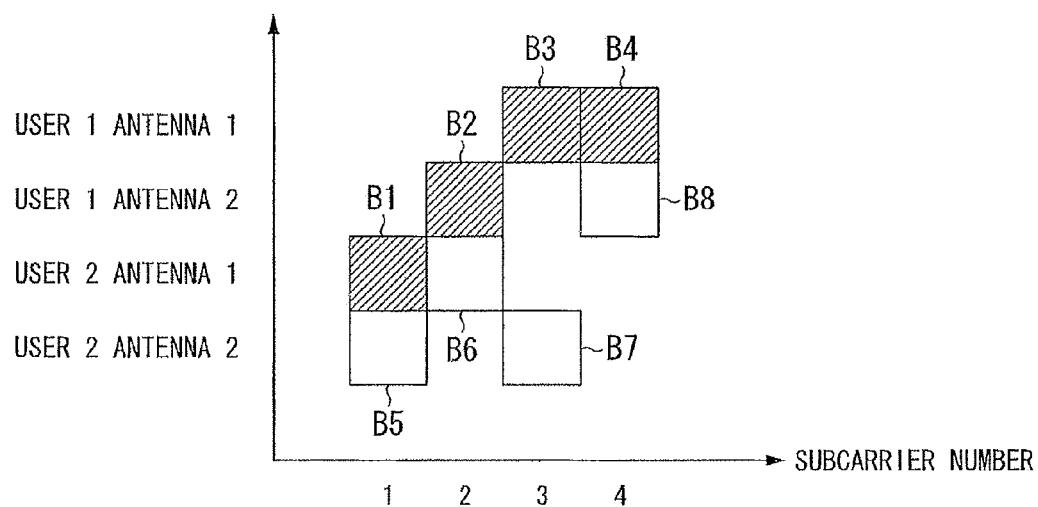
FIG. 7 illustrates an example result of subcarrier selection according to the second embodiment.

For example, it is assumed that spatial-and-spectral mapping as shown in FIG. 7 is performed. Transmission-data vectors targeted for equalization performed by the signal equalizing-and-demultiplexing unit 115 of the base station device 510 with respect to transmitted signals in this case are two signal streams, i.e., a signal stream expressed by shaded blocks B1, B2, B3, and B4 and a signal steam expressed by white blocks B5, B6, B7, and B8. Thus, the signal equalizing-and-demultiplexing unit 115 of the second embodiment virtually regards the two signal streams including the mixed signals transmitted from the respective antennas of multiple users as shown in FIG. 7 as one signal transmitted from one antenna, and performs equalization independently for each signal stream. The user 1 indicates the mobile station device 510 corresponding to the mobile station number 1. The antenna 1 indicates the antenna corresponding to the antenna number 1. The similar applies to the user 2 and the antenna 2.

Hereinafter, the two virtual signal streams are called a pseudo transmission-data vector 1 (the signal stream expressed by the shaded blocks B1 to B4 shown in FIG. 7 corresponding to an upper half of S') and a pseudo transmission-data vector 2 (the signal stream expressed by the white blocks B5 to B8 shown in FIG. 7 corresponding to an lower half of S'). Since a replica of a received signal is not generated for the first operation, a signal passes through the canceller 200 without being subjected to any subtraction, and then is subjected to equalization. As explained above, the equalization of the second embodiment is performed on each of the pseudo transmission vectors 1 and 2 (the two signal streams distinguishably expressed by the shaded blocks and the white blocks shown in FIG. 7). Therefore, calculation is performed using the reception-data vector shown in the expression (3), a virtual channel matrix shown in the expression (4), and channel matrices $\Xi_{T1}$ and $\Xi_{T2}$ with respect to the pseudo transmission-data vectors 1 and 2.

$\Xi_{T1}$ and $\Xi_{T2}$ are virtual channel matrices generated under the assumption that the respective transmission-data vectors are regarded as a signal transmitted from one antenna, which are used for equalizing the pseudo transmission-data vectors 1 and 2, respectively. Since $\Xi_{T1}$ and $\Xi_{T2}$ are a part of the virtual channel matrix $\Xi$, these matrices are hereinafter called "virtual subchannel matrices". These virtual subchannel matrices are obtained by channel estimation values for each combination of transmission-and-reception antennas, which are obtained by the channel estimators 112 and 113, being mapped based on the spectral mapping information. In the second embodiment, these virtual subchannel matrices are generated by the channel reconfiguring unit 145.

$$\Xi_{T1} = \begin{bmatrix} \Xi_{13} & 0 & 0 & 0 \\ 0 & \Xi_{12} & 0 & 0 \\ 0 & 0 & \Xi_{11} & 0 \\ 0 & 0 & 0 & \Xi_{11} \\ \Xi_{23} & 0 & 0 & 0 \\ 0 & \Xi_{22} & 0 & 0 \\ 0 & 0 & \Xi_{21} & 0 \\ 0 & 0 & 0 & \Xi_{21} \end{bmatrix} \quad (6)$$

$$\Xi_{T2} = \begin{bmatrix} \Xi_{14} & 0 & 0 & 0 \\ 0 & \Xi_{13} & 0 & 0 \\ 0 & 0 & \Xi_{14} & 0 \\ 0 & 0 & 0 & \Xi_{12} \\ \Xi_{24} & 0 & 0 & 0 \\ 0 & \Xi_{23} & 0 & 0 \\ 0 & 0 & \Xi_{24} & 0 \\ 0 & 0 & 0 & \Xi_{22} \end{bmatrix} \quad (7)$$

Hereinafter, an operation of the channel reconfiguring unit 145 is explained. The channel reconfiguring unit 145 receives channel estimation information from each reception antenna. The information to be received is a channel response for each subcarrier with respect to each transmission-and-reception antenna. Since it is assumed in the second embodiment that the number of transmission antennas required to be simultaneously processed is 4 (the number of users 2×the number of antennas 2), the number of antennas is 2, and the number of subcarriers is 4, a total of 32 frequency responses are received. Channel information $\Xi_{r1}$ received from the channel estimator 112 connected to the antenna 100 can be expressed as an expression (8). Channel information $\Xi_{r2}$ received from the channel estimator 113 connected to the antenna 101 can be expressed as an expression (9) (where transmission antennas of the user 1 are denoted as transmission antennas 1 and 2, and transmission antennas of the user 2 are denoted as transmission antennas 3 and 4).

$$\Xi_{r1} = \begin{bmatrix} \Xi_{11}(1) & \Xi_{11}(2) & \Xi_{11}(3) & \Xi_{11}(4) \\ \Xi_{12}(1) & \Xi_{12}(2) & \Xi_{12}(3) & \Xi_{12}(4) \\ \Xi_{13}(1) & \Xi_{13}(2) & \Xi_{13}(3) & \Xi_{13}(4) \\ \Xi_{14}(1) & \Xi_{14}(2) & \Xi_{14}(3) & \Xi_{14}(4) \end{bmatrix} \quad (8)$$

$$\Xi_{r2} = \begin{bmatrix} \Xi_{21}(1) & \Xi_{21}(2) & \Xi_{21}(3) & \Xi_{21}(4) \\ \Xi_{22}(1) & \Xi_{22}(2) & \Xi_{22}(3) & \Xi_{22}(4) \\ \Xi_{23}(1) & \Xi_{23}(2) & \Xi_{23}(3) & \Xi_{23}(4) \\ \Xi_{24}(1) & \Xi_{24}(2) & \Xi_{24}(3) & \Xi_{24}(4) \end{bmatrix} \quad (9)$$

Figure 8:
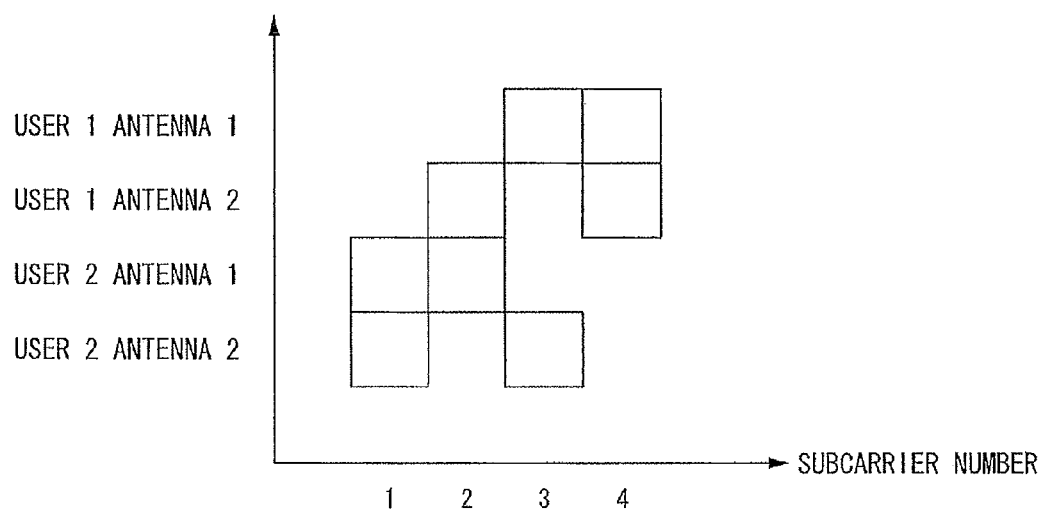
FIG. 8 illustrates example information indicated by mapping information according to the second embodiment.

The channel reconfiguring unit 145 generates the virtual channel matrix $\Xi$ and the virtual subchannel matrices $\Xi_{T1}$ and $\Xi_{T2}$. Hereinafter, a method of generating the virtual channel matrix is explained first. A masking vector MV by which the expressions (8) and (9) are multiplied is generated based on mapping information, i.e., usage of subcarriers for each antenna shown in FIG. 8. The masking vector MV is a vector in which 1 is set to a portion to be used, and 0 is set to a portion not to be used. The masking vector MV corresponding to the case of FIG. 8 can be expressed as an expression (10).

$$MV = \begin{bmatrix} 0 & 0 & 1 & 1 \\ 0 & 1 & 0 & 1 \\ 1 & 1 & 0 & 0 \\ 1 & 0 & 1 & 0 \end{bmatrix} \quad (10)$$

If ". *" denotes products of respective elements of two matrices, $$\Xi_{r1} \cdot * MV = \begin{bmatrix} 0 & 0 & \Xi_{11}(3) & \Xi_{11}(4) \\ 0 & \Xi_{12}(2) & 0 & \Xi_{12}(4) \\ \Xi_{13}(1) & \Xi_{13}(2) & 0 & 0 \\ \Xi_{14}(1) & 0 & \Xi_{14}(3) & 0 \end{bmatrix} \quad (11)$$

$$\Xi_{r2} \cdot * MV = \begin{bmatrix} 0 & 0 & \Xi_{21}(3) & \Xi_{21}(4) \\ 0 & \Xi_{22}(2) & 0 & \Xi_{22}(4) \\ \Xi_{23}(1) & \Xi_{23}(2) & 0 & 0 \\ \Xi_{24}(1) & 0 & \Xi_{24}(3) & 0 \end{bmatrix} \quad (12)$$

It is assumed that D0U(A) denotes a calculation of removing 0 elements from a matrix A, and then upwardly shifting elements. If the calculation of D0U(A) is performed on the expressions (11) and (12), $$D0U(\Xi_{r1} \cdot * MV) = \begin{bmatrix} \Xi_{13}(1) & \Xi_{12}(2) & \Xi_{11}(3) & \Xi_{11}(4) \\ \Xi_{14}(1) & \Xi_{13}(2) & \Xi_{14}(3) & \Xi_{12}(4) \end{bmatrix} \quad (13)$$

$$D0U(\Xi_{r2} \cdot * MV) = \begin{bmatrix} \Xi_{23}(1) & \Xi_{22}(2) & \Xi_{21}(3) & \Xi_{21}(4) \\ \Xi_{24}(1) & \Xi_{23}(2) & \Xi_{24}(3) & \Xi_{22}(4) \end{bmatrix} \quad (14)$$

The virtual channel matrix $\Xi$ can be calculated by diagonalizing a 4×4 square matrix using each column vector shown in the expressions (13) and (14) (an example where one row of the expression (13) is diagonalized is shown as a matrix (15)), by connecting square matrices generated from the same expression in the column direction to generate a 4×8 square matrix (an example where diagonalized matrices generated from the expression (13) are connected is shown as an expression (16)), and by connecting the 4×8 square matrix in the row direction.

$$\begin{bmatrix} \Xi_{13}(1) & 0 & 0 & 0 \\ 0 & \Xi_{12}(2) & 0 & 0 \\ 0 & 0 & \Xi_{11}(3) & 0 \\ 0 & 0 & 0 & \Xi_{11}(4) \end{bmatrix} \quad (15)$$

$$\begin{bmatrix} \Xi_{13}(1) & 0 & 0 & 0 & \Xi_{14} & 0 & 0 & 0 \\ 0 & \Xi_{12}(2) & 0 & 0 & 0 & \Xi_{13}(2) & 0 & 0 \\ 0 & 0 & \Xi_{11}(3) & 0 & 0 & 0 & \Xi_{14} & 0 \\ 0 & 0 & 0 & \Xi_{11}(4) & 0 & 0 & 0 & \Xi_{12}(4) \end{bmatrix} \quad (16)$$

$$\Xi = \begin{bmatrix} \Xi_{13}(1) & 0 & 0 & 0 & \Xi_{14}(1) & 0 & 0 & 0 \\ 0 & \Xi_{12}(2) & 0 & 0 & 0 & \Xi_{13}(2) & 0 & 0 \\ 0 & 0 & \Xi_{11}(3) & 0 & 0 & 0 & \Xi_{14}(3) & 0 \\ 0 & 0 & 0 & \Xi_{11}(4) & 0 & 0 & 0 & \Xi_{12}(4) \\ \Xi_{23}(1) & 0 & 0 & 0 & \Xi_{24}(1) & 0 & 0 & 0 \\ 0 & \Xi_{22}(2) & 0 & 0 & 0 & \Xi_{23}(2) & 0 & 0 \\ 0 & 0 & \Xi_{21}(3) & 0 & 0 & 0 & \Xi_{24}(3) & 0 \\ 0 & 0 & 0 & \Xi_{21}(4) & 0 & 0 & 0 & \Xi_{22}(4) \end{bmatrix} \quad (17)$$

The 8×4 matrix that is the left half of the virtual channel matrix $\Xi$ and the 8×4 matrix that is the right half thereof are virtual subchannel matrices.

$$\Xi_{T1} = \begin{bmatrix} \Xi_{13} & 0 & 0 & 0 \\ 0 & \Xi_{12} & 0 & 0 \\ 0 & 0 & \Xi_{11} & 0 \\ 0 & 0 & 0 & \Xi_{11} \\ \Xi_{23} & 0 & 0 & 0 \\ 0 & \Xi_{22} & 0 & 0 \\ 0 & 0 & \Xi_{21} & 0 \\ 0 & 0 & 0 & \Xi_{21} \end{bmatrix} \quad (18)$$

$$\Xi_{T2} = \begin{bmatrix} \Xi_{14} & 0 & 0 & 0 \\ 0 & \Xi_{13} & 0 & 0 \\ 0 & 0 & \Xi_{14} & 0 \\ 0 & 0 & 0 & \Xi_{12} \\ \Xi_{24} & 0 & 0 & 0 \\ 0 & \Xi_{23} & 0 & 0 \\ 0 & 0 & \Xi_{24} & 0 \\ 0 & 0 & 0 & \Xi_{22} \end{bmatrix} \quad (19)$$

Although the case where a matrix is sequentially transformed to generate the virtual channel matrix is shown here, the virtual channel matrix $\Xi$ may be generated by storing $\Xi_{r1}$ and $\Xi_{r2}$ in memory and changing the order of reading memory according to mapping information.

At the time of the repeated operations, equalization is performed instead of using the reception-data vector shown in the expression (3), using the residual (Q) after the cancelling shown in the expression (2), and the signals, which are reconverted by IDFT units 142 and 143 into time domain signals for each pseudo transmission-data vector after the DFT units 137 to 140 convert time-domain replicas into frequency-domain replicas and the spatial-and-spectral mapping unit 141 performs mapping. In this case, replicas of the pseudo transmission-data vectors 1 and 2 to be input to the IDFT units 142 and 143 can be expressed as the following expressions. In the following expressions, S'$_{T1}$ denotes the pseudo transmission-data vector 1 (shaded signal stream B1 to B4 shown in FIG. 7), S'$_{T2}$ denotes the pseudo transmission-data vector 2 (white signal stream B5 to B8 shown in FIG. 7), respectively. The base station device 510 of the second embodiment reconfigures received signals for each pseudo transmission-data vector using these replicas, and thereby performs MMSE equalization using an expression (22).

$$S'_{T1} = \begin{bmatrix} S'_3(1) \\ S'_2(2) \\ S'_1(3) \\ S'_1(4) \end{bmatrix} \quad (20)$$

$$S'_{T2} = \begin{bmatrix} S'_4(1) \\ S'_3(2) \\ S'_4(3) \\ S'_2(4) \end{bmatrix} \quad (21)$$

$$z_{Tn} = (1 + \gamma_{Tm}\delta_{Tn})^{-1}[\gamma_{Tn}s'_{Tn} + F^H \Psi_{Tn} Q] \quad (22)$$

In the above expressions, $\gamma_{Tn}$ and $\delta_{Tn}$ denote real numbers used when tap coefficients are calculated. Similarly, $\Psi_{Tn}$ denotes a complex square matrix having a size of the DFT block length, which are used when tap coefficients are calculated. $z_{Tn}$ denotes a signal for each pseudo transmission-data vector, which is output from the signal equalizing-and-demultiplexing unit 115. n of the suffix Tn corresponds to the number of the pseudo transmission-data vector, which is 1 or 2 in the second embodiment.

Thus, the mixed signals to be transmitted from multiple transmission antennas are regarded as pseudo transmission data, thereby enabling equalization using the expression (22) even when the spatial-and-spectral mapping of the present invention is performed. In this case, signals equalized in the time domain are output from the signal equalizing-and-demultiplexing unit 115 for each pseudo transmission data.

The signals equalized for each pseudo transmission data are input to the DFT units 116 and 117, converted into frequency-domain signals, and then input to spatial-and-spectral demapping unit 118. In this case, the equalized pseudo transmission-data vector 1 (shaded signal stream B1 to B4 shown in FIG. 7) and the equalized pseudo transmission-data vector 2 (white signal stream B5 to B8 shown in FIG. 7) are input to the DFT units 116 and 117, respectively. Based on the spectral mapping information, the spatial-and-spectral demapping unit 118 performs demapping to group signals transmitted from each transmission antenna of each user. Since signals are transmitted from the two users using the total number of four transmission antennas, the spatial-and-spectral demapping unit 118 groups signals into four signal streams.

Then, the IDFT units 119 to 122 convert the respective signal streams demapped in the spatial-and-spectral directions into time-domain signals. According to the configuration, multiple signal streams subjected to the spatial-and-spectral mapping of the present invention can be grouped into signal streams transmitted from the respective transmission antennas and then be subjected to IDFT. Then, the signal streams subjected to the IDFT are converted by the P/S converters 123 and 124 into serial signals for each user, and then subjected to demodulation and decoding. In this case, the operations up to one performed by the P/S converters 123 and 124 are performed in units of OFDM symbols. The following operations, especially decoding, is performed in units by which error correction coding is performed (usually, in units of packets or frames).

The decoders 127 and 128 calculate LLRs (Log Likelihood Ratios) indicative of the reliability of the reception data subjected to error correction. The repetition controllers 129 and 130 receiving the LLRs determine whether or not the repeated operations have been performed a predetermined number of times. If the repeated operations have been performed the predetermined number of times, the repetition controllers 129 and 130 output the LLRs to the determining units 131 and 132, respectively. If the repeated operations have not yet been performed the predetermined number of times, the repetition controllers 129 and 130 output the LLRs to the replica generators 133 and 134, and then the routine returns to the operation of generating replicas of the received signals. If it is assumed that a CRC (Cyclic Redundancy Check) code is used, the repetition controllers 129 and 130 may be configured to perform CRC check of the reception data, and to end the repeated operations if no error is detected.

The replica generators 133 and 134 generate signal replicas (replicas of transmitted signals) corresponding to the LLRs of the respective bits. The generated replicas pass through the S/P converters 135 and 136, and then converted by the DFT units 137 to 140 into frequency-domain replicas of the signals transmitted from the respective transmission antennas. Although it has been explained above that the operations after the demodulation are performed in units of packets or frames, the operations from the DFT units 137 to 140 are performed in units of OFDM symbols again.

Similar to the mapping on the transmitting side, the spatial-and-spectral mapping unit 141 performs mapping of the present invention on the frequency-domain replicas generated in this manner based on mapping information received from the spectrum determining unit 146. Then, the replicas (S') subjected to the spatial-and-spectral mapping are input to the signal equalizing-and-demultiplexing unit 115 and the channel multiplier 144, respectively. The signal equalizing-and-demultiplexing unit 115 receiving the replicas (S') after the spatial-and-spectral mapping reconfigures received signals corresponding to the pseudo transmission-data vectors 1 and 2 using these replicas, and uses the reconfigured received signals for equalization of the respective pseudo transmission-data vectors. To generate replicas of received signals to be subtracted from received signals by the canceller 114, the channel multiplier 144 multiples the replicas after the spatial-and-spectral mapping by the virtual channel matrix ($\Xi$ shown in the expression (17)) in consideration of the mapping. Then, replicas ($\Xi S'$) of the received signals output from the channel multiplier 144 are input to the canceller 114, and the aforementioned subtraction expressed by the expression (2) is performed.

The base station device 510 of the second embodiment repeats a series of operations, such as the cancelling of replicas, the equalization, the spatial-and-spectral demapping, the decoding, and the generation of replicas, and thereby gradually increases the reliability of the decoded bits. After the series of operations is repeated the predetermined number of times, the determining units 131 and 132 perform hard determination on bits, and thereby transmission data is reproduced. According to the configuration of the reception device, the signals on which multiple users perform spatial-and-spectral mapping can be demultiplexed to decode respective transmission data pieces.

The base station device of the second embodiment includes the interference power estimator 147 that measures the power of an unknown interference signal received from another cell or the like for each subcarrier and for each transmission antenna. The measured power is used for calculation performed by the spectrum determining unit 146 using the expression (1) (as $\Sigma m(k)$). Additionally, the spectrum determining unit 146 determines subcarriers to be used for transmission from each antenna of each mobile station device 500 or 501 based on the control flow of the first embodiment shown in FIG. 1. The spectrum determining unit 146 outputs the mapping information indicative of the determined subcarriers to the transmitter 148. The transmitter 148 transmits the mapping information to the mobile station device 500 or 501 of the first embodiment.

Regarding the above equalization, equalization with respect to the two pseudo transmission-data vectors shown in FIG. 7 is performed not only in the first operation but also in the second-or-later operation. Alternatively, the signal streams transmitted from the respective transmission antennas may be regarded as (pseudo) transmission-data vectors for equalization in the second-or-later operation. In this case, equalization with respect to four (pseudo) transmission-data vectors is performed. Therefore, four DFT units, such as the elements 116 and 117, and four IDFT units, such as the elements 142 and 143, are required. Additionally, the virtual subchannel matrices ($\Xi_{T1}$ and $\Xi_{T2}$) are required to be regenerated according to how transmission data vectors are treated. Alternatively, equalization with respect to four transmission-data vectors may be performed in every operation from the first operation. In this case, the transmission-data vectors are signal streams transmitted from the respective transmission antennas. Even in this case, calculation using the expression (22) has to be performed four times.

Figure 9:
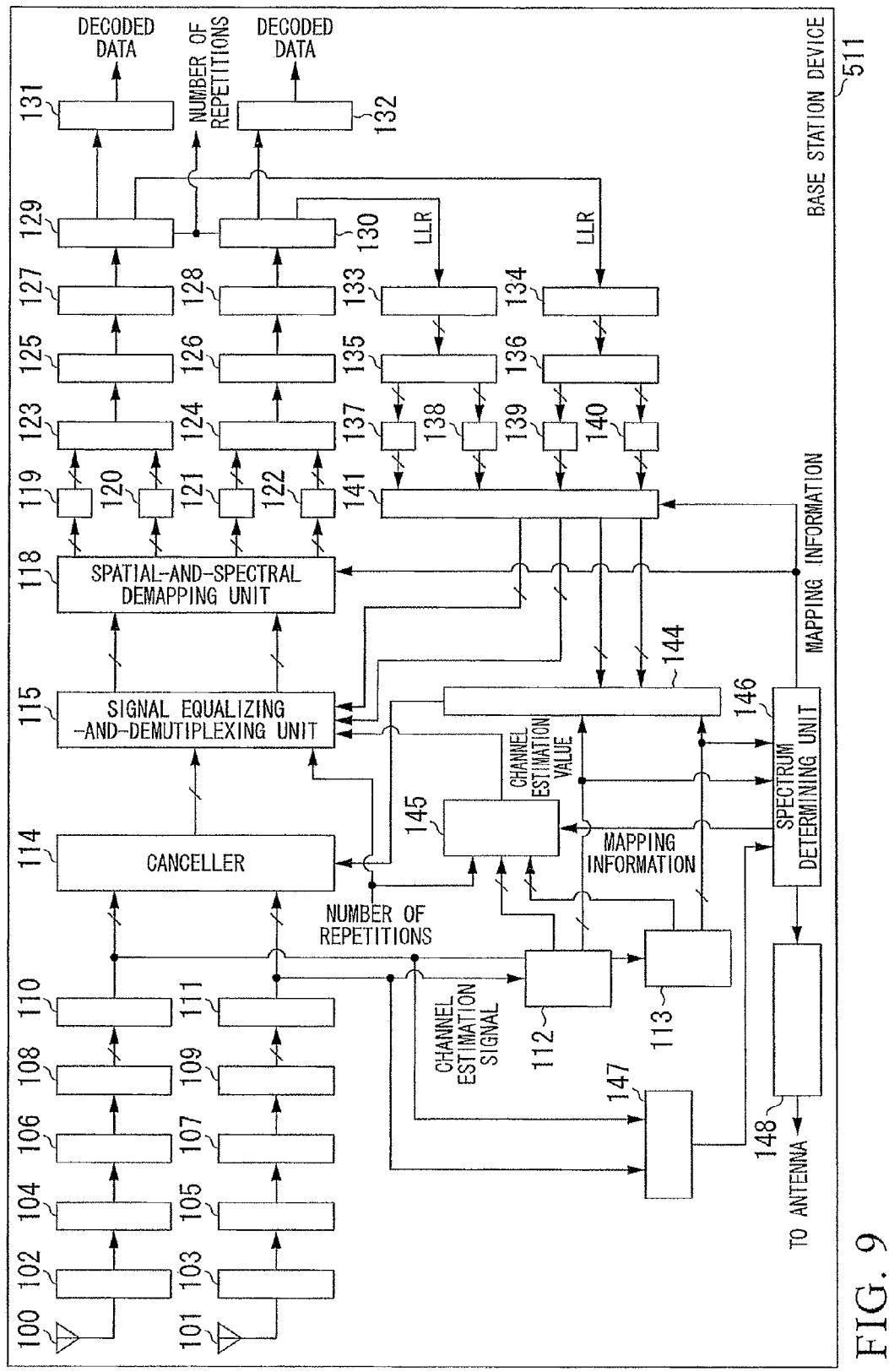
FIG. 9 is a schematic block diagram illustrating a configuration of a base station device 511 according to the second embodiment.

FIG. 9 is a schematic block diagram illustrating a configuration of a base station device 511 having a different configuration as that shown in FIG. 6. Like reference numerals denote like blocks in FIGS. 6 and 9. The base station device 511 shown in FIG. 9 has a configuration such that the DFT units 116 and 117 and the IDFT units 142 and 143 are deleted from the configuration of the base station device 510 shown in FIG. 6. The difference is whether an input to the signal equalizing-and-demultiplexing unit 115 is a time-domain signal or a frequency-domain signal. Frequency-domain replicas or the like may be input to perform the MMSE equalization as shown in FIG. 9.

A block that performs interleaving with respect to the encoded bits is not included in the transmission device of the first embodiment. A block that performs deinterleaving with respect to the demodulated bits is not included in the reception device of the second embodiment. However, if these blocks are added, much better characteristics can be achieved. This is because a probability density function of each encoding bit at the time of reception can be approximated by the Gaussian distribution, thereby increasing the reliability of turbo equalization that has been theoretically analyzed under the assumption that the function is originally the Gaussian distribution.

Third Embodiment

The first and second embodiments have explained the case where spatial-and-spectral mapping is performed under the condition that there are always two signals to be multiplexed onto each subcarrier. As explained in those embodiments, if signals interfering with one another can be cancelled on the receiving side, spectral mapping may be independently performed for each antenna on each transmitting side in consideration of only a channel variation. The following embodiment explains a mapping method of each transmission antenna independently determining a spectrum to be used when the number of signals to be multiplexed is not limited as in the first and second embodiments.

Figure 10:
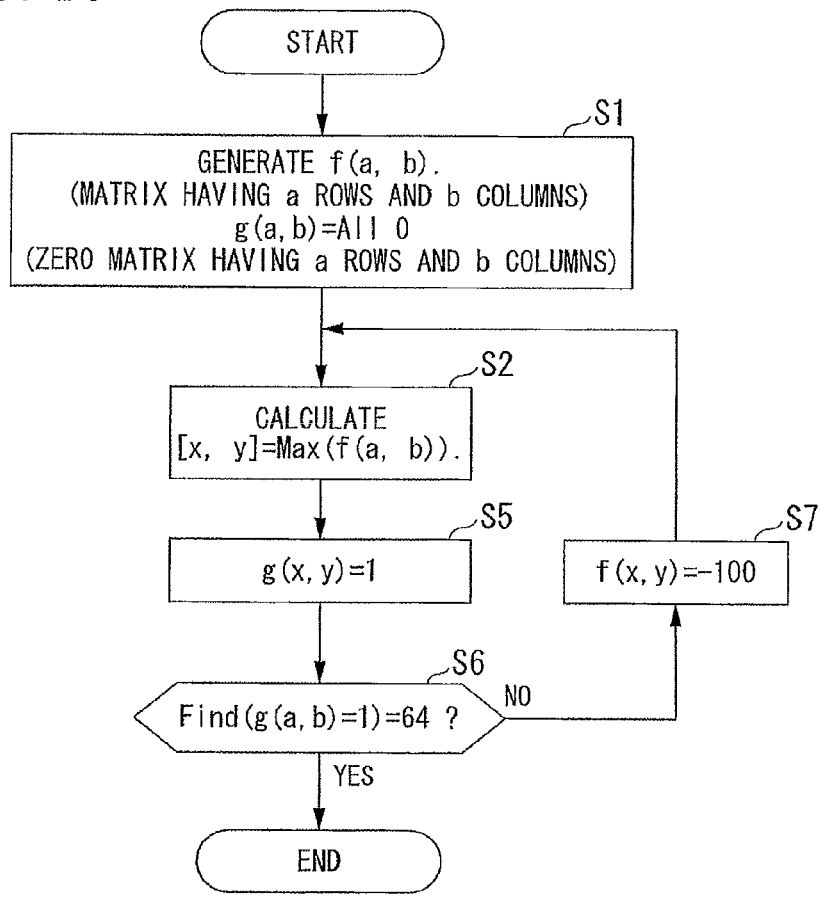
FIG. 10 is a flowchart indicative of a control flow illustrating a method of selecting subcarriers to be used for transmission of data according to a third embodiment of the present invention.

FIG. 10 illustrates a flow for determining subcarriers to be used for implementing the third embodiment. Like reference numerals denote like operations in FIGS. 1 and 10. The difference from FIG. 1 is that the operation in step S4 is deleted. This difference depends on the fact that the limit of the number of signals to be multiplexed onto one subcarrier is deleted. By determining a spectrum to be used for each transmission antenna in this manner, a mapping achieving a more-flexible and higher diversity effect can be achieved compared to the mapping of the first and second embodiments.

Figure 11:
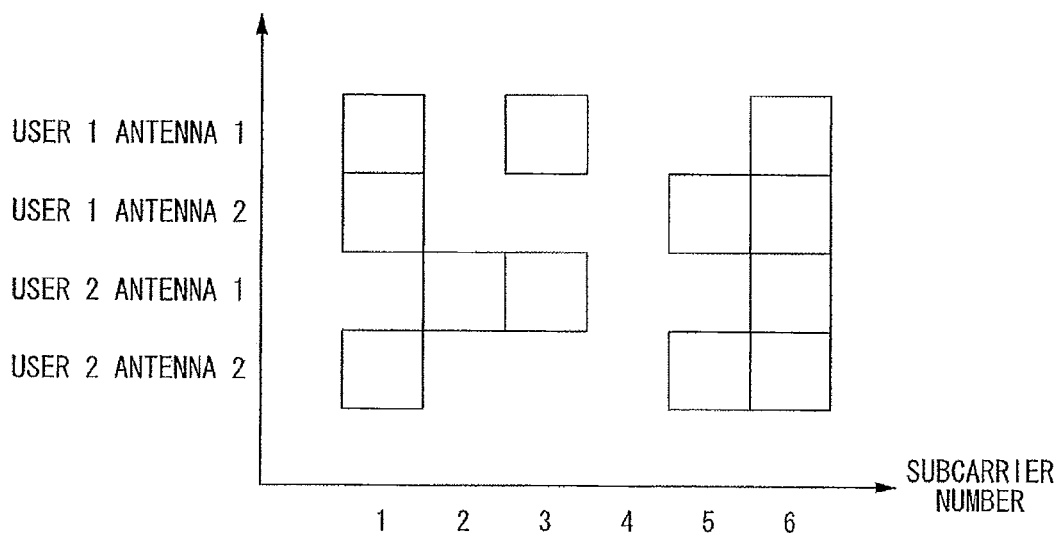
FIG. 11 illustrates an example result of subcarrier selection according to the third embodiment.

FIG. 11 illustrates a relationship between transmission antennas and spectra to be used when it is assumed for simplicity that the number of subcarriers to be used is 6, and mapping is performed for two users each having two transmission antennas based on the control flow shown in FIG. 10.

Figure 12:
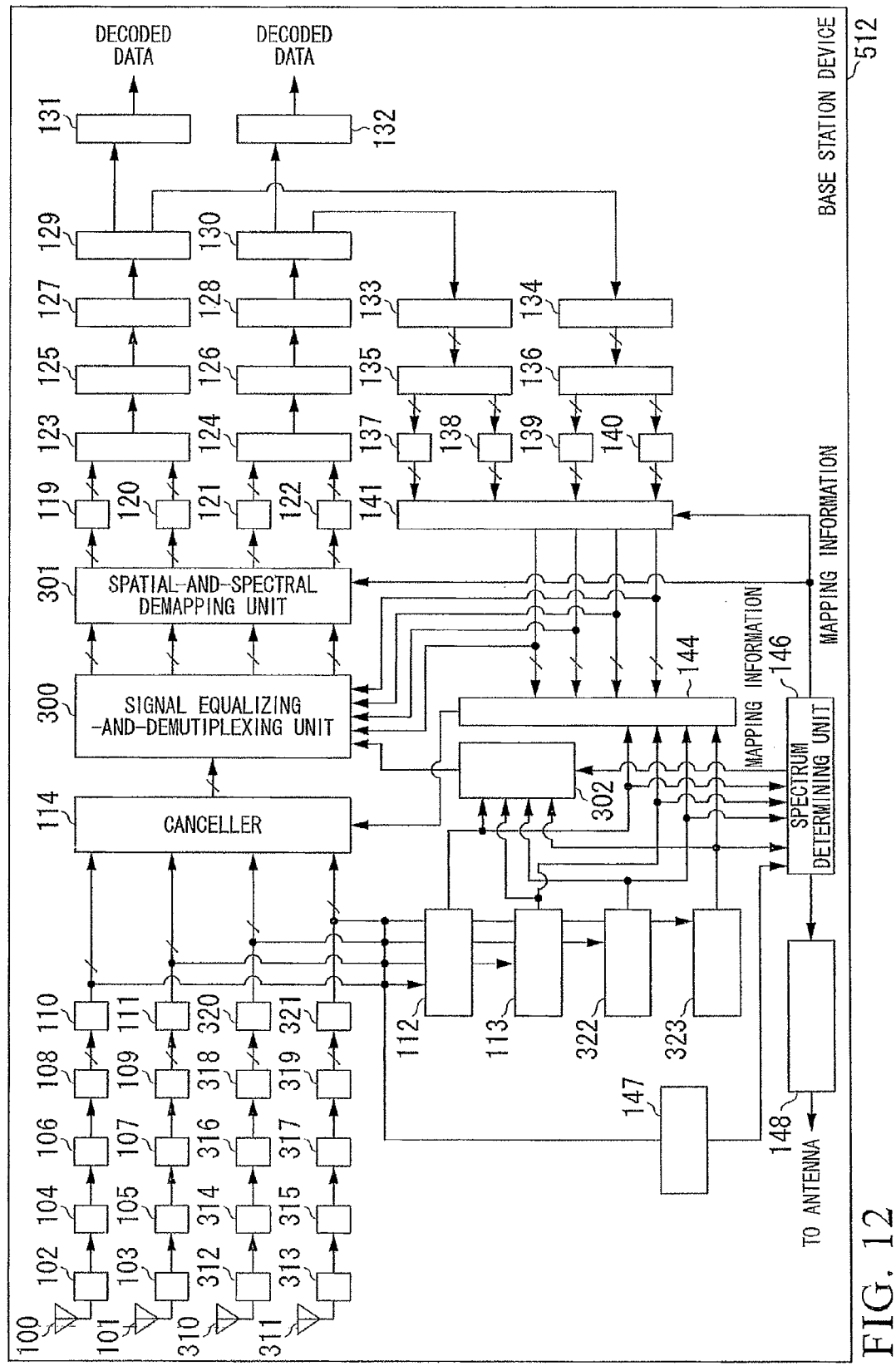
FIG. 12 is a schematic block diagram illustrating a configuration of a base station device 512 according to the third embodiment.

FIG. 12 is a schematic block diagram illustrating a configuration of a base station device 512 receiving a signal subjected to such a spatial-and-spectral mapping. Like reference numerals denote like blocks in FIGS. 9 and 12. When spatial-and-spectral mapping is performed using the control flow of the third embodiment shown in FIG. 10, transmission from a maximum of four antennas is performed using the same spectrum. For this reason, the base station device 512 of the third embodiment includes four reception systems (the antenna 100 to the DFT unit 110, the antenna 101 to the DFT unit 111, the antenna 310 to the DFT unit 320, and the antenna 311 to the DFT unit 321) so as to demultiplex a signal generated by multiplexing a maximum of four signals. Compared to the configuration shown in FIG. 9, channel estimators (channel estimators 322 and 323) are added, and there are four channel estimators.

Figure 13:
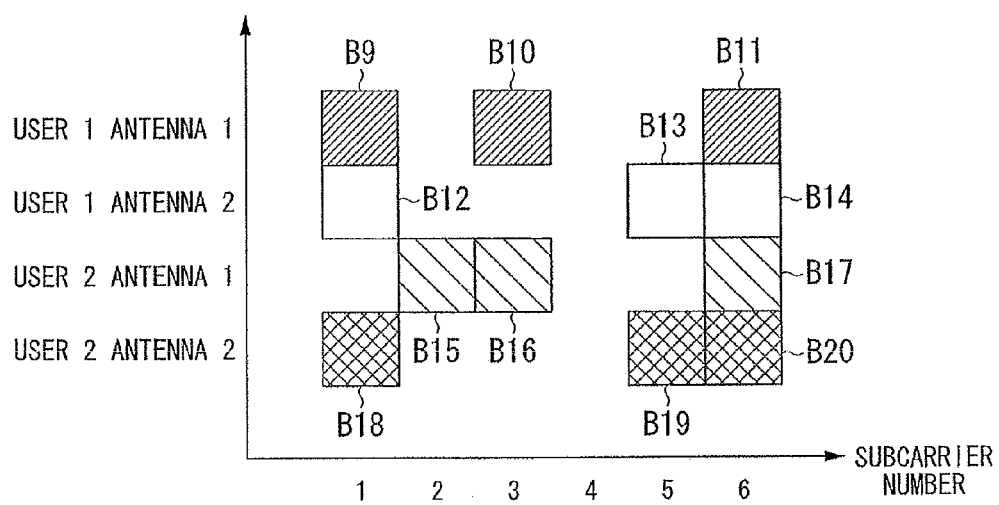
FIG. 13 illustrates an example result of subcarrier selection and transmission-data vectors targeted for equalization according to the third embodiment.

An operation of each block of the base station device 512 is similar to those of the base station devices 510 and 511. However, (pseudo) transmission-data vectors used for the signal equalizing-and-demultiplexing unit 300 equalizing signals subjected to the spatial-and-spectral mapping of the third embodiment are signal streams transmitted from the respective transmission antennas. As shown in FIG. 13, those signals are four signal streams expressed by shaded blocks B9, B10, and B11, white blocks B12, B13, and B14, blocks marked with diagonal lines B15, B16, and B17, and hatched blocks B18, B19, and B20.

The signal equalizing-and-demultiplexing unit 300 performs an operation similar to equalization explained in the second embodiment on these transmission-data vectors. Regarding the repeated operations, equalization is performed using a result of the canceller 200 subtracting, from all received signals, replicas of all the received signals generated in consideration of mapping on the transmitting side, and received signal replicas of the respective transmission-data vectors reconfigured from the replicas of the respective transmission-data vectors and channel variations (virtual subchannel matrices) to which the respective transmission-data vectors are subjected.

The equalized signals are output as signal streams transmitted from the respective transmission antennas. For this reason, those signals are regarded as ones having already been spatially demapped. Therefore, the spectrum demapping unit 301 performs spectrum demapping for each of the signal streams (transmission-data vectors) based on mapping information. Additionally, when replicas of transmitted signals are generated from LLRs of bits subjected to error correction coding, signals input to the spectral mapping unit 302 through the DFT units 213 to 216 are signal streams (transmission-data vectors) transmitted from the respective transmission antennas. For this reason, the spectral mapping unit 302 may perform only spectral mapping on the respective transmission-data vectors without considering spatial mapping.

According to the configuration of the base station device 512, each of the transmission-data vectors can be demultiplexed to decode corresponding data even when a spectrum to be used is determined independently for each transmission antenna based on the control flow of the third embodiment.

Fourth Embodiment

The first to third embodiments have explained the case where the channel matrix generated by the base station devices 510, 511, and 512 from frequency responses among transmission-and-reception antennas has no Rank-deficiency, i.e., the case where the number of reception antennas is equal to or greater than that of transmission streams. However, a fourth embodiment explains a demodulation method in a case of Rank-deficiency, i.e., a case where the number of reception antennas is smaller than that of transmission streams. It is assumed that the number of transmission users, the number of transmission antennas of each user, and positions and the number of subcarriers to be used are the same as those in the third embodiment. The number of reception antennas is assumed to be 2.

It is assumed that data is configured as packets each including multiple symbols. Additionally, it is assumed that error correction coding is performed in units of packets each corresponding to one user, and that 3 data pieces are transmitted from each transmission-antenna, i.e., a total of 6 data pieces are transmitted by one symbol. Further, it is assumed that 3 subcarriers are used for 1 symbol and for each transmission antenna.

Figure 14:
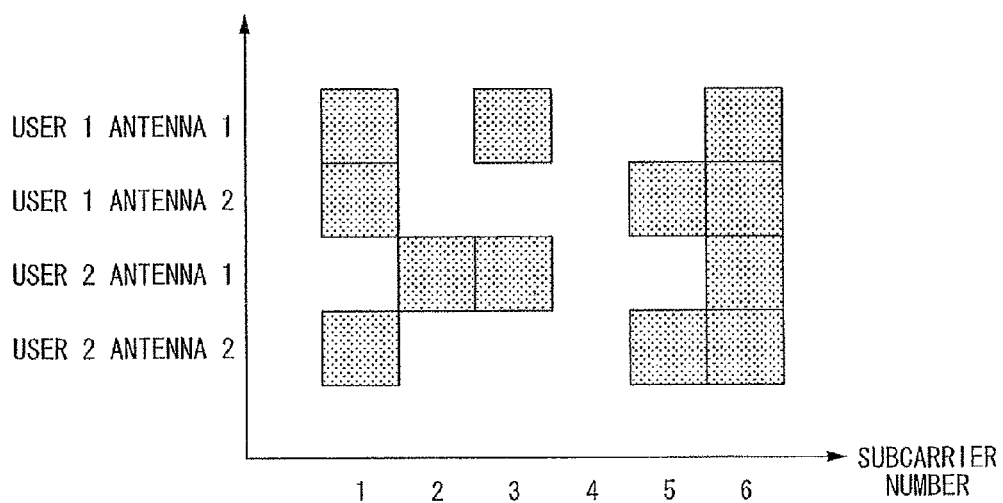
FIG. 14 illustrates an example result of subcarrier selection according to a fourth embodiment of the present invention.

FIG. 14 illustrates a relationship between transmission antennas and subcarriers to be used at the time of transmission. $S_{x\text{-}y}(p)$ denotes data generated by a transmitted signal being converted into frequency signals. A frequency vector $S_{x\text{-}y}$ of transmitted signals is data generated by a time vector $D_{x\text{-}y}$ of transmitted signals being converted into frequency vectors. x and y denote the user number and the antenna number, respectively. p denotes a natural number indicative of an index of data. Frequency-domain transmitted signal vectors S1 and S2 are defined as expressions (23) and (24) based on the allocation shown in FIG. 14.

$$S1 = \begin{bmatrix} S_{1\text{-}1}(3p-2) \\ 0 \\ S_{1\text{-}1}(3p-1) \\ 0 \\ 0 \\ S_{1\text{-}1}(3p) \\ S_{1\text{-}2}(3p-2) \\ 0 \\ 0 \\ 0 \\ S_{1\text{-}2}(3p-1) \\ S_{1\text{-}2}(3p) \end{bmatrix} \quad (23)$$

$$S2 = \begin{bmatrix} 0 \\ S_{2\text{-}1}(3p-2) \\ S_{2\text{-}1}(3p-1) \\ 0 \\ 0 \\ S_{2\text{-}1}(3p) \\ S_{2\text{-}2}(3p-2) \\ 0 \\ 0 \\ 0 \\ S_{2\text{-}2}(3p-1) \\ S_{2\text{-}2}(3p) \end{bmatrix} \quad (24)$$

The channel matrices $\Xi 1$ and $\Xi 2$ for each user are defined as expressions (25) and (26) where n denotes a transmission antenna (transmission antennas 1 and 2 of the user 2 are assumed to be transmission antennas 3 and 4 for convenience), j denotes a reception antenna, k denotes the subcarrier number, $\Xi_{jn}(k)$ denotes a frequency response for each subcarrier. In this case, frequency-domain data R received by a receiver can be shown in an expression (27).

$$\Xi 1 = \begin{bmatrix} \Xi_{11}(1) & & & & \Xi_{12}(1) & & & \\ 0 & & & 0 & 0 & & 0 & \\ & \Xi_{11}(3) & & & & 0 & & \\ & & 0 & & & & 0 & \\ 0 & & & 0 & 0 & & & \Xi_{12}(5) \\ & & \Xi_{11}(6) & & & & & \Xi_{12}(6) \\ \Xi_{21}(1) & & & & \Xi_{22}(1) & & & \\ 0 & & & 0 & 0 & & 0 & \\ & \Xi_{21}(3) & & & & 0 & & \\ & & 0 & & & & 0 & \\ 0 & & & 0 & 0 & & & \Xi_{22}(5) \\ & & \Xi_{21}(6) & & & & & \Xi_{22}(6) \end{bmatrix} \quad (25)$$

$$\Xi 2 = \begin{bmatrix} 0 & & & & \Xi_{14}(1) & & & \\ \Xi_{13}(2) & & & 0 & 0 & & 0 & \\ & \Xi_{13}(3) & & & & 0 & & \\ & & 0 & & & & 0 & \\ 0 & & & 0 & 0 & & & \Xi_{14}(5) \\ & & \Xi_{13}(6) & & & & & \Xi_{14}(6) \\ 0 & & & & \Xi_{24}(1) & & & \\ \Xi_{23}(2) & & & 0 & 0 & & 0 & \\ & \Xi_{23}(3) & & & & 0 & & \\ & & 0 & & & & 0 & \\ 0 & & & 0 & 0 & & & \Xi_{24}(5) \\ & & \Xi_{23}(6) & & & & & \Xi_{24}(6) \end{bmatrix} \quad (26)$$

where 0 is set to frequency responses of subcarriers not used for transmission.

$$R = \begin{bmatrix} R_1(1) \\ R_1(2) \\ R_1(3) \\ R_1(4) \\ R_1(5) \\ R_1(6) \\ R_2(1) \\ R_2(2) \\ R_2(3) \\ R_2(4) \\ R_2(5) \\ R_2(6) \end{bmatrix} = \Xi_1 S1 + \Xi_2 S2 \qquad (27)$$

Regarding $R_j(k)$, j denotes the reception antenna number, and k denotes the subcarrier number. Expression concerning noise is omitted for simplicity.

When a virtual channel matrix $\Xi$ having the same order can be generated by exchanging elements between the channel matrices $\Xi_1$ and $\Xi_2$, i.e., when a matrix $\Xi$ free of Rank deficiency can be generated, data can be demodulated by the method of the second embodiment. However, when a matrix $\Xi$ free of Rank deficiency cannot be generated by exchanging elements between the channel matrices $\Xi_1$ and $\Xi_2$ as in the fourth embodiment, data cannot be demodulated by the method of the second embodiment. The reason that a matrix $\Xi$ free of Rank deficiency cannot be generated is that a larger number of streams than that of the reception antennas is transmitted on each subcarrier. In other words, the subcarriers 1 and 6 are the causes.

Hereinafter, an embodiment of a base station device 513 that can demodulate data transmitted under this condition is explained.

Figure 15:
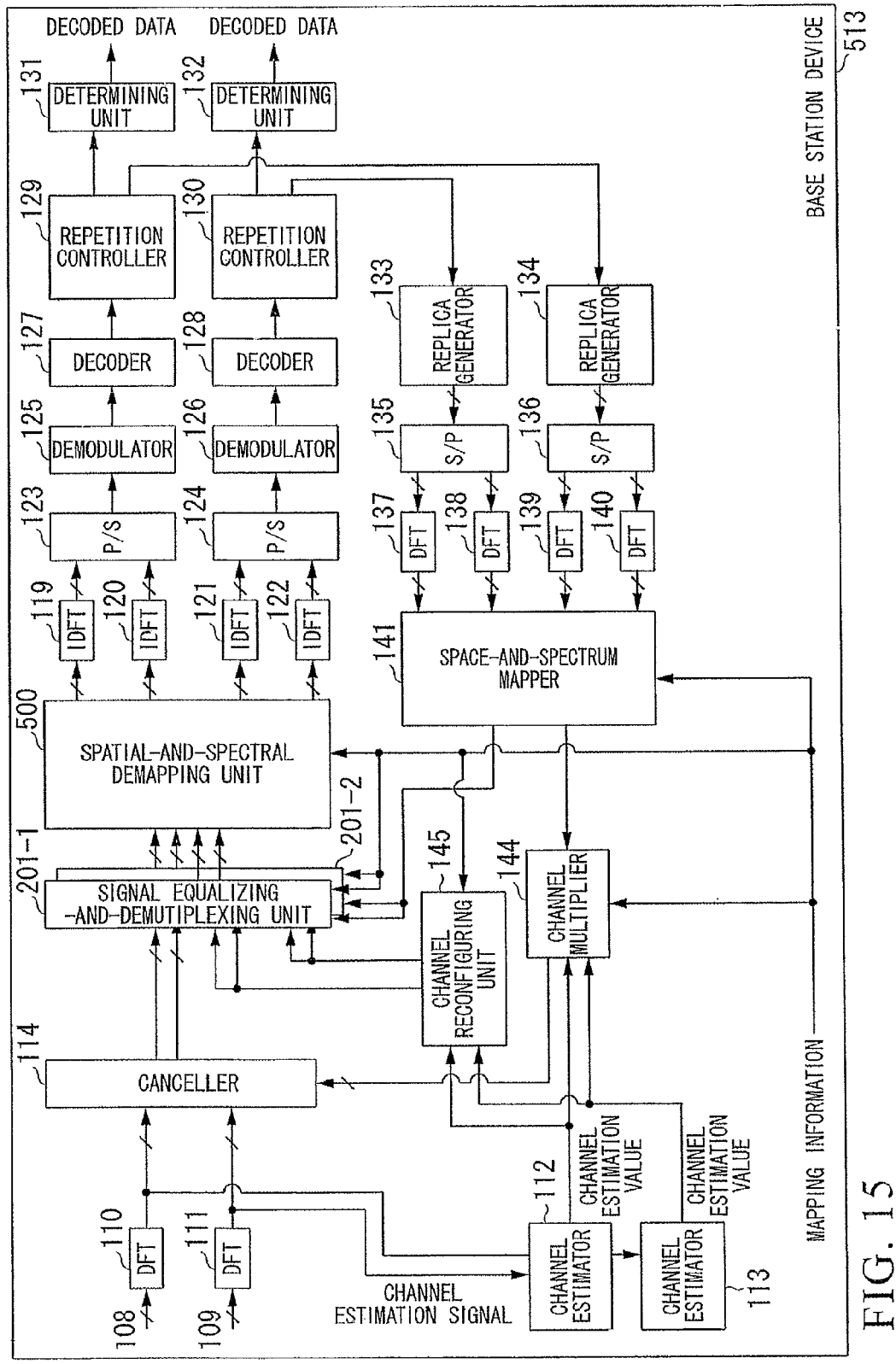
FIG. 15 is a schematic block diagram illustrating a configuration of a base station device 513 according to the fourth embodiment.

FIG. 15 is a schematic block diagram illustrating a configuration of the base station device 513 according to the fourth embodiment. Only blocks that are required for reception and are in the state after the base station device 513 has firstly performed frequency conversion on reception data are shown for simplification of explanations. Like reference numerals in FIGS. 9 and 15 have the same function. The difference from FIG. 9 is that the signal equalizing-and-demultiplexing unit is changed to two signal equalizing-and-demultiplexing units. Additionally, the spatial-and-spectral demapping unit 118 has a different function, and therefore is shown in a spatial-and-spectral demapping unit 500. It is assumed that MMSE equalization is performed for equalization. Signals required for the MMSE equalization are residual signals after subtracting replica signals from received signals, a channel matrix $\Xi$ among transmission-and-reception antennas, a channel matrix $\Xi_n$ (subchannel matrix) from a desired antenna (antenna from which data is to be calculated), and a replica signal S' (frequency-domain data) for reconfiguring a desired signal.

The reason that the base station device 513 includes the two signal equalizing-and-demultiplexing units 201-1 and 201-2 is that the channel matrix has Rank-deficiency, thereby requiring multiple operations. To distinguish between two operation systems, one operation system is called operation system 1 and the other operation system is called operation system 2.

Operations for received signals are basically similar to those shown in FIG. 9, but explanations thereof are given with explanations of different operations of the fourth embodiment. It is assumed that frequency responses among transmission-and-reception antennas have already been calculated using some method.

Received signals are subjected to frequency conversion in units of symbols and then input to the canceller 114. These signals are expressed as an expression (27). Similar to the above embodiments, the base station device 513 performs the repeated operations in units of packets (by which error correction cording is performed). Since a replica is not generated in the first operation, an output of the channel multiplier 144 is 0. In the second-or-later operation, replicas of transmitted signals calculated using LLRs of respective data pieces are generated, and therefore replica signals are subtracted from the received signals. When replicas of the transmitted signals are perfectly reproduced, signals after the subtraction include only noise.

Figure 16A:
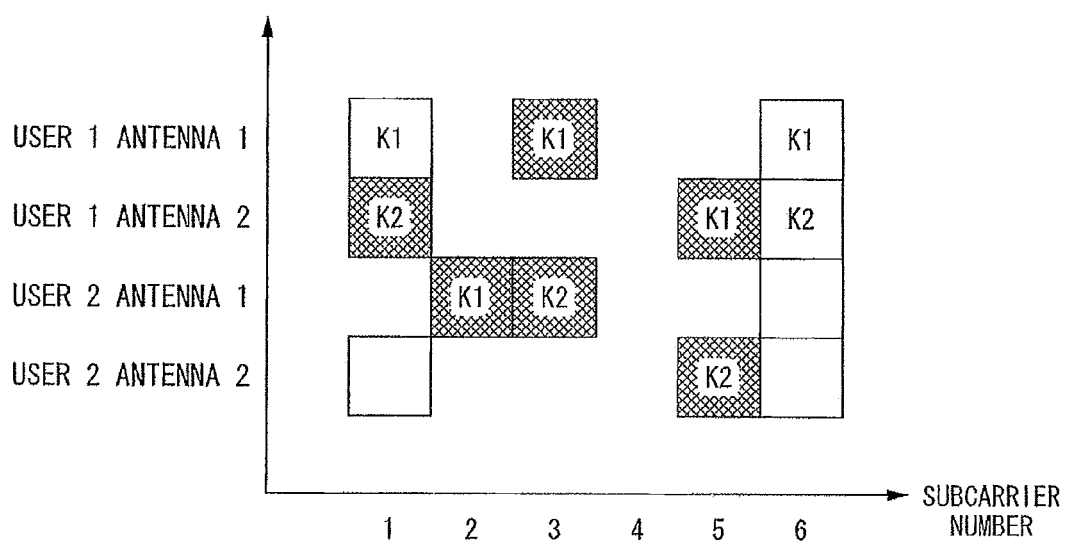
FIG. 16A illustrates subcarriers targeted for operations of an operation system 1 according to the fourth embodiment.
Figure 16B:
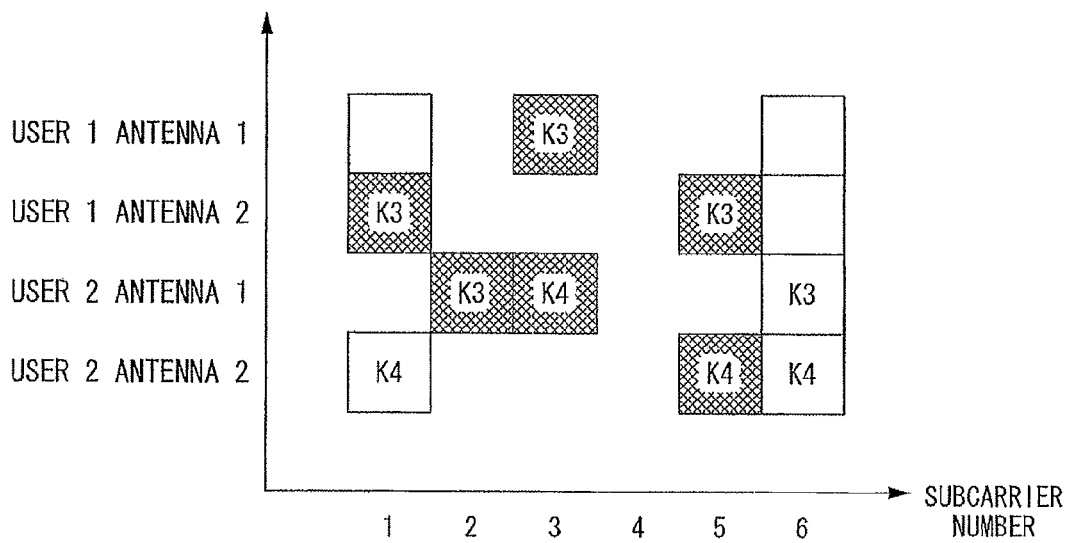
FIG. 16B illustrates subcarriers targeted for operations of an operation system 2 according to the fourth embodiment.

The signal equalizing-and-demultiplexing units 201-1 and 201-2 group the received signals into two groups for two operation systems. In other words, regarding the signal equalizing-and-demultiplexing unit 201-1 of the operation system 1, only signals assigned a code K1 or K2 are transmitted as shown in FIG. 16A. Regarding the signal equalizing-and-demultiplexing unit 201-2 of the operation system 2, only signals assigned a code K3 or K4 are transmitted as shown in FIG. 16B. Therefore, signals assigned no code shown in FIG. 16A or 16B are regarded as noise in each operation system.

When pseudo transmission-data vectors to be processed in each operation system are assumed to be Ss1 and Ss2, these vectors are expressed as expressions (28) and (29). Virtual channel matrices $\Xi_{s1}$ and $\Xi_{s2}$ corresponding to the respective pseudo transmission-data vectors are expressed as the following expressions (30) and (31).

$$Ss1 = \begin{bmatrix} S_{1-1}(3p-2) \\ S_{2-1}(3p-2) \\ S_{1-1}(3p-1) \\ 0 \\ S_{1-2}(3p-1) \\ S_{1-1}(3p) \\ S_{1-2}(3p-2) \\ 0 \\ S_{2-1}(3p-1) \\ 0 \\ S_{2-2}(3p-1) \\ S_{1-2}(3p) \end{bmatrix} \qquad (28)$$

$$Ss2 = \begin{bmatrix} S_{1-2}(3p-2) \\ S_{2-1}(3p-2) \\ S_{1-1}(3p-1) \\ 0 \\ S_{1-2}(3p-1) \\ S_{2-1}(3p) \\ S_{2-2}(3p-2) \\ 0 \\ S_{2-1}(3p-1) \\ 0 \\ S_{2-2}(3p-1) \\ S_{2-2}(3p) \end{bmatrix} \quad (29)$$

$$\Xi_{s1} = \begin{bmatrix} \Xi_{11}(1) & & & & \Xi_{12}(1) & & & \\ & \Xi_{13}(2) & & 0 & & 0 & & 0 \\ & & \Xi_{11}(3) & & & & \Xi_{13}(3) & \\ & & & 0 & & & & 0 \\ & 0 & & \Xi_{12}(5) & & 0 & & \Xi_{14}(5) \\ & & & & \Xi_{11}(6) & & & \Xi_{12}(6) \\ \Xi_{21}(1) & & & & \Xi_{22}(1) & & & \\ & \Xi_{23}(2) & & 0 & & 0 & & 0 \\ & & \Xi_{21}(3) & & & & \Xi_{23}(3) & \\ & & & 0 & & & & 0 \\ & 0 & & \Xi_{22}(5) & & 0 & & \Xi_{24}(5) \\ & & & & \Xi_{21}(6) & & & \Xi_{22}(6) \end{bmatrix} \quad (30)$$

$$\Xi_{s2} = \begin{bmatrix} \Xi_{12}(1) & & & & \Xi_{14}(1) & & & \\ & \Xi_{13}(2) & & 0 & & 0 & & 0 \\ & & \Xi_{11}(3) & & & & \Xi_{13}(3) & \\ & & & 0 & & & & 0 \\ & 0 & & \Xi_{12}(5) & & 0 & & \Xi_{14}(5) \\ & & & & \Xi_{13}(6) & & & \Xi_{14}(6) \\ \Xi_{22}(1) & & & & \Xi_{24}(1) & & & \\ & \Xi_{23}(2) & & 0 & & 0 & & 0 \\ & & \Xi_{21}(3) & & & & \Xi_{23}(3) & \\ & & & 0 & & & & 0 \\ & 0 & & \Xi_{22}(5) & & 0 & & \Xi_{24}(5) \\ & & & & \Xi_{23}(6) & & & \Xi_{24}(6) \end{bmatrix} \quad (31)$$

These virtual channel matrices are generated by the channel reconfiguring unit 145. These virtual channel matrices are input to the signal equalizing-and-demultiplexing units 201-1 and 201-2, subjected to MMSE equalization in the respective systems, and then output.

Hereinafter, an operation of the channel reconfiguring unit 145 is explained similarly to the second embodiment. Frequency response matrices received from the respective channel estimators 112 and 113 can be expressed as expressions (32) and (33) similarly to the second embodiment. The difference from the second embodiment is the assumption that the number of subcarriers is 6. When two masking vectors MV are generated correspondingly to the pseudo transmission-data streams, which are referred to as MV1 and MV2, these vectors can be expressed as expressions (34) and (35).

$$\Xi_{r1} = \begin{bmatrix} \Xi_{11}(1) & \Xi_{11}(2) & \Xi_{11}(3) & \Xi_{11}(4) & \Xi_{11}(5) & \Xi_{11}(6) \\ \Xi_{12}(1) & \Xi_{12}(2) & \Xi_{12}(3) & \Xi_{12}(4) & \Xi_{12}(5) & \Xi_{12}(6) \\ \Xi_{13}(1) & \Xi_{13}(2) & \Xi_{13}(3) & \Xi_{13}(4) & \Xi_{13}(5) & \Xi_{13}(6) \\ \Xi_{14}(1) & \Xi_{14}(2) & \Xi_{14}(3) & \Xi_{14}(4) & \Xi_{14}(5) & \Xi_{14}(6) \end{bmatrix} \quad (32)$$

$$\Xi_{r2} = \begin{bmatrix} \Xi_{21}(1) & \Xi_{21}(2) & \Xi_{21}(3) & \Xi_{21}(4) & \Xi_{21}(5) & \Xi_{21}(6) \\ \Xi_{22}(1) & \Xi_{22}(2) & \Xi_{22}(3) & \Xi_{22}(4) & \Xi_{22}(5) & \Xi_{22}(6) \\ \Xi_{23}(1) & \Xi_{23}(2) & \Xi_{23}(3) & \Xi_{23}(4) & \Xi_{23}(5) & \Xi_{23}(6) \\ \Xi_{24}(1) & \Xi_{24}(2) & \Xi_{24}(3) & \Xi_{24}(4) & \Xi_{24}(5) & \Xi_{24}(6) \end{bmatrix} \quad (33)$$

$$MV1 = \begin{bmatrix} 1 & 0 & 1 & 0 & 0 & 1 \\ 1 & 0 & 0 & 0 & 1 & 1 \\ 0 & 1 & 1 & 0 & 0 & 0 \\ 0 & 0 & 0 & 0 & 1 & 0 \end{bmatrix} \quad (34)$$

$$MV2 = \begin{bmatrix} 0 & 0 & 1 & 0 & 0 & 0 \\ 1 & 0 & 0 & 0 & 1 & 0 \\ 0 & 1 & 1 & 0 & 0 & 1 \\ 1 & 0 & 0 & 0 & 1 & 1 \end{bmatrix} \quad (35)$$

The same operation as performed in the second embodiment is performed based on the vectors MV1 and MV2, and thereby the virtual channel matrices $\Xi_{s1}$ and $\Xi_{s2}$ can be calculated as the expressions (30) and (31). Although elements of the fourth column disappear when zero elements are deleted, 0 is inserted so as not to reduce the size of the matrix.

Similarly, the virtual subchannel matrices (36) and (37) are calculated based on the masking vector MV1.

Since the signal equalizing-and-demultiplexing units 201-1 and 201-2 of the fourth embodiment target the pseudo transmission-data vectors $S_{s1}$ and $S_{s2}$, differs from information from an actual antenna. Operations are performed in the operation system 1 under the assumption that signals allocated to upper half elements of Ss1 are transmitted from the same antenna, and that signals allocated to lower half elements of Ss1 are transmitted from the same antenna. Hereinafter, these pairs of signals are referred to as pseudo transmission-data vectors 1 and 2. Therefore, the signal equalizing-and-demultiplexing unit 201-1 performs equalization based on the channel matrix $\Xi_{s1}$ shown in the expression (30), and the virtual subchannel matrices $\Xi_{nT1}$ and $\Xi_{nT2}$ corresponding to the pseudo transmission-data vectors 1 and 2. The virtual subchannel matrices $\Xi_{nT1}$ and $\Xi_{nT2}$ are expressed as the following expressions.

$$\Xi_{nT1} = \begin{bmatrix} \Xi_{11}(1) & & & & & \\ & \Xi_{13}(2) & & 0 & & \\ & & \Xi_{11}(3) & & & \\ & & & 0 & & \\ & & 0 & & \Xi_{12}(5) & \\ & & & & & \Xi_{11}(6) \\ \Xi_{21}(1) & & & & & \\ & \Xi_{23}(2) & & 0 & & \\ & & \Xi_{21}(3) & & & \\ & & & 0 & & \\ & & 0 & & \Xi_{22}(5) & \\ & & & & & \Xi_{21}(6) \end{bmatrix} \quad (36)$$

$$\Xi_{nT2} = \begin{bmatrix} \Xi_{12}(1) & & & & & \\ & 0 & & 0 & & \\ & & \Xi_{13}(3) & & & \\ & & & 0 & & \\ & 0 & & & \Xi_{14}(5) & \\ & & & & & \Xi_{12}(6) \\ \Xi_{22}(1) & & & & & \\ & 0 & & 0 & & \\ & & \Xi_{23}(3) & & & \\ & & & 0 & & \\ & 0 & & & \Xi_{24}(5) & \\ & & & & & \Xi_{24}(6) \end{bmatrix} \quad (37)$$

At the same time, operations are performed in the operation system 2 under the assumption that signals allocated to upper half elements of Ss2 are transmitted from the same antenna, and that signals allocated to lower half elements of Ss2 are transmitted from the same antenna. Hereinafter, these pairs of signals are referred to as pseudo transmission-data vectors 3 and 4.

Since the virtual subchannel matrix $\Xi_{nT}$ is generated for each of the pseudo transmission-data vectors 1 to 4, four matrices are generated by the channel reconfiguring unit 145.

The signal equalizing-and-demultiplexing units 201-1 and 201-2 use the replica signals S', which are generated based on the pseudo transmission-data vectors 1 to 4. The signal equalizing-and-demultiplexing unit 201-1 uses a replica of the pseudo transmission-data vector 1 and a replica of the pseudo transmission-data vector 2. The signal equalizing-and-demultiplexing unit 201-2 uses a replica of the pseudo transmission-data vector 3 and a replica of the pseudo transmission-data vector 4.

FIGS. 16A and 16B illustrate outputs after signal equalization and demultiplexing, which are mapped onto a plane defined by actual user-and-transmission-antennas and subcarriers. FIG. 16A illustrates outputs of the signal equalizing-and-demultiplexing unit 201-1. FIG. 16B illustrates outputs of the signal equalizing-and-demultiplexing unit 201-2. K1 and K2 denote signals to be processed as the pseudo transmission-data vectors 1 and 2, respectively. The hatched data denote data to be simultaneously transmitted from the two systems.

The spatial-and-spectral demapping unit 500 maps the signals of K1 to K4 onto inputs of the IDFT units 116, 117, 118, and 119 in a reversed order of mapping performed at the time of transmission. At the time of mapping, two data pieces output from the two operation systems (corresponding to hatched portions shown in FIGS. 16A and 16B) are averaged. Alternatively, either one of the two outputs may be prioritized. The operation performed on data to be simultaneously output from the two systems is the function that the spatial-and-spectral demapping unit 204 does not have.

Additionally, another method may be considered in which frequency elements causing a large interference effect are not used in the first operation. In other words, frequency elements of subcarriers, such as subcarrier 1 or 6, are not used.

Figure 17:
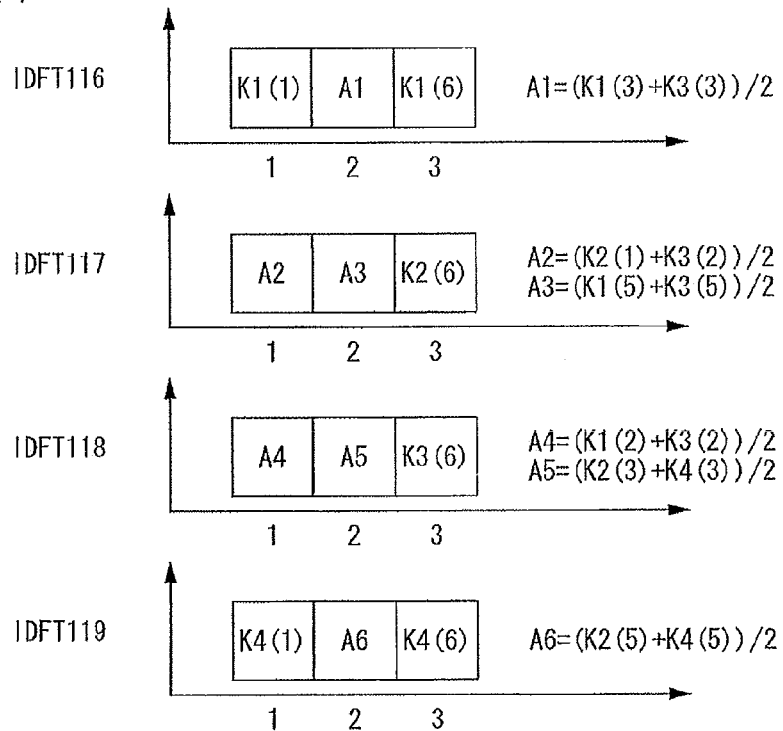
FIG. 17 illustrates data input to IDFT units 116 to 119 according to the fourth embodiment.

FIG. 17 illustrates data input to the IDFT units 116 to 119 where x of Kx(y) denotes the virtual antenna number, and y of Kx(y) denotes the subcarrier number at the time of outputting performed by the signal equalizing-and-demultiplexing unit 201-1 and 201-2. The input assigned A requires addition, and the details of the addition are shown in FIG. 17.

The operation is performed by the spatial-and-spectral demapping unit 500 in this manner, IDFT is performed for the respective signals, and then LLRs for the respective data pieces are calculated by the demodulators 122 and 123. The operations up to one performed by the demodulators 122 and 123 are performed in units of symbols. The decoders 124 and 125 generally perform error correction decoding in units by which encoding is performed. In this case, decoding is performed based on the input LLRs. Then, LLR of respective data pieces are updated, and the updated LLRs are input to the replica generators 209 and 210 except in the last repeated operation. In the last repeated operation, the updated LLRs are output to the determining units 207 and 208.

Figure 18:
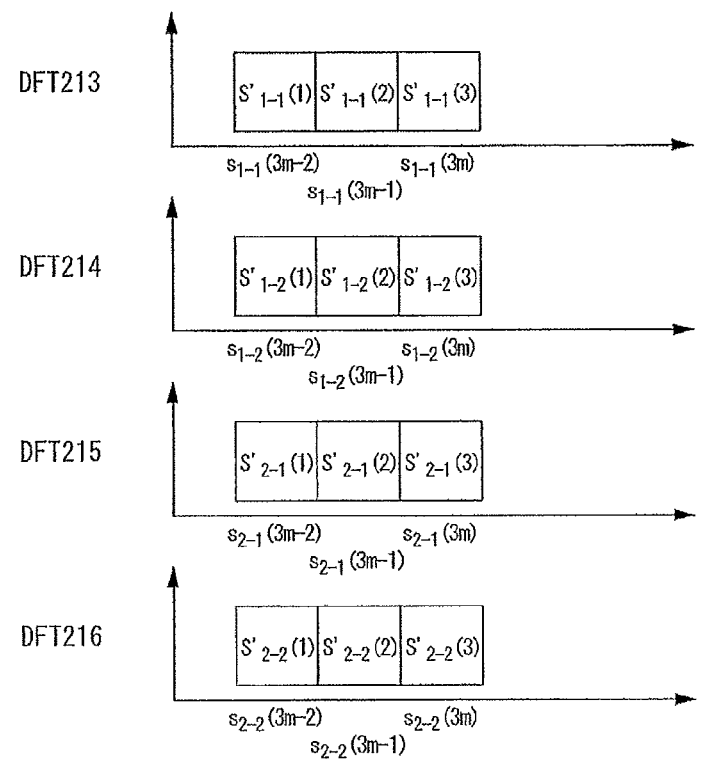
FIG. 18 illustrates outputs of DFT units 213 to 216 according to the fourth embodiment.

The replicas generated by the replica generators 209 and 210 are input to the DFT units 213, 214, 215, and 216 in units of symbols. s1-1(m) denotes a time domain replica with respect to data transmitted from the user 1 antenna 1. s1-2(m) denotes a time domain replica with respect to data transmitted from the user 1 antenna 2. s2-1(m) denotes a time domain replica with respect to data transmitted from the user 2 antenna 1. s2-2(m) denotes a time domain replica with respect to data transmitted from the user 2 antenna 2. m is an index of data. Three pieces of each replica are input to each of the DFT units 213 to 216. Outputs of the DFT units 213 to 216 are shown in FIG. 18. S' denotes a frequency-domain replica. An index indicates the user number and the antenna number.

The spatial-and-spectral demapping unit 217 performs demapping on the frequency-domain replicas according to the mapping used for transmission. The data pieces subjected to demapping are expressed as expressions (38) and (39) if expressed in the same format as the expressions (23) and (24). The data pieces shown in the expressions (38) and (39) are multiplied by the channel information shown in the expressions (25) and (26), and thereby a replica signal R' to be used for cancelling is generated as shown in an expression (40).

$$S'1 = \begin{bmatrix} S'_{1-1}(1) \\ 0 \\ S'_{1-1}(2) \\ 0 \\ 0 \\ S'_{1-1}(3) \\ S'_{1-2}(1) \\ 0 \\ 0 \\ 0 \\ S'_{1-2}(2) \\ S'_{1-2}(3) \end{bmatrix} \quad (38)$$

$$S'2 = \begin{bmatrix} 0 \\ S'_{2-1}(1) \\ S'_{2-1}(2) \\ 0 \\ 0 \\ S'_{2-1}(3) \\ S'_{2-2}(1) \\ 0 \\ 0 \\ 0 \\ S'_{2-2}(2) \\ S'_{2-2}(3) \end{bmatrix} \quad (39)$$

$$R' = \begin{bmatrix} R'_1(1) \\ R'_1(2) \\ R'_1(3) \\ R'_1(4) \\ R'_1(5) \\ R'_1(6) \\ R'_2(1) \\ R'_2(2) \\ R'_2(3) \\ R'_2(4) \\ R'_2(5) \\ R'_2(6) \end{bmatrix} = \Xi 1 S'1 + \Xi 2 S'2 \quad (40)$$

The canceller 200 subtracts the replica signal R' from the received signal R. On the other hand, the spatial-and-spectral demapping unit 500 has to generate a replica signal $S_{S1}'$ shown in an expression (41) and a replica signal $S_{S2}'$ shown in an expression (42) for each pseudo transmission-data vector required when the signal equalizing-and-demultiplexing unit 201-1 and 201-2 performs equalization.

$$S'_{s1} = \begin{bmatrix} S'_{1-1}(1) \\ S'_{2-1}(1) \\ S'_{1-1}(2) \\ 0 \\ S'_{1-2}(2) \\ S'_{1-1}(3) \\ S'_{1-2}(1) \\ 0 \\ S'_{2-1}(2) \\ 0 \\ S'_{2-2}(2) \\ S'_{1-2}(3) \end{bmatrix} \quad (41)$$

$$S'_{s2} = \begin{bmatrix} S'_{1-2}(1) \\ S'_{2-1}(1) \\ S'_{1-1}(2) \\ 0 \\ S'_{1-2}(2) \\ S'_{2-1}(3) \\ S'_{2-2}(1) \\ 0 \\ S'_{2-1}(2) \\ 0 \\ S'_{2-2}(2) \\ S'_{2-2}(3) \end{bmatrix} \quad (42)$$

The upper half elements of the replica signal $S_{S1}'$ and the lower half elements of the replica signal $S_{S1}'$ correspond to the transmitted signals from the pseudo transmission-data vectors 1 and 2, respectively. The upper half elements of the replica signal $S_{S2}'$ and the lower half elements of the replica signal $S_{S2}'$ correspond to the transmitted signals from the pseudo transmission-data vectors 3 and 4, respectively. These signals are multiplied by the virtual subchannel matrix $\Xi_{nT}$ as shown in the expression (36), and thereby desired signals to be required for equalization are reconfigured.

Since a part of signal elements have to be treated as noise in the fourth embodiment, the precision of calculating LLRs is considered to be degraded. However, the LLR improvement effect by error correction is used, thereby enabling calculation of transmission data by the repeated operations. Additionally, subcarriers having the best quality among transmission devices and transmission antennas can be used, thereby achieving high communication quality if interference is cancelled. Further, the number of streams to be mapped onto one subcarrier is not theoretically limited, thereby simplifying scheduling.

Fifth Embodiment

The fourth embodiment has explained the method of improving LLR-improvement precision by dividing the operation system into two systems and simultaneously performing the repeated operations. A fifth embodiment explains a method of sequentially performing the repeated operations. The fourth embodiment has explained the case where the signal equalizing-and-demultiplexing unit 201-1 and 201-2 generate pairs of pseudo transmission-data vectors irrespective of user data. The fifth embodiment explains a case where a pair of pseudo transmission-data vectors is basically generated for each user and for each antenna. As for the method of sequentially performing repeated operations as will be explained in the fifth embodiment, a pair of pseudo transmission-data vectors has to be set for each user. However, a pair of pseudo transmission-data vectors may be set for each user also in the fourth embodiment.

Preconditions of the fifth embodiment are the same as those of the fourth embodiment.

Figure 19:
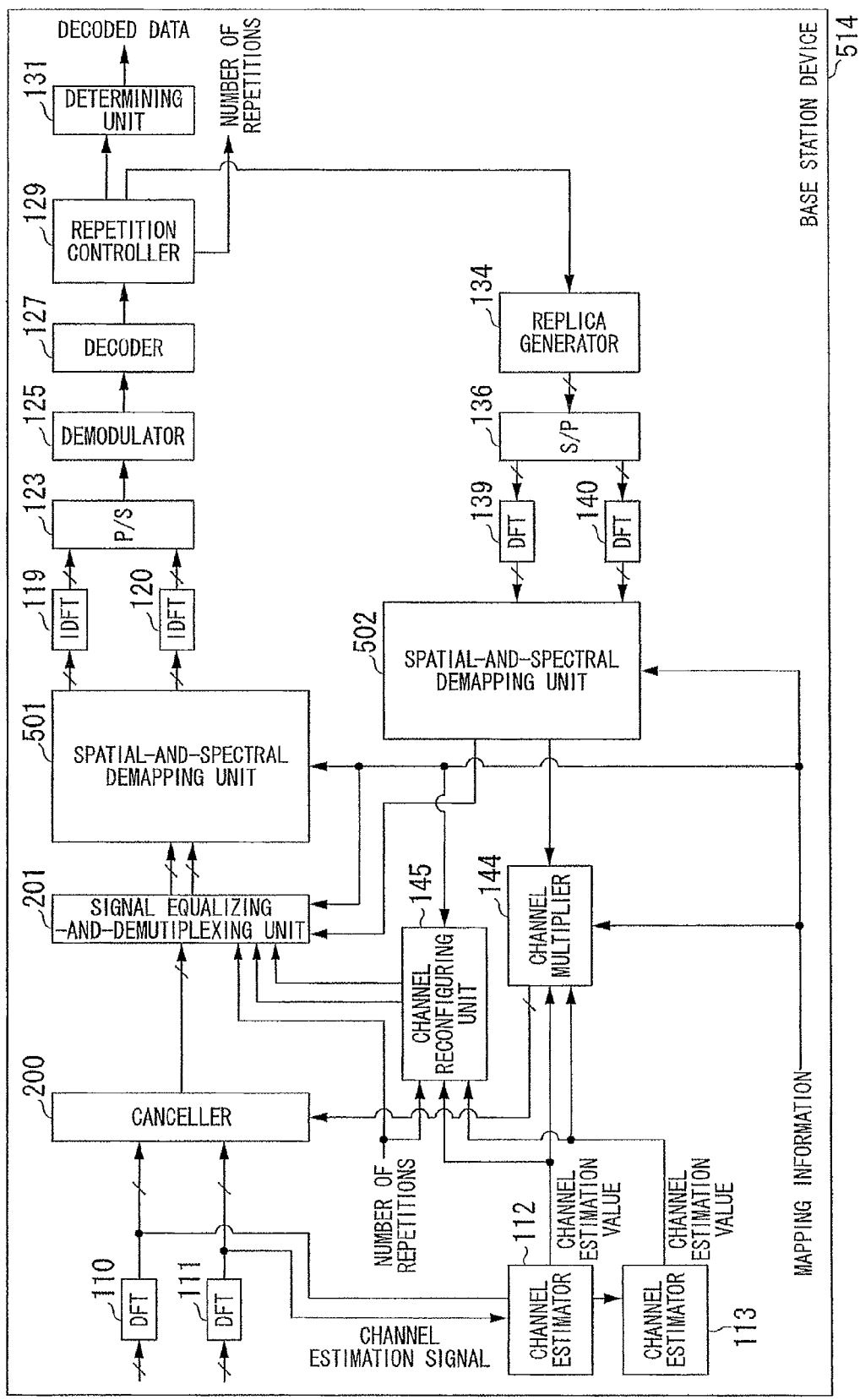
FIG. 19 is a schematic block diagram illustrating a configuration of a base station device 514 according to a fifth embodiment of the present invention.

FIG. 19 is a schematic block diagram illustrating a configuration of a base station device 514 according to the fifth embodiment. Only blocks which are required for reception and are in the state after the base station device 514 firstly performs frequency conversion on reception data are shown for simplification of explanations. Blocks assigned like reference numerals have the same functions in FIGS. 15 and 19. The difference from FIG. 15 is that the spatial-and-spectral demapping unit 500 has a different function, and therefore is referred to as a spatial-and-spectral demapping unit 501, and that the spatial-and-spectral mapping unit 217 has a different function, and therefore is referred to as a spatial-and-spectral mapping unit 502.

The number of signal equalizing-and-demultiplexing units 201 changes to one because of the sequential operations. It is assumed that the frequency-domain MMSE equalization is used for equalization. Signals required for the equalization are residual signals after replica signals are subtracted from received signals, a channel matrix $\Xi$ among transmission-and-reception antennas, a channel matrix (subchannel matrix) $\Xi_{n_T}$ from desired antennas (antennas from which data are to be calculated), and replica signals (frequency-domain data) S' for reconfiguring desired signals. As will be explained later, signal equalization and demultiplexing are performed in units of users. Regarding the order of operations, however, the odd-numbered operations of the repeated operations are performed by the user 1, and the even-numbered operations of the repeated operations are performed by the user 2. Preferably, signals having better conditions are preferentially processed.

Operations to be performed on received signals are similar to those shown in FIG. 15, but explanations thereof are simply explained together with explanations of different operations of the fifth embodiment. It is assumed that frequency responses among transmission-and-reception antennas have already been calculated using some method.

Received signals are subjected to frequency conversion in units of symbols and then are input to the canceller 200. These signals are shown in an expression (27). Similar to the aforementioned embodiments, the base station device 514 performs the repeated operations in units of packets (by which error correction cording is performed). Since a replica is not generated in the first operation, an output of the channel multiplier 220 is 0. In the second-or-later operation, replicas of transmitted signals calculated using LLRs of respective data pieces are generated, and therefore the canceller 200 subtracts replica signals from the received signals. When transmitted signal replicas are perfectly reproduced, signals after the subtraction include only noise.

Figure 20A:
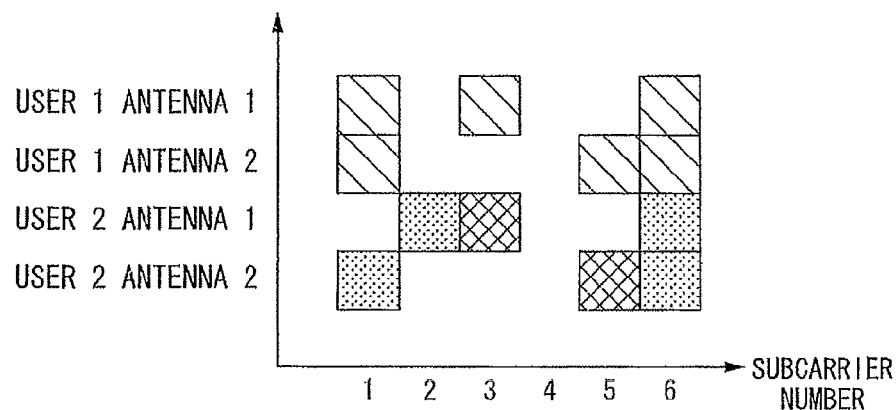
FIG. 20A illustrates example subcarriers targeted for repeated operations corresponding to respective repeated number of times and allocation of virtual subcarriers at the time of the operation according to the fifth embodiment.
Figure 20B:
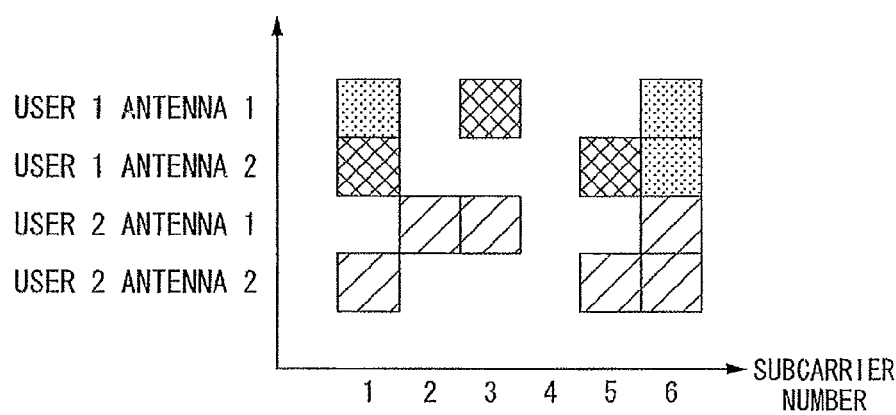
FIG. 20B illustrates example subcarriers targeted for repeated operations corresponding to respective repeated number of times and allocation of virtual subcarriers at the time of the operation according to the fifth embodiment.
Figure 20C:
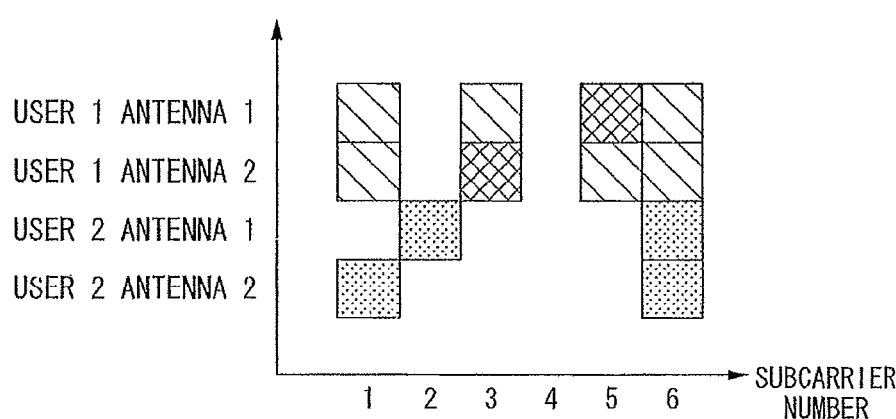
FIG. 20C illustrates example subcarriers targeted for repeated operations corresponding to respective repeated number of times and allocation of virtual subcarriers at the time of the operation according to the fifth embodiment.
Figure 20D:
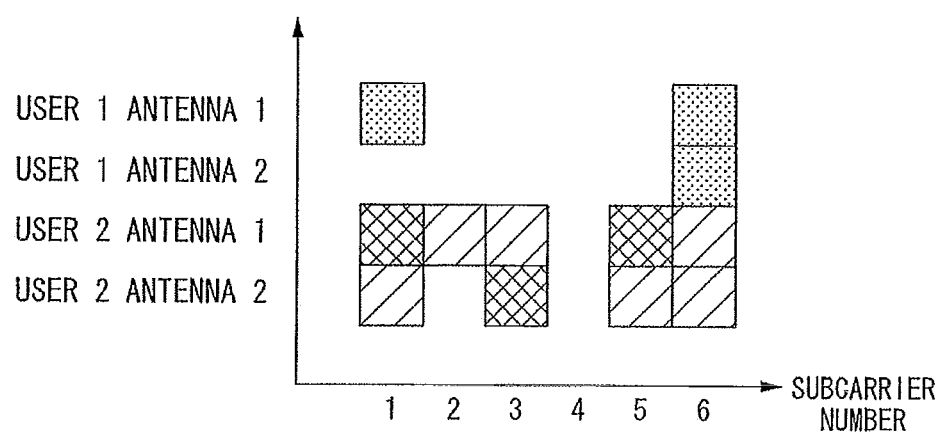
FIG. 20D illustrates example subcarriers targeted for repeated operations corresponding to respective repeated number of times and allocation of virtual subcarriers at the time of the operation according to the fifth embodiment.

The signal equalizing-and-demultiplexing unit 201 groups the received signals into two groups. In other words, the signal equalizing-and-demultiplexing unit 201-1 assumes that only information marked by horizontal lines shown in FIG. 20A (signals from the user 1) has been transmitted in the odd-numbered operations of the repeated operations. Additionally, the signal equalizing-and-demultiplexing unit 201 assumes that information marked by vertical lines as shown in FIG. 20B (signals from the user 2) has been transmitted in the even-numbered operations of the repeated operations. Since the subcarrier 3 has enough degree of freedom (there is only one datum to be identified in each operation system) and there are interference signals (squares marked by horizontal-and-vertical lines), the interference signals are demultiplexed using unused degrees of freedom. Although a signal of the subcarrier 2 of the user 2 is regarded as a noise in the case of FIG. 20A, this signal can also be demultiplexed as an interference signal. An actual operation image is shown in FIGS. 20C and 20D. The hatched information is regarded as noise.

When pseudo transmission-data vectors targeted for the respective repeated operations are assumed to be Ssod (odd-numbered operations) and Ssev (even-numbered operations), these vectors are expressed as expressions (43) and (44), respectively. Virtual channel matrices $\Xi_{sod}$ and $\Xi_{sev}$ corresponding to the respective pseudo transmission-data vectors Ssod and Ssev are expressed as the following expressions (45) and (46), respectively.

$$Ssod = \begin{bmatrix} S_{1-1}(3p-2) \\ 0 \\ S_{1-1}(3p-1) \\ 0 \\ S_{2-2}(3p-1) \\ S_{1-1}(3p) \\ S_{1-2}(3p-2) \\ 0 \\ S_{2-1}(3p-1) \\ 0 \\ S_{1-2}(3p-1) \\ S_{1-2}(3p) \end{bmatrix} \quad (43)$$

$$Ssev = \begin{bmatrix} S_{1-2}(3p-2) \\ S_{2-1}(3p-2) \\ S_{2-1}(3p-1) \\ 0 \\ S_{1-2}(3p-1) \\ S_{2-1}(3p) \\ S_{2-2}(3p-2) \\ 0 \\ S_{1-1}(3p-1) \\ 0 \\ S_{2-2}(3p-1) \\ S_{2-2}(3p) \end{bmatrix} \quad (44)$$

$$\Xi sod = \begin{bmatrix} \Xi_{11}(1) & & & & \Xi_{12}(1) & & & \\ & 0 & & 0 & & 0 & & 0 \\ & & \Xi_{11}(3) & & & & \Xi_{13}(3) & \\ & & & 0 & & & & 0 \\ & 0 & & & \Xi_{1}(5) & & 0 & & \Xi_{14}(5) \\ & & & \Xi_{11}(6) & & & & \Xi_{14}(6) \\ \Xi_{21}(1) & & & & \Xi_{22}(1) & & & \\ & 0 & & 0 & & 0 & & 0 \\ & & \Xi_{21}(3) & & & & \Xi_{23}(3) & \\ & & & 0 & & & & 0 \\ & 0 & & & \Xi_{22}(5) & & 0 & & \Xi_{24}(5) \\ & & & \Xi_{21}(6) & & & & \Xi_{24}(6) \end{bmatrix} \quad (45)$$

$$\Xi sev = \begin{bmatrix} \Xi_{12}(1) & & & & \Xi_{14}(1) & & & \\ & \Xi_{13}(2) & & 0 & & 0 & & 0 \\ & & \Xi_{11}(3) & & & & \Xi_{13}(3) & \\ & & & 0 & & & & 0 \\ & 0 & & & \Xi_{12}(5) & & 0 & & \Xi_{14}(5) \\ & & & \Xi_{13}(6) & & & & \Xi_{14}(6) \\ \Xi_{22}(1) & & & & \Xi_{24}(1) & & & \\ & \Xi_{23}(2) & & 0 & & 0 & & 0 \\ & & \Xi_{21}(3) & & & & \Xi_{23}(3) & \\ & & & 0 & & & & 0 \\ & 0 & & & \Xi_{22}(5) & & 0 & & \Xi_{24}(5) \\ & & & \Xi_{23}(6) & & & & \Xi_{24}(6) \end{bmatrix} \quad (46)$$

These virtual channel matrices are generated by the channel reconfiguring unit 221. These virtual channel matrices are input to the signal equalizing-and-demultiplexing units 201 according to the repeated number of times, subjected to MMSE equalization for each case, and then output.

Hereinafter, an operation of the channel reconfiguring unit is explained similarly to the fifth embodiment. Frequency response matrices received from the respective channel estimators can be expressed as expressions (47) and (48) similarly to the fifth embodiment. When two masking vectors MV are generated correspondingly to the pseudo transmission-data streams, which are referred to as MV3 and MV4, these can be expressed as expressions (49) and (50).

$$\Xi_{r1} = \begin{bmatrix} \Xi_{11}(1) & \Xi_{11}(2) & \Xi_{11}(3) & \Xi_{11}(4) & \Xi_{11}(5) & \Xi_{11}(6) \\ \Xi_{12}(1) & \Xi_{12}(2) & \Xi_{12}(3) & \Xi_{12}(4) & \Xi_{12}(5) & \Xi_{12}(6) \\ \Xi_{13}(1) & \Xi_{13}(2) & \Xi_{13}(3) & \Xi_{13}(4) & \Xi_{13}(5) & \Xi_{13}(6) \\ \Xi_{14}(1) & \Xi_{14}(2) & \Xi_{14}(3) & \Xi_{14}(4) & \Xi_{14}(5) & \Xi_{14}(6) \end{bmatrix} \quad (47)$$

$$\Xi_{r2} = \begin{bmatrix} \Xi_{21}(1) & \Xi_{21}(2) & \Xi_{21}(3) & \Xi_{21}(4) & \Xi_{21}(5) & \Xi_{21}(6) \\ \Xi_{22}(1) & \Xi_{22}(2) & \Xi_{22}(3) & \Xi_{22}(4) & \Xi_{22}(5) & \Xi_{22}(6) \\ \Xi_{23}(1) & \Xi_{23}(2) & \Xi_{23}(3) & \Xi_{23}(4) & \Xi_{23}(5) & \Xi_{23}(6) \\ \Xi_{24}(1) & \Xi_{24}(2) & \Xi_{24}(3) & \Xi_{24}(4) & \Xi_{24}(5) & \Xi_{24}(6) \end{bmatrix} \quad (48)$$

$$MV3 = \begin{bmatrix} 1 & 0 & 1 & 0 & 0 & 1 \\ 1 & 0 & 0 & 0 & 1 & 1 \\ 0 & 0 & 1 & 0 & 0 & 0 \\ 0 & 0 & 0 & 0 & 1 & 0 \end{bmatrix} \quad (49)$$

$$MV4 = \begin{bmatrix} 0 & 0 & 1 & 0 & 0 & 0 \\ 1 & 0 & 0 & 0 & 1 & 0 \\ 0 & 1 & 1 & 0 & 0 & 1 \\ 1 & 0 & 0 & 0 & 1 & 1 \end{bmatrix} \quad (50)$$

The same operation as performed in the second embodiment is performed based on the vectors MV3 and MV4, and thereby the virtual channel matrices $\Xi_{s1}$ and $\Xi_{s2}$ can be calculated as the expressions (45) and (46). Although elements of the second and the fourth columns shown in the expression (49) disappear when zero elements are deleted, 0 is inserted so as not to reduce the size of the matrix. With respect to the expressions (13) and (14) shown in the fifth embodiment, expressions (51) and (52) can be obtained using the masking vector MV3, and expressions (53) and (54) can be obtained using the masking vector MV4.

$$DOU(\Xi_{r1\cdot}*MV3) = \begin{bmatrix} \Xi_{11}(1) & 0 & \Xi_{11}(3) & 0 & \Xi_{12}(5) & \Xi_{11}(6) \\ \Xi_{12}(1) & 0 & \Xi_{13}(3) & 0 & \Xi_{14}(5) & \Xi_{12}(6) \end{bmatrix} \quad (51)$$

$$DOU(\Xi_{r1\cdot}*MV3) = \begin{bmatrix} \Xi_{21}(1) & 0 & \Xi_{21}(3) & 0 & \Xi_{22}(5) & \Xi_{21}(6) \\ \Xi_{22}(1) & 0 & \Xi_{23}(3) & 0 & \Xi_{24}(5) & \Xi_{22}(6) \end{bmatrix} \quad (52)$$

$$DOU(\Xi_{r1\cdot}*MV4) = \begin{bmatrix} \Xi_{12}(1) & \Xi_{13}(1) & \Xi_{11}(3) & 0 & \Xi_{12}(5) & \Xi_{13}(6) \\ \Xi_{14}(1) & 0 & \Xi_{13}(3) & 0 & \Xi_{14}(5) & \Xi_{14}(6) \end{bmatrix} \quad (53)$$

$$DOU(\Xi_{r1\cdot}*MV4) = \begin{bmatrix} \Xi_{22}(1) & \Xi_{23}(1) & \Xi_{21}(3) & 0 & \Xi_{22}(5) & \Xi_{23}(6) \\ \Xi_{24}(1) & 0 & \Xi_{23}(3) & 0 & \Xi_{24}(5) & \Xi_{24}(6) \end{bmatrix} \quad (54)$$

Regarding the expressions (51) and (52), the upper and lower elements of the fifth column have to be exchanged to prioritize the user group. Additionally, regarding the expressions (53) and (54), the upper and lower elements of the third column have to be exchanged to prioritize the user group. Similarly, the virtual subchannel matrices (55) and (56) are calculated based on the masking vector MV3.

The signal equalizing-and-demultiplexing unit 201 of the fifth embodiment allocates the transmitted signal vectors so as to recognize that data from the same user and the same antenna have preferably been transmitted from the same antenna. However, signals transmitted from different antennas are partially mixed to enhance the precision of demultiplexing. Consequently, the transmission-data vectors are pseudo vectors. Therefore, the virtual subchannel matrix differs from the virtual subchannel matrix from an actual antenna.

It is assumed in the odd-numbered operations that signals allocated to upper half elements of Ssod have been transmitted from the same antenna, and that signals allocated to lower half elements of Ssod have been transmitted from the same antenna. Hereinafter, these pairs of signals are referred to as signals from the pseudo transmission-data vector 1 and signals from the pseudo transmission-data vector 2. Therefore, the signal equalizing-and-demultiplexing unit 201 performs equalization based on the virtual channel matrix Ξ shown in the expression (45) and the virtual subchannel matrices $\Xi_{nT1}$ and $\Xi_{nT2}$ corresponding to the pseudo transmission-data vectors 1 and 2. The virtual subchannel matrices $\Xi_{nT1}$ and $\Xi_{nT2}$ are expressed as the following expressions (55) and (56).

$$\Xi_{nT1} = \begin{bmatrix} \Xi_{11}(1) & & & & & \\ & 0 & & 0 & & \\ & & \Xi_{11}(3) & & & \\ & & & 0 & & \\ & & 0 & & \Xi_{14}(5) & \\ & & & & & \Xi_{11}(6) \\ \Xi_{21}(1) & & & & & \\ & 0 & & 0 & & \\ & & \Xi_{21}(3) & & & \\ & & & 0 & & \\ & & 0 & & \Xi_{24}(5) & \\ & & & & & \Xi_{21}(6) \end{bmatrix} \quad (55)$$

$$\Xi_{nT2} = \begin{bmatrix} \Xi_{12}(1) & & & & & \\ & 0 & & 0 & & \\ & & \Xi_{13}(3) & & & \\ & & & 0 & & \\ & & 0 & & \Xi_{12}(5) & \\ & & & & & \Xi_{12}(6) \\ \Xi_{22}(1) & & & & & \\ & 0 & & 0 & & \\ & & \Xi_{23}(3) & & & \\ & & & 0 & & \\ & & 0 & & \Xi_{22}(5) & \\ & & & & & \Xi_{22}(6) \end{bmatrix} \quad (56)$$

It is assumed in the even-numbered operations that signals allocated to upper half elements of Ssev have been transmitted from the same antenna, and that signals allocated to lower half elements of Ssev have been transmitted from the same antenna. Hereinafter, these pairs of signals are referred to as the pseudo transmission-data vector 3 and the pseudo transmission-data vector 4.

Since the virtual subchannel matrix $\Xi_{nT}$ is generated for each of the pseudo transmission-data vectors 1 to 4, four matrices are generated by the channel reconfiguring unit 221.

The signal equalizing-and-demultiplexing unit 201 uses the replica signals S', which are generated based on the pseudo transmission-data vectors. In the odd-numbered operations, the signal equalizing-and-demultiplexing unit 201 uses a replica of the pseudo transmission-data vector 1 and a replica of the pseudo transmission-data vector 2. In the even-numbered operations, the signal equalizing-and-demultiplexing unit 201 uses a replica of the pseudo transmission-data vector 3 and a replica of the pseudo transmission-data vector 4.

Figure 21A:
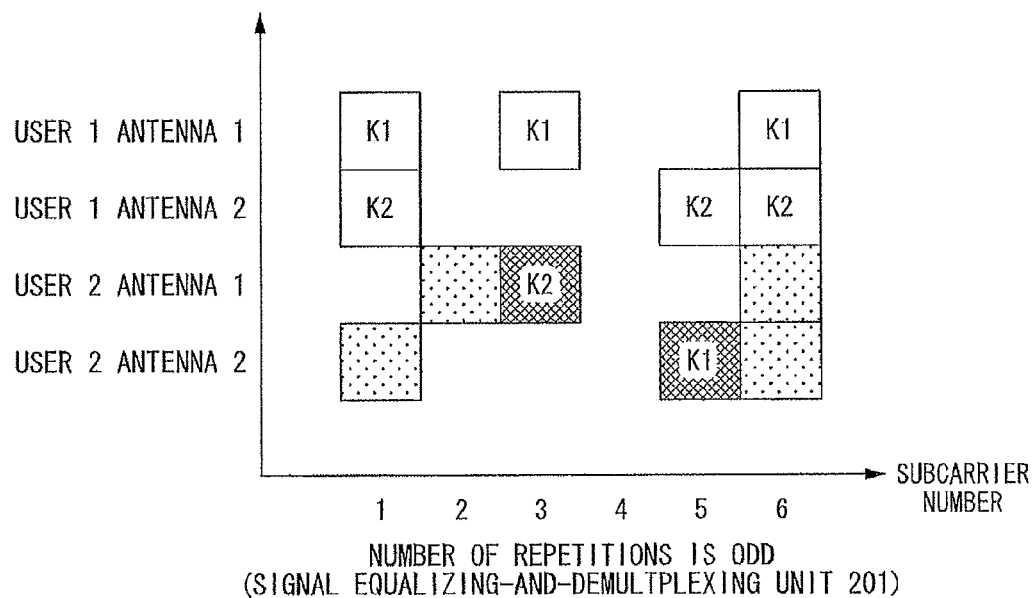
FIG. 21A illustrates an example mapping of outputs after signal equalization-and-demultiplexing according to the fifth embodiment.
Figure 21B:
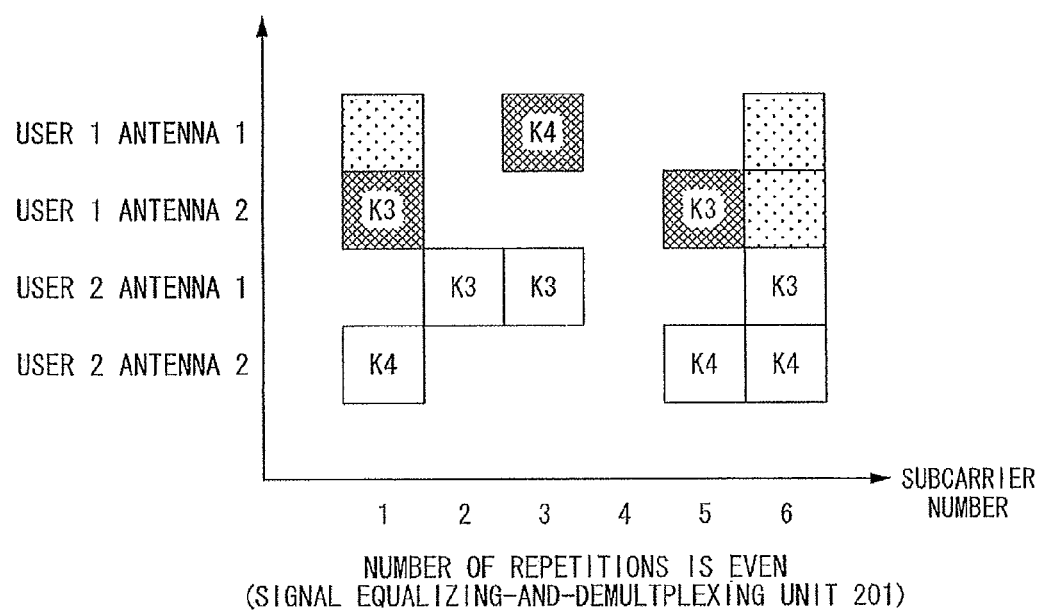
FIG. 21B illustrates an example mapping of outputs after signal equalization-and-demultiplexing according to the fifth embodiment.

FIGS. 21A and 21B illustrate outputs after signal equalization and demultiplexing, which are mapped onto a plane defined by actual user-and-transmission-antennas and subcarriers. FIG. 21A illustrates outputs of the signal equalizing-and-demultiplexing unit 201 in the odd-numbered operations. FIG. 21B illustrates outputs of the signal equalizing-and-demultiplexing unit 201 in the even-numbered operations. K1 and K2 denote signals to be processed as the pseudo transmission vectors 1 and 2, respectively. The hatched data are deleted.

The spatial-and-spectral demapping unit 500 maps the signals of K1 to K4 onto inputs of the IDFT units 116 and 117 in a reversed order of mapping performed at the time of transmission.

Figure 22:
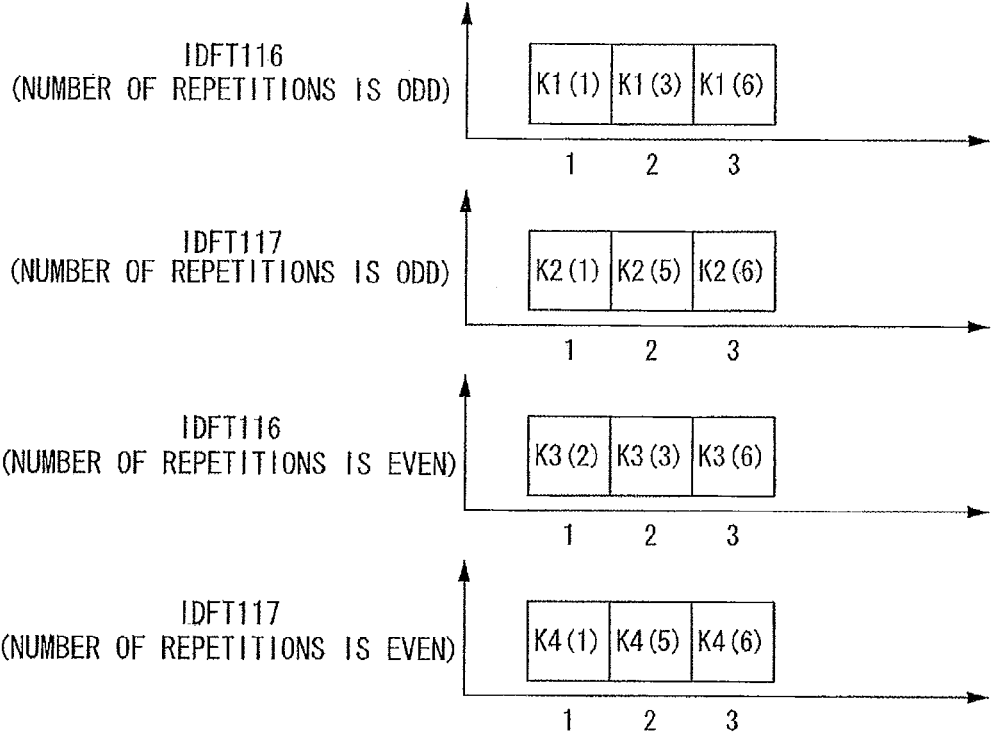
FIG. 22 illustrates data input to IDFT units 116 and 117 according to the fifth embodiment.

FIG. 22 illustrates data input to the IDFT units 116 and 117 where x of Kx(y) denotes the virtual antenna number, and y of Kx(y) denotes the subcarrier number at the time of outputting performed by the signal equalization and demultiplexing.

The operation is performed by the spatial-and-spectral demapping unit 501 in this manner, IDFT is performed, and then LLR for each data piece is calculated by the demodulator 122. The operations up to the operation performed by the demodulator 122 are performed in units of symbols. The decoder 124 performs error correction decoding in units by which encoding is performed. In this case, decoding is performed based on the input LLRs. Then, LLR for respective data pieces are updated, and the updated LLRs are output from the repetition controller 205 to the replica generator 210 except for the last repeated operation. In the last repeated operation, the updated LLRs are output from the repetition controller 205 to the determining unit 207.

Figure 23:
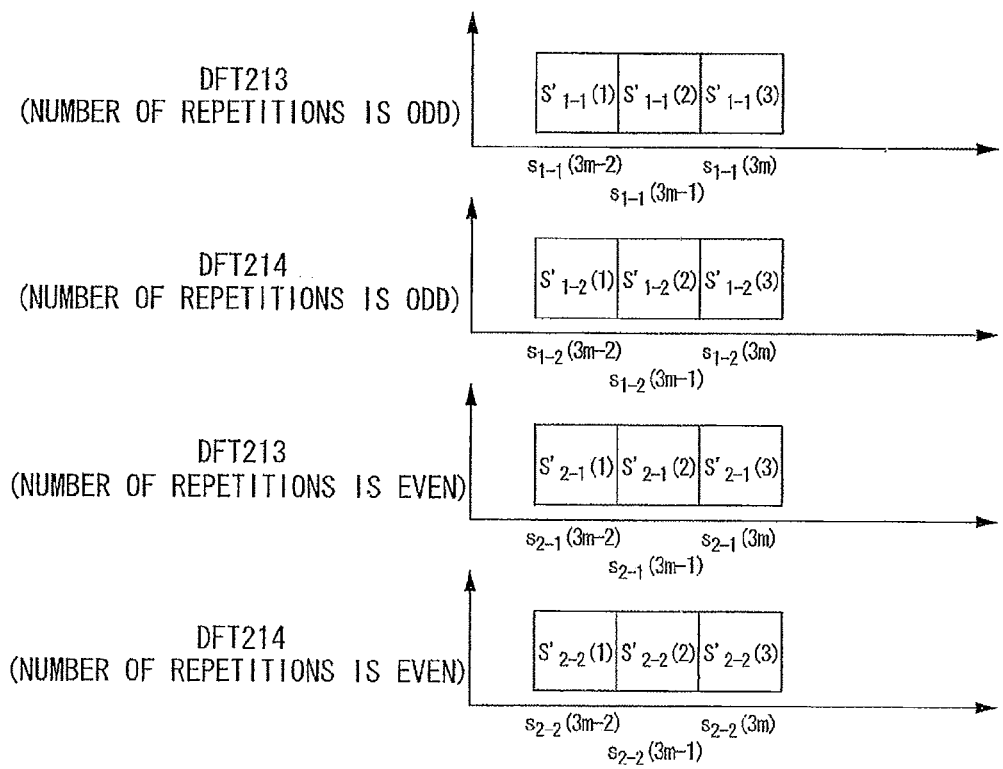
FIG. 23 illustrates outputs of DFT units 213 and 214 according to the fifth embodiment.

The generated replicas are input to the DFT units 213 and 214 in units of symbols. s1-1($m$) denotes a time domain replica with respect to data transmitted from the user 1 antenna 1. s1-2($m$) denotes a time domain replica with respect to data transmitted from the user 1 antenna 2. s2-1($m$) denotes a time domain replica with respect to data transmitted from the user 2 antenna 1. s2-2($m$) denotes a time domain replica with respect to data transmitted from the user 2 antenna 2. m is an index of data. Three pieces of each replica are input to each of the DFT units 213 and 214. Outputs of the DFT units 213 and 214 are shown in FIG. 23. S' denotes a frequency-domain replica. An index indicates the user number and the antenna number.

The spatial-and-spectral demapping unit 217 performs mapping on the frequency-domain replicas according to the mapping used for transmission. The mapped data pieces are expressed as an expression (57) in the case of odd-numbered operations and an expression (58) in the case of even-numbered operation if expressed by a matrix indicated by the user number and the antenna number in the vertical direction, and the subcarrier number in the horizontal direction. The data pieces shown in the expressions (57) and (58) are multiplied by the channel information shown in the expressions (25) and (26), and thereby a replica signal R'(i) to be used for cancelling is generated, which is shown in an expression (59) where i denotes an index indicative of the repeated number of times.

$$S'1 = \begin{bmatrix} S'_{1-1}(1) \\ 0 \\ S'_{1-1}(2) \\ 0 \\ 0 \\ S'_{1-1}(3) \\ S'_{1-2}(1) \\ 0 \\ 0 \\ 0 \\ S'_{1-2}(2) \\ S'_{1-2}(3) \end{bmatrix} \quad (57)$$

$$S'2 = \begin{bmatrix} 0 \\ S'_{2-1}(1) \\ S'_{2-1}(2) \\ 0 \\ 0 \\ S'_{2-1}(3) \\ S'_{2-2}(1) \\ 0 \\ 0 \\ 0 \\ S'_{2-2}(2) \\ S'_{2-2}(3) \end{bmatrix} \quad (58)$$

-continued $$R'(i) = \begin{bmatrix} R'_1(1) \\ R'_1(2) \\ R'_1(3) \\ R'_1(4) \\ R'_1(5) \\ R'_1(6) \\ R'_2(1) \\ R'_2(2) \\ R'_2(3) \\ R'_2(4) \\ R'_2(5) \\ R'_2(6) \end{bmatrix} = (i \bmod 2) \times \left( \Xi 1 S'1 + \begin{bmatrix} 1 \\ 1 \\ 1 \\ 1 \\ 1 \\ 1 \\ 0 \\ 0 \\ 0 \\ 0 \\ 0 \\ 0 \end{bmatrix}^T \times R'(i-1) \right) + \quad (59)$$

$$((i+1) \bmod 2) \times \left( \Xi 2 S'2 + \begin{bmatrix} 0 \\ 0 \\ 0 \\ 0 \\ 0 \\ 0 \\ 1 \\ 1 \\ 1 \\ 1 \\ 1 \\ 1 \end{bmatrix}^T \times R'(i-1) \right)$$

T denotes transpose of a matrix. (x mod 2) denotes a reminder when x is divided by 2. Because of the sequential operations, a replica matrix in the previous operation is stored, and a replica newly calculated according to the repeated number of times has to be updated.

The canceller 200 subtracts the replica R' from the received signal R. On the other hand, the spatial-and-spectral demapping unit 501 has to generate a replica signal S'$_{od}$ shown in an expression (60) and a replica signal S'$_{ev}$ shown in an expression (61) for each required pseudo transmission-data vector when the signal equalizing-and-demultiplexing unit 201 performs equalization.

$$S'od = \begin{bmatrix} S'_{1-1}(1) \\ 0 \\ S'_{1-1}(2) \\ 0 \\ S'_{2-2}(2) \\ S'_{1-1}(3) \\ S'_{1-2}(1) \\ 0 \\ S'_{2-1}(2) \\ 0 \\ S'_{1-2}(2) \\ S'_{1-2}(3) \end{bmatrix} \quad (60)$$

-continued $$S'ev = \begin{bmatrix} S'_{1-2}(1) \\ S'_{2-1}(1) \\ S'_{2-1}(2) \\ 0 \\ S'_{1-2}(2) \\ S'_{2-1}(3) \\ S'_{2-2}(1) \\ 0 \\ S'_{1-1}(2) \\ 0 \\ S'_{2-2}(2) \\ S'_{2-2}(3) \end{bmatrix} \quad (61)$$

The upper half elements of the replica signal S'$_{od}$ and the lower half elements of the replica signal S'$_{od}$ correspond to the transmitted signals from the pseudo transmission-data vectors 1 and 2, respectively. The upper half elements of the replica signal S'$_{ev}$ and the lower half elements of the replica signal S'$_{ev}$ correspond to the transmitted signals from the pseudo transmission-data vectors 3 and 4, respectively. These signals are multiplied by the virtual subchannel matrix $\Xi_{nT}$ as shown in the expression (46), and thereby desired signals required for equalization are reconfigured.

According to the configuration, the size of the circuit can be greatly reduced although the repeated number of times is increased.

Sixth Embodiment

The aforementioned embodiments have explained the mobile station device that performs transmission by spreading signals to the frequency domain using DFT and then reconverting the frequency-domain signals into time-domain signals using IDFT, and the base station device corresponding to the mobile station device. However, the present invention is applicable to a system that performs frequency spreading not by DFT, but by multiplying transmitted signals by spreading codes. Particularly when orthogonal codes indicated by phase rotations are used, the same signals as in the case of performing spreading using DFT are generated, and therefore the PAPR characteristics can be reduced. The sixth embodiment explains a case where frequency spreading is performed using phase-rotation orthogonal spreading codes.

Figure 24:
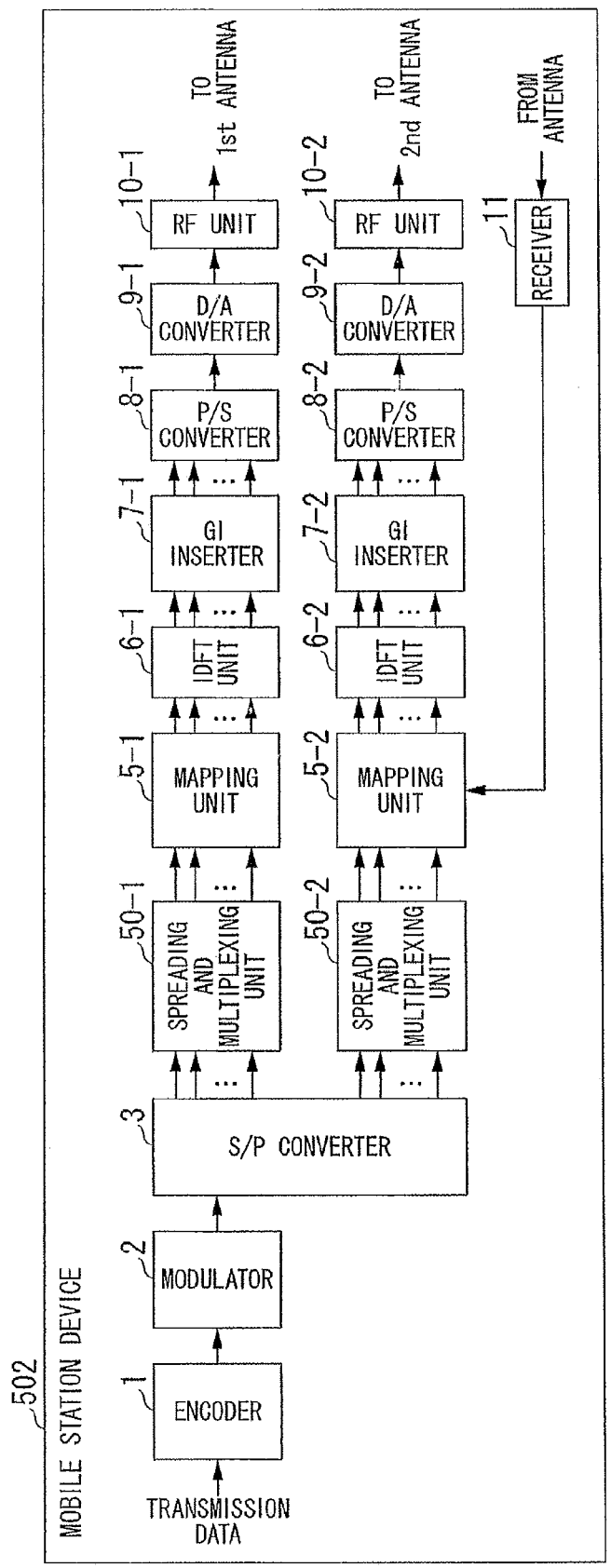
FIG. 24 is a schematic block diagram illustrating a configuration of a base station device 502 according to a sixth embodiment of the present invention.

FIG. 24 is a schematic block diagram illustrating a configuration of a mobile station device 502 according to the sixth embodiment.

Figure 25:
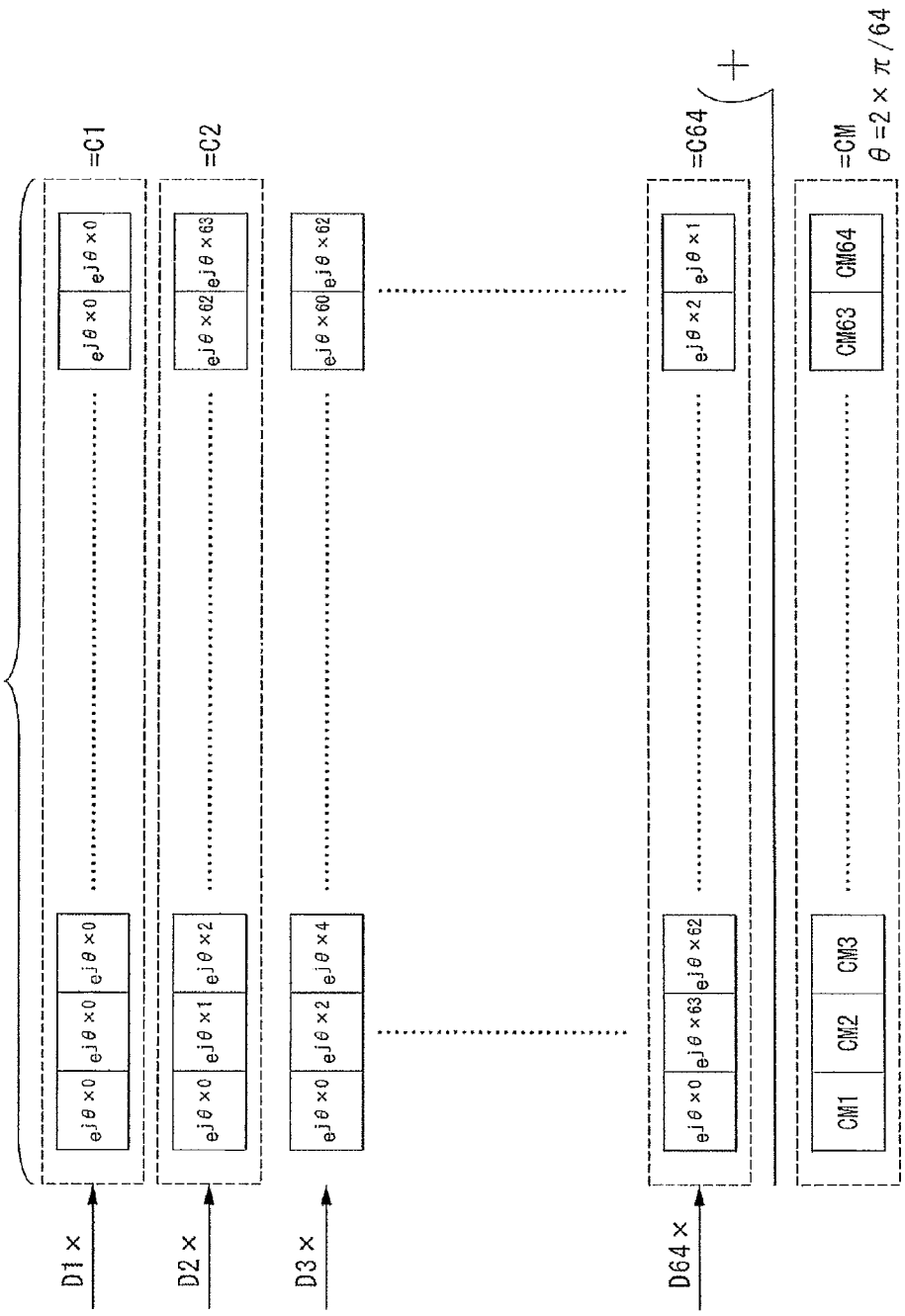
FIG. 25 illustrates spreading and multiplexing performed by spreading-and-multiplexing units 50-1 and 50-2 according to the sixth embodiment.

The mobile station device 502 shown in FIG. 24 has the same configuration as that of the transmission device 500 shown in FIG. 3 except that the DFT units 401 and 4-2 of the mobile station device 500 of the first embodiment shown in FIG. 3 are replaced with spreading-and-multiplexing units 50-1 and 50-2. The spreading-and-multiplexing units 50-1 and 50-2 perform spreading and multiplexing as shown in FIG. 25. It is assumed here that the code length is 64, 64 phase-rotation orthogonal spreading codes are used, and therefore the number of subcarriers to be used by one user is 64.

C1 to C64 shown in FIG. 25 denote spreading codes. Each element (chip) of the spreading code is as shown. D1 and D2 denote signals that have been modulated and converted into parallel signals. Firstly, the spreading-and-multiplexing units 50-1 and 50-2 multiply the modulated signals D1 and D2 by codes C1 and C2. In this case, the modulated signal D1 or the like is copied for the code length (64 copies in this case), and then multiplied by respective chips of the spreading codes. Then, the results of the multiplication are added for each chip, and thereby the signals multiplied by the codes are outputs of the spreading-and-multiplexing units 50-1 and 50-2.

Thus, even when the phase-rotation orthogonal spreading codes are used instead of DFT, signals similar to ones in the case of DFT can be generated, thereby enabling transmission of signals including signal-user MIMO signals and multi-user MIMO signals which are mixed. Accordingly, the configuration of the reception device explained above can be applied to the case where the transmission device includes the spreading-and-multiplexing units. Additionally, an inverse spreading unit that multiplies received signals by complex conjugates of the phase-rotation orthogonal spreading codes used on the transmitting side may be included instead of the IDFT units after the spatial-and-spectral demapping unit 118 shown in FIG. 6 or the spatial-and-spectral demapping unit shown in FIG. 9. Further, the DFT unit for generating replicas may be replaced with the spreading-and-multiplexing unit explained above.

As explained above, the sixth embodiment has explained the case where orthogonal codes indicated by phase rotations. However, the present invention is not limited thereto, and is applicable to a case where frequency spreading is performed using other spreading codes.

It is assumed as an example in the following embodiments that a transmission scheme is SC-ASA, the number of transmission devices is 2, and the number of subcarriers is 64. Additionally, it is assumed that the number of subcarriers to be used by each transmission device is 32 which is half the total number of subcarriers, similarly to the conventional SC-ASA. In this case, $N_d$=64 and $N_u$=32 where $N_d$ denotes the number of subcarriers to be used by each transmission station, and $N_u$ denotes the number of subcarriers in an available band. Hereinafter, explanations are given using $N_d$ and N. Further, since it is assumed that OFDM is used as a multicarrier scheme, SC-ASA is occasionally called DFT-S-OFDM in the description. The following embodiments target generally-called uplink communication from a mobile station to a base station if not particularly specified. However, the communication targeted by the present invention is not limited thereto.

Seventh Embodiment

Figure 26:
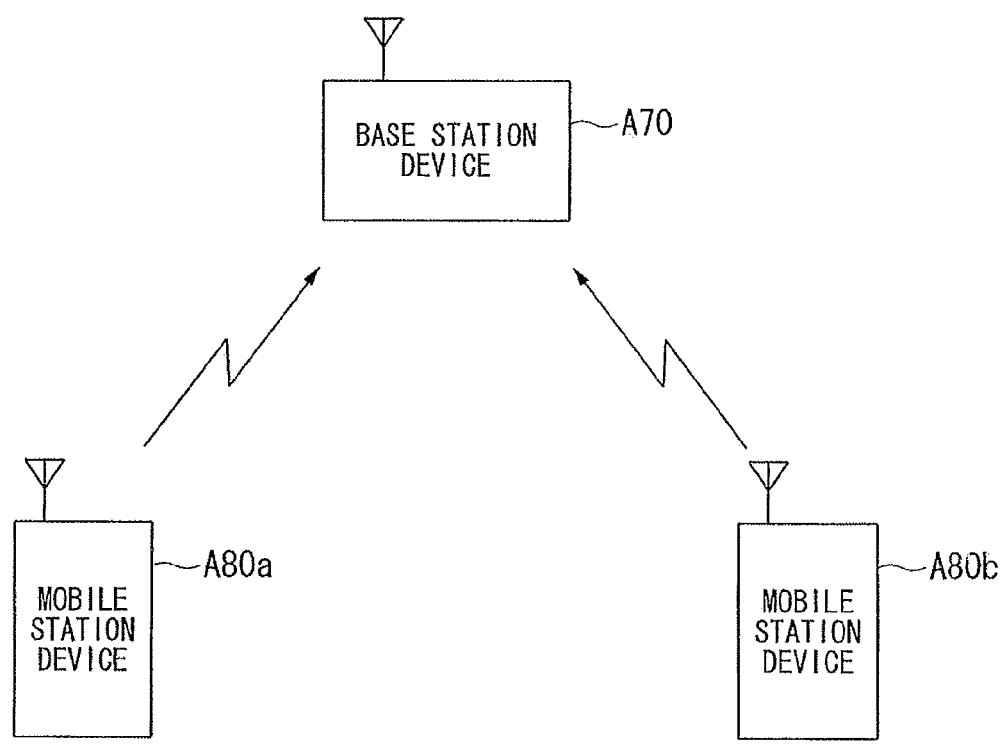
FIG. 26 is a schematic block diagram illustrating a configuration of a radio communication system according to a seventh embodiment of the present invention.
Figure 27:
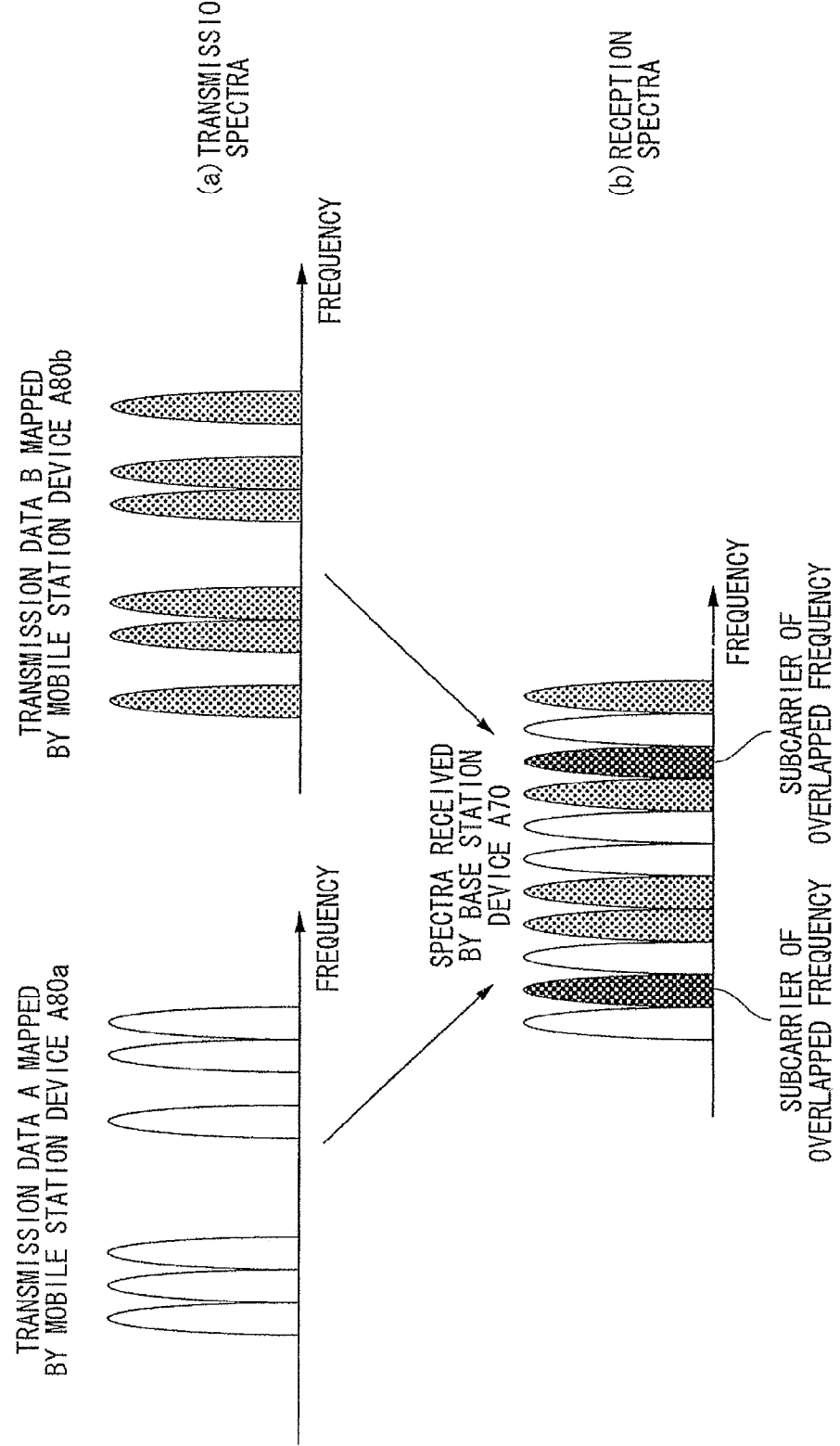
FIG. 27 illustrates example mapping of subcarriers according to the seventh embodiment.

FIG. 26 is a schematic block diagram illustrating a configuration of a radio communication system according to a seventh embodiment. In the seventh embodiment, mobile station devices A80a and A80b transmit data using SC-ASA, and a base station device A70 receives the data. In the seventh embodiment, the base station device A70 determines spectrum allocation information pieces with respect to the respective mobile station devices A801 and A80b. The base station device A70 transmits the spectrum allocation information pieces to the respective mobile station devices A80a and A80b. In this case, any transmission method may be used. FIG. 27 illustrates an example of subcarrier mapping according to the seventh embodiment. FIG. 27A illustrates transmission spectra onto which transmission data A transmitted from the mobile station device A80a are mapped and transmission spectra onto which transmission data B transmitted from the mobile station device A80b are mapped. FIG. 27B illustrates reception spectra received by the base station device A70. It is assumed here for simplification of explanations that there is no distortion due to radio channels.

In the case of SC-ASA, the transmission station performs subcarrier mapping in consideration of states of subcarriers used by other transmission stations so that the reception station can independently demultiplex and detect a signal transmitted from each transmission station. Under the assumption of SC-ASA that signals blocked on the time axis are periodical functions, the blocked signals are subjected to DFT to obtain amplitude and phase of each subcarrier, and then information concerning the obtained amplitude and phase are transmitted based on the multicarrier scheme. Accordingly, each subcarrier includes information concerning the entire transmission data on the time axis. Even if some of subcarriers to which transmission data from one transmission station are allocated (2 of 6 subcarriers in the case of FIG. 27B) overlaps some of subcarriers to which transmission data from another transmission station are allocated as blackened subcarriers shown in FIG. 27B, information concerning the transmission data transmitted from each transmission station can be obtained based on other subcarriers which do not overlap. For this reason, if the information is used for detecting signals from the multiple transmission stations, a signal from each transmission station can be demultiplexed and detected. This respect is explained hereinafter.

Figure 28:
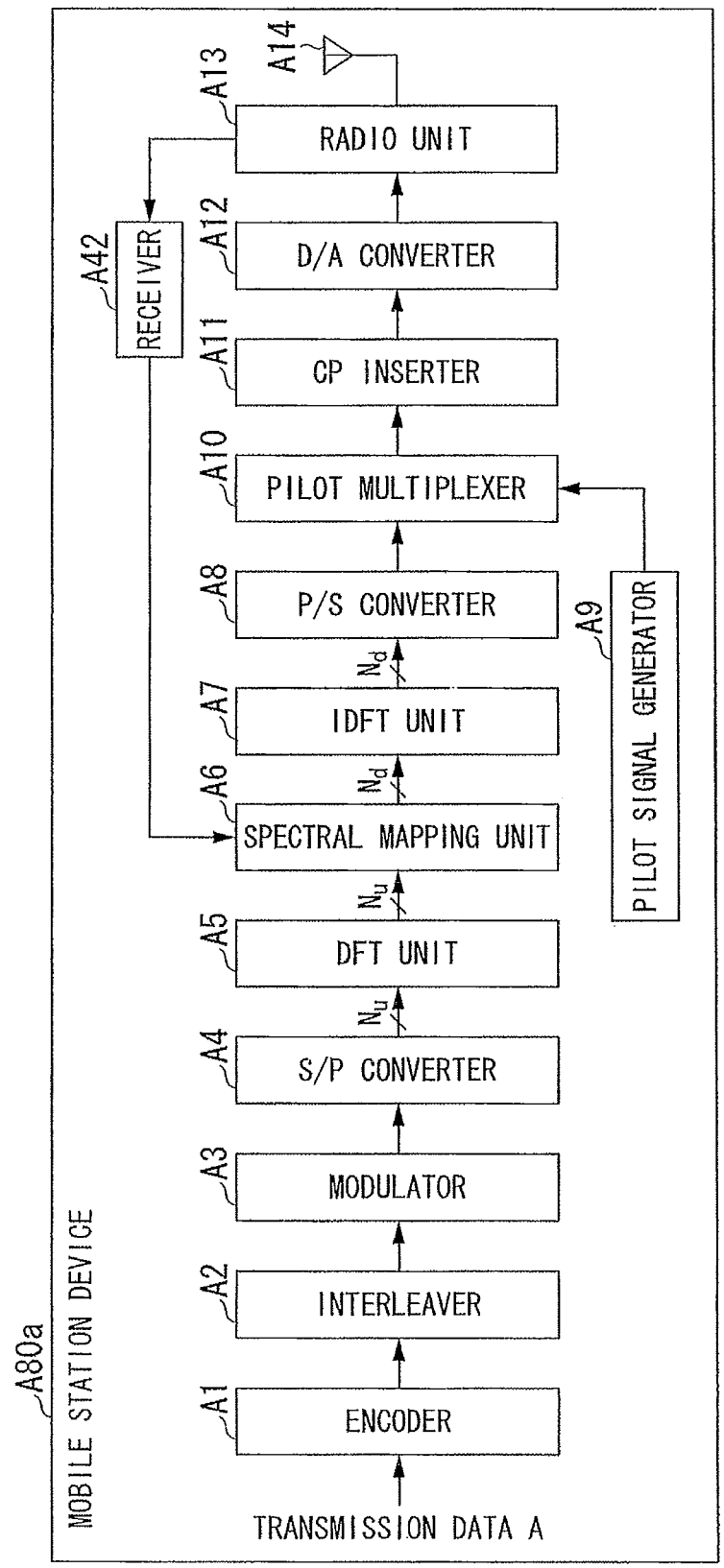
FIG. 28 is a schematic block diagram illustrating a configuration of a mobile station device A80a according to the seventh embodiment.

FIG. 28 is a schematic block diagram illustrating a configuration of the mobile station device A80a according to the seventh embodiment. Although not shown, the mobile station device A80b has the same configuration as that of the mobile station device A80a. The mobile station device A80a of the seventh embodiment includes an encoder A1, an interleaver A2, a modulator A3, an S/P (Serial/Parallel) converter A4, a DFT unit A5, a spectral mapping unit A6, an IDFT unit A7, a P/S (Parallel/Serial) converter A8, a pilot signal generator A9, a pilot multiplexer A10, a CP inserter A11, a D/A (Digital/Analog) converter A12, a radio unit A13, an antenna A14, and a receiver A42.

The encoder A1 performs error correction coding on transmission data A to generate encoded bits. The interleaver A2 interleaves the encoded bits to randomize the encoded bits so that a probability density function of each encoded bit at the time of reception can be approximated by the Gaussian distribution based on the central limit theorem, and thereby the reliability of turbo equalization technique, which has been theoretically analyzed under the assumption that the probability density function is originally the Gaussian distribution, can be improved. Then, the modulator A3 modulates the interleaved encoded bits. Then, the S/P converter A4 converts the modulated encoded bits into $N_u$ samples of parallel signals. Then, DFT unit A5 performs DFT with $N_u$ points to convert the parallel signals into frequency signals. In this case, the DFT unit A5 uses FFT (Fast Fourier Transform) as DFT.

Then, the spectral mapping unit A6 maps the $N_u$ samples of frequency-domain signals onto $N_u$ points included in an available transmission band of $N_d$ points based on spectrum allocation information that receiver A42 has received from the base station device A70. Then, the IDFT unit A7 performs IDFT to convert the frequency-domain signals of $N_d$ points mapped onto the $N_u$ points into time-domain signals of $N_d$ points. Then, the P/S converter A8 converts the time-domain signals into a serial signal. On the other hand, the pilot signal generator A9 generates a known pilot signal for channel estimation. The pilot signal is multiplexed onto the serial signal output from the P/S converter A8.

Then, the CP inserter A11 inserts a cyclic prefix for reducing interference between DFT-S-OFDM symbols into the multiplexed signal, i.e., a rearward wave of the multiplexed signal is copied and pasted to the forward thereof. The reason that the cyclic prefix is used is that waves to be subjected to DFT in the DFT section are required to have a period that is an integral multiple of one period of a periodical function. For this reason, if delayed-wave elements are present in multipath channels, the functional periodicity of the delayed-wave elements of the received signal collapses on the receiving side. Consequently, subcarriers cannot be independently processed. On the other hand, if a cyclic prefix corresponding to the maximum delay time of the channel is preliminarily inserted on the transmitting side, the cyclic prefix is removed on the receiving side so that the functional periodicity with respect to the delayed elements can be maintained. Consequently, each subcarrier can be independently processed. In other words, even if each subcarrier is allocated to an arbitral frequency, the subcarrier can be reproduced on the receiving side. Then, D/A converter A12 converts the signal into which the cyclic prefix has been inserted is converted into an analog signal. The radio unit A13 upconverts the analog signal into a radio-frequency signal to be transmitted from the antenna A14.

Figure 29:
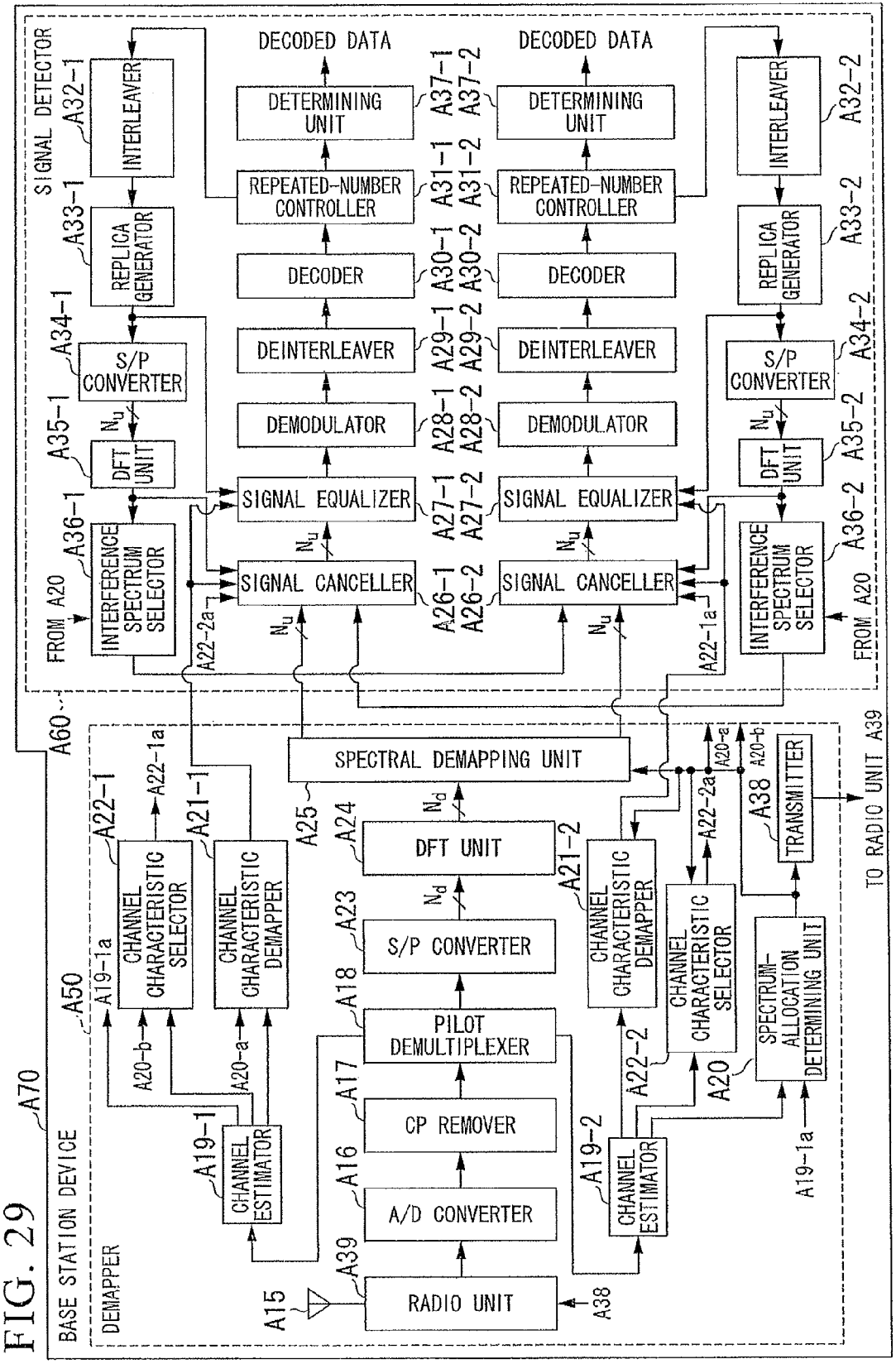
FIG. 29 is a schematic block diagram illustrating a configuration of a base station device A70 according to the seventh embodiment.

FIG. 29 is a schematic block diagram illustrating a configuration of the base station device A70 of the seventh embodiment. The base station device A70 includes: a demapping unit A50 that returns the arrangement of subcarriers; and a signal detector A60 that demultiplexes and detects signals transmitted from the respective mobile station devices.

The demapping unit A50 includes an antenna A15, an A/D converter A16, a CP remover A17, a pilot demultiplexer A18, channel estimators A19-1 and A19-2, a spectrum-allocation determining unit A20, channel-characteristic demapping units A21-1 and A21-2, channel characteristic selectors A22-1 and A22-2, an S/P converter A23, a DFT unit A24, a spectral demapping unit A25, a transmitter A38, and a radio unit A39.

The signal detector A60 includes signal cancellers A26-1 and A26-2, signal equalizers A27-1 and A27-2, demodulators A28-1 and A28-2, deinterleavers A29-1 and A29-2, decoders A30-1 and A30-2, repeated number controllers A31-1 and A31-2, interleavers A32-1 and A32-2, replica generators A33-1 and A33-2, S/P converters A34-1 and A34-2, DFT units A35-1 and A35-2, interference spectrum selectors A36-1 and A36-2, and determining units A37-1 and A37-2. Regarding the demapping unit A50 and the signal detector A60, reference symbols Ax-1 and Ax-2 (x is a number) denote signal processors that process signals concerning transmission data pieces A and B, respectively.

Firstly, the radio unit A39 downconverts a received signal received by the antenna A15 into a baseband signal. Then, the A/D converter A16 converts the baseband signal into a digital signal. Then, the CP remover A17 removes a cyclic prefix, i.e., extracts valid symbols having the periodicity. The valid symbols indicate symbols included in a section for one period. Then, the pilot demultiplexer A18 demultiplexes the digital signal from which the cyclic prefix has been removed into a data signal and pilot signals, and outputs the pilot signals required for detecting the transmission data A and B transmitted from the mobile station devices A80a and A80b to the channel estimators A19-1 and A19-2, respectively.

Meanwhile, the S/P converter A23 converts the data signal demultiplexed by the pilot demultiplexer A18 into parallel signals. Then, the DFT unit (time-frequency converter) A24 performs a Fourier transform that is a time-frequency conversion to convert the parallel signals into frequency-domain signals. Then, based on the spectrum allocation information received from the spectrum-allocation determining unit A20, the spectral demapping unit A25 extracts subcarriers on which the spectral mapping unit A6 of each of the mobile station devices A80a and A80b has allocated signals, and returns the arrangement of the extracted subcarriers to the original arrangement before the mapping has been performed by the spectral mapping unit A6. It is assumed here that $M_1$ denotes a matrix including $N_u \times N_d$ elements including 0 and 1 for the spectral mapping unit A6 of the mobile station device A80a to map the frequency-domain signals output from the DFT unit A5 onto subcarriers. In other words, if the matrix $M_1$ is multiplied by a vector $R_1'$ indicative of outputs of the DFT unit A5, then a vector $R_1$, which is the frequency-domain signals mapped onto subcarriers, is obtained. As shown in an expression (62-1), the matrix $M_1$ is an $N_u \times N_d$ matrix in which the column number is the subcarrier number in the original arrangement, the row number is the subcarrier number after the mapping, only elements corresponding to the interleaving are 1, and all other elements are 0.

$$M_1 = \begin{bmatrix} 0 & 1 & \ldots & 0 \\ 0 & 0 & \ldots & 1 \\ \vdots & \vdots & \ddots & \vdots \\ 1 & 0 & \ldots & 0 \end{bmatrix} \quad (62)$$

Accordingly, when $M_2$ denotes a matrix for the spectral mapping unit A6 of the mobile station device A80b to map the frequency-domain signals onto subcarriers, $M_2$ is expressed similarly to the matrix $M_1$. The spectral demapping unit A25 obtains the demapped signals received from the mobile station devices A80a and A80b as shown in expressions (63-1) and (63-2). As will be explained later, information concerning the matrices M1 and M2 are transferred from the spectrum-allocation determining unit A20 to the spectral demapping unit A25.

$$R_1' = M_1^T R \quad (63\text{-}1)$$

$$R_2' = M_2^T R \quad (63\text{-}2)$$

In the expressions (63-1) and (63-2), R denotes an $N_d \times 1$ complex received signal vector including all signals from the mobile station devices A80a and A80b, which are output from the DFT unit A24. T in the upper right denotes a transpose matrix. $R_1'$ and $R_2'$ denote complex received signal vectors including all the demapped signals from the respective mobile station devices A80a and A80b.

On the other hand, the channel estimators A19-1 and A19-2 estimate frequency responses of channels from the respective mobile station devices A80a and A80b to the base station device A70 based on the pilot signals that are received from the respective mobile station devices A80a and A80b and demultilexed by the pilot demultiplexer A18. Thus, the diagonal matrices as shown in the expressions (64-1) and (64-2) are obtained with respect to the transmission data A and B transmitted from the mobile station devices A80a and A80b, respectively.

$$H_1 = \operatorname{diag}\{H_1(1), \ldots, H_1(N_d)\} = \begin{bmatrix} H_1(1) & 0 & \ldots & 0 \\ 0 & H_1(2) & \ldots & 0 \\ \vdots & \vdots & \ddots & \vdots \\ 0 & 0 & \ldots & H_1(N_d) \end{bmatrix} \quad (64\text{-}1)$$

$$H_2 = \operatorname{diag}\{H_2(1), \ldots, H_2(N_d)\} = \begin{bmatrix} H_2(1) & 0 & \ldots & 0 \\ 0 & H_2(2) & \ldots & 0 \\ \vdots & \vdots & \ddots & \vdots \\ 0 & 0 & \ldots & H_2(N_d) \end{bmatrix} \quad (64\text{-}2)$$

In the expressions (64-1) and (64-2), $H_m(k)$ denotes a complex gain of a channel corresponding to the k-th subcarrier, which is included in channels from the m-th mobile station device (1×t one is the mobile station device A80a, and 2nd one is the mobile station device A80b) to the base station device A70.

Then, channel matrices $H_1$ and $H_2$ output from the channel estimators A19-1 and A19-2 are input to the spectrum-allocation determining unit A20. The spectrum-allocation determining unit A20 determines subcarriers to be used by the respective mobile station devices A80a and A80b based on the channel matrices $H_1$ and $H_2$. Then, the spectrum-allocation determining unit A20 outputs the matrices $M_1$ and $M_2$ indicative of spectrum allocation information that is the determination result to the transmitter A38, the spectral demapping unit A25, the channel-characteristic demapping units A21-1 and A21-2, the channel characteristic selectors A22-1 and A22-2, and the interference selectors A36-1 and A36-2. Upon receiving the matrices $M_1$ and $M_2$ indicative of spectrum allocation information, the transmitter A38 transmits the spectrum allocation information to the mobile station devices A80a and A80b through the radio unit A39 and the antenna A15.

In this case, only information required for each mobile station device may be transmitted, such that only information concerning the matrix $M_1$ is transmitted to the mobile station device A80a. Alternatively, all the spectrum allocation information pieces may be transmitted. Then, the channel-characteristic demapping units A21-1 and A21-2 extract frequency responses of channels required for detecting desired signals from the channel matrices $H_1$ and $H_2$ with use of the matrices $M_1$ and $M_2$ included in the spectrum allocation information, respectively. Then, channel-characteristic demapping units A21-1 and A21-2 returns the arrangement of subcarriers to that of the frequency-domain signals before the spectral mapping has been performed by the mobile station devices A80a and A80b.

$$H_1' = M_1^T H_1 \quad (65\text{-}1)$$

$$H_2' = M_2^T H_2 \quad (65\text{-}2)$$

In the expressions (65-1) and (65-2), a matrix $H_1'$ denotes frequency responses of channels required for detecting desired signals for the mobile station device A80a which are arranged correspondingly to the mapping performed by the spectral mapping unit A6. A matrix $H_2'$ denotes frequency responses of channels required for detecting desired signals for the mobile station device A80b which are subjected to the similar operation. At the same time, the channel characteristic selectors A22-1 and A22-2 extract channel responses corresponding to the subcarrier numbers causing interference with the signals received from the respective mobile station devices A80a and A80b, rearrange the channel responses to cancel the interference, and thus obtain matrices $H_1^{int}$ and $H_2^{int}$. In this case, the matrices $H_1^{int}$ and $H_2^{int}$ that are frequency characteristics of the extracted interference signals can be obtained from expressions (66-1) and (66-2).

$$H_1^{int} = M_1^T H_2 \quad (66\text{-}1)$$

$$H_2^{int} = M_2^T H_1 \quad (66\text{-}2)$$

The $H_1'$ and $H_2'$ that are characteristics of the desired signals and the matrices $H_1^{int}$ and $H_2^{int}$ that are frequency characteristics of the interference signals, which are obtained in this manner, are input to the signal cancellers A26-1 and A26-2 and the signal equalizers A27-1 and A27-2. The channel characteristic selectors A22-1 and A22-2 may be provided after the channel-characteristic demapping units A21-1 and A21-2.

The signal detector A60 includes signal cancellers A26-1 and A26-2, signal equalizers A27-1 and A27-2, demodulators A28-1 and A28-2, deinterleavers A29-1 and S29-2, decoders A30-1 and A30-2, repeated number controllers A31-1 and A31-2, interleavers A32-1 and A32-2, replica generators A33-1 and A33-2, S/P converters A34-1 and A34-2, DFT units A35-1 and A35-2, interference spectrum selectors A36-1 and A36-2, and determining units A37-1 and A37-2. If the mobile station devices A80a and A80b do not include the interleaver A2 shown in FIG. 28, the base station device A70 does not need to include the deinterleaver A29 and the interleaver A32. Therefore, the base station device A70 does not need to include the interleaver A32 and the deinterleaver A29, correspondingly to the mobile station devices A80a and A80b.

Explanations of the signal detector A60 will be given assuming an operation of detecting the transmission data A transmitted from the mobile station device A80a. For this reason, the block assigned the reference symbol Ax-1 (x denotes the block number) shown in FIG. 29 is mainly targeted for the operation. When signals transmitted from the mobile station device A80b are detected, the block assigned the reference symbol Ax-2 is targeted, and therefore explanations of detection of the transmission data B transmitted from the mobile station device A80b are omitted here.

Signals output from the spectral demapping unit 25 include subcarriers overlapping, as interference, some subcarriers of signals transmitted from the mobile station device A80b, and are input to the signal canceller A26-1. The signal canceller A26-1 cancels frequency-domain signal replicas of the desired signals and interference signal replicas from received signals, and then calculates residual-signal elements. When $Q_1$ denotes a residual that is a residual-signal element output from the signal canceller A26-1, the residual $Q_1$ can be obtained as shown in an expression (67).

$$Q_1 = R_1' - H_1' S_{1rep} - H_1^{int} S_{2rep}^{int} \qquad (67)$$

In the expression (67), the first term denotes demapped received signals. The second term denotes signal replicas generated based on the reliability of their own signals. The third term denotes interference signal replicas generated based on the reliability of other signals. $S_{1rep}$ denotes an $N_u \times 1$ signal-replica vector of desired signals expressed by frequency-domain complex numbers. $S_{2rep}^{int}$ denotes an $N_u \times 1$ signal-replica vector expressed by frequency-domain complex numbers (signal replicas will be explained later), which is generated by the signal detector (replica generator A33-2) detecting signals transmitted from the mobile station device A80b, and then extracting signals of interfering subcarriers. As will be explained later, operations of the signal canceller A26-1 to the interference spectrum selector A36-1 are repeatedly performed on the same received signal. However, a signal replica is not generated in the first operation (i.e., $S_{1rep}=0$, $S_{2rep}^{int}=0$). For this reason, the signal canceller A26-1 does not perform the cancelling operation shown in the expression (67), and outputs the demapped received signal instead of the residual $Q_1$.

The residual $Q_1$ obtained as shown in the expression (67) is input to the signal equalizer A27-1. The signal equalizer A27-1 performs equalization on the input signals. As an equalizing method, MMSE (Minimum Mean Square Error) equalization is generally used in many cases. Although the case of using the MMSE equalization will be explained, alternatively, ZF (Zero-Forcing) for multiplying an inverse matrix of a channel matrix, QRD (QR Decomposition), or SQRD (Sorted QRD) may be used. The signal equalizer A27-1 performs signal equalization using the residual Q1, the frequency responses $H_1$ of channels for desired signals, and the signal replica $S_{1rep}$ generated by the replica generator A33-1, which will be explained later, in order to reconfigure desired signals. Specifically, the signal equalizer A27-1 calculates the optimal weight based on the residual Q1, the frequency responses $H_1$, and the signal replica $S_{1rep}$, and outputs the final equalized time-domain signal $z_1$ multiplied by the optimal weight. The output signal $z_1$ is expressed as an expression (68). In other words, the expression (68) indicates that the signal equalizer A27-1 simultaneously performs equalization on desired signals and conversion from frequency-domain signals into time-domain signals.

$$z_1 = (1+\gamma\delta)^{-1} [\gamma s_{1rep} + F^H \Psi Q_1] \qquad (68)$$

In the above expression, $\gamma$ and $\delta$ denote real numbers used for calculation using H1, powers of received signals, noise dispersion, and the like. Similarly, $\psi$ denotes a complex square matrix having the size of the DFT-S-OFDM symbols used for calculation using H1, noise dispersion, and the like. $s_{1rep}$ denotes time-domain replicas. $S_{1rep}$ denotes frequency-domain replicas. Since a replica is not input in the first operation of the repeated operations from the signal canceller A26-1 to the interference spectrum selector A36-1, then $Q_1=R_1'$ and $S_{1rep}=0$ in the expression (68), which is equal to the case of the conventional MMSE equalization without cancelling.

The reason that the signal canceller A26-1 cancels all the replicas of interference signals and desired signals is that the signal equalizer performs an inverse matrix calculation, and therefore the inverse matrix calculation has to be performed a number of times corresponding to the number of symbols included in a DFT-OFDM symbol if cancelling and equalization are repeated with only the desired signals remained. On the other hand, if the residual after cancelling all the replicas is input, the residual can be equally treated by the signal equalizer A27-1, and therefore all weights can be calculated with one inverse calculation by the signal equalizer A27-1. For this reason, the residual $Q_1$ and the replicas $S_{1rep}$ of the desired signals are independently input and reconfigured to decrease the amount of the inverse calculation.

The equalized signal $z_1$ is demodulated by the demodulator A28-1, and LLRs (Log-Likelihood Ratio) that are real numbers indicative of the reliability of encoded bits divided in units of bits from the signal $z_1$. The obtained LLRs of the encoded bits are arranged by the interleaver A6 of the mobile station device (mobile station device A80a), and rearranged back to the original arrangement by the deinterleaver A29-1. Then, the decoder A30-1 performs error correction on the rearranged LLRs, and outputs the LLRs of the encoded bits with higher reliability and decoded data A obtained by performing error correction on the encoded bits.

Then, the LLRs of the encoded bits and the decoded data A output from the decoder A30-1 are input to the repeated number controller A31-1. The repeated number controller (repetition controller) A31-1, which counts the repeated number of times, controls repetition based on whether or not the repeated number of times is the predetermined number of times. If the repeated operation is not repeated, the decoded data A is output to the determining unit A37-1. If the repeated operation is repeated, the LLRs of the encoded bits are output to the interleaver A32-1. The LLRs of the encoded bits are arranged by the interleaver A32-1 similarly to the arrangement performed by the interleaver A2 of the mobile station device A80a, and input to the replica generator A33-1.

The replica generator A33-1 generates the signal replica $S_{1rep}$ in proportion to the reliability according to the LLRs of the encoded bits. For example, when QPSK (Quadrature Phase Shift Keying) is used as a modulation scheme, and LLRs of bits constituting a QPSK symbol corresponding to the k-th index are real numbers $\lambda_1(k)$ and $\lambda_2(k)$, the signal replica $s_{1rep}(k)$ can be expressed as an expression (69).

$$s_{1rep}(k) = \frac{1}{\sqrt{2}}\tanh\left(\frac{\lambda_1(k)}{2}\right) + j\frac{1}{\sqrt{2}}\tanh\left(\frac{\lambda_2(k)}{2}\right) \quad (69)$$

The signal replica $s_{1rep}(k)$ generated by the generator A33-1 using the expression (69) is input to the signal equalizer A27-1 to reconfigure only desired signal elements using the expression (68) at the time of equalization. At the same time, the signal replica $s_{1rep}(k)$ is converted by the S/P converter A34-1 into parallel replicas to be cancelled by the signal canceller A26-1, and then converted by the DFT unit A35-1 into frequency-domain signals. A signal vector indicative of the replicas concerted into the frequency-domain signals is $S_{1rep}$ shown in the expression (67). Then, regarding subcarriers overlapping transmitted signals from the mobile station device A80b, transmitted signals from the mobile station device A80a interfere with the transmitted signals from the mobile station device A80b. Therefore, the interference spectrum selector A36-1 selects the interfering subcarriers.

For example, when the 3rd and 19th subcarriers of the 32 subcarriers interfere with the transmitted signals from the mobile station device A80b, only the 3rd and 19th subcarriers are extracted from the 32 subcarriers, and the remaining subcarriers are changed to 0, thereby generating the frequency-domain interference replica, which is the interference replica $S_{1rep}^{int}$ shown in the expression (67). The expression (67) is used when signals from the mobile station device A80a are demodulated, and therefore signals from the mobile station device A80b are regarded as interference. For this reason, the interference replica $S_{2rep}^{int}$ assigned a suffix 2rep is used.

In other words, 2rep shown in the expression (67) indicates that signals from the mobile station device A80b interfere with signals transmitted from the mobile station device A80a.

Then, the signals output from the interference selectors are input to the signal cancellers A26-1 and A26-2. Then, detection of signals transmitted from the mobile station device A80a performed by the signal canceller A26-1 to the interference spectrum selector A36-1 and detection of signals transmitted from the mobile station device A80b performed by the signal canceller A26-2 to the interference spectrum selector A36-2 are repeatedly performed in parallel. These repeated operations are performed the predetermined number of times controlled by the repetition controllers A31-1 and A31-2. Then, the determining unit A37-1 obtains decoded data A corresponding to the transmission data A of the mobile station device A80a. The determining unit A37-2 obtains decoded data B corresponding to the transmission data B of the mobile station device A80b.

Although it has been explained in the seventh embodiment that the operation for the signals transmitted from the mobile station device A80a and the operation for the signals transmitted from the mobile station device A80b are performed in parallel, targets for these signal operations may alternately be changed so as to serially detect the signals, and thereby the blocks of the signal cancellers A26-1 and A26-2 and the later blocks can be shared.

According to the seventh embodiment, even if at least some subcarriers of multiple data signals transmitted from multiple transmission devices (mobile station devices) to the same reception device (base station device) using SC-ASA overlaps and thereby interfere with each other, the reception device detects each signal, generates replicas of transmitted signals based on the reliability of the signals, and thereby interfering subcarriers are transferred to each other. Accordingly, the interfering signals, which are problematic when the signals transmitted from each mobile station device are detected, can be regarded as known signals. Consequently, all the interference can be removed, and therefore the signals can be demultiplexed and detected. Therefore, even if overlapping subcarriers having high reception quality and high transmission efficiency are allocated to the multiple transmission devices, subcarriers having good transmission efficiency can be allocated to each transmission device, Additionally, signal cancelling and equalization are performed using replicas of transmitted signals before the transmission device has mapped frequency-domain signals onto subcarriers. Accordingly, calculation may be performed only for the subcarriers, the number of which is smaller than the number of all subcarriers included in the entire transmission band of the transmission device, thereby enabling a reduction in the amounts of calculation for the signal cancelling and equalization.

Further, as long as the interference spectrum selectors A36-1 and A36-2 extract only the least subcarriers causing interference, the amount of calculation required for generating known interference signals can be reduced.

Eighth Embodiment

Figure 30:
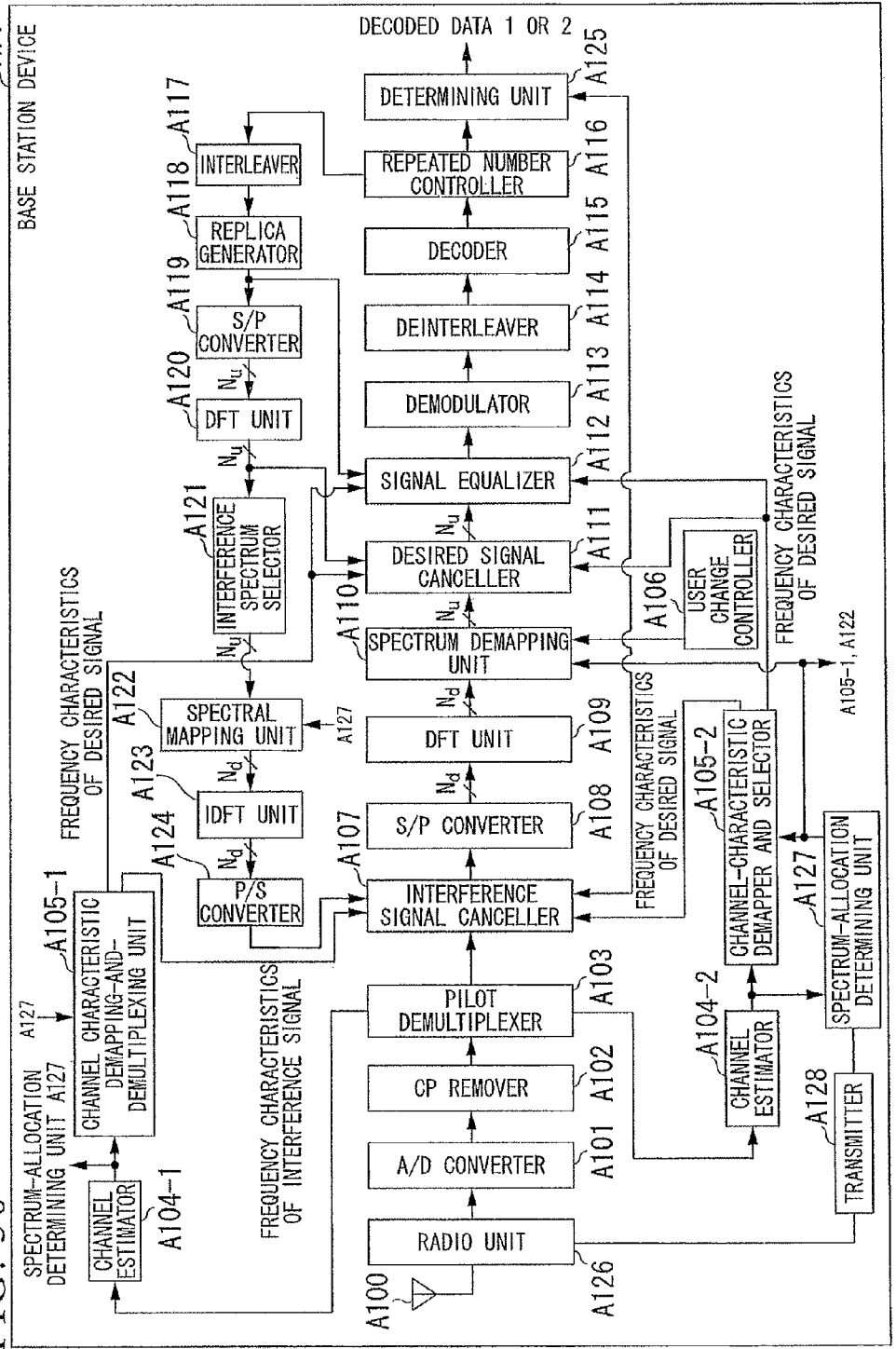
FIG. 30 is a schematic block diagram illustrating a configuration of a base station device 71 according to an eighth embodiment of the present invention.

An eighth embodiment explains a radio communication system including a base station device A71 and the mobile station devices A80a and A80b, in which the base station device A71 repeatedly cancels interference signals in the time-domain to serially detect multiple desired signals. FIG. 30 is a schematic block diagram illustrating a configuration of the base station device A71 according to the eighth embodiment. Configurations of the mobile station devices A80a and A80b of the eighth embodiment are the same as those of the seventh embodiment. Therefore, explanations and drawings thereof are omitted here.

As shown in FIG. 30, the base station device A71 includes a reception antenna A100, an A/D converter A101, a CP remover A102, a pilot demultiplexer A103, channel estimators A104-1 and A104-2, channel-characteristic demapping-and-selecting units A105-1 and A105-2, a user changing unit A106, an interference signal canceller A107, a first S/P converter A108, a DFT unit A109, a spectral demapping unit A110, a desired-signal canceller A111, a signal equalizer A112, a demodulator A113, a deinterleaver A114, a decoder A115, a repeated-number controller A116, an interleaver A114, a replica generator A118, a second S/P converter A119, a second DFT unit A120, an interference spectrum selector A121, a spectral mapping unit A122, an IDFT unit A123, a P/S converter A124, a determining unit A125, a radio unit A126, a spectrum-allocation determining unit A127, and a transmitter A128.

The channel-characteristic demapping-and-selecting unit A105 is the same as one of the seventh embodiment shown in FIG. 28.

Operations of like blocks in the seventh and eighth embodiments are basically the same, and therefore explanations thereof are omitted here. Hereinafter, the difference from the base station device A70 that cancels interference signals received from other users in the frequency domain as shown in FIG. 29. The concept of the repeated operations is basically the same, but the interference signal canceller A107 performs cancelling in the time domain. For this reason, the spectral mapping unit A122 maps the spectra selected by the interference spectrum selector A107 again. The IDFT unit A123 generates time-domain replicas. The interference signal canceller A107 for cancelling interference signals is provided before the DFT unit A109. The user change controller A106 is provided to extract signals by alternately cancelling interference signals. The interference signal canceller A107 receives user change information indicative of which user corresponds to the desired signal, and performs canceling using interference replicas of signals other than the desired signals and the channel characteristics of the signals. Additionally, the user change information is also input from the user change controller A106 to the desired-signal canceller A111 performing cancelling using the desired signals output from the DFT unit A120, to the signal equalizer A112 equalizing the desired signals, and to the determining unit A125 determining which user correspond to decoded data.

According to the eighth embodiment, substantially the same effect as that in the case of cancelling in the frequency domain (seventh embodiment) can be achieved. Additionally, if blocks having reference numerals larger than that of the S/P converter A108 are provided for two systems, parallel operation can be performed. Therefore, according to the present invention, cancelling in the time-or-frequency domain, serial detection by one system, and parallel detection by multiple systems can freely combined.

Ninth Embodiment

Figure 31:
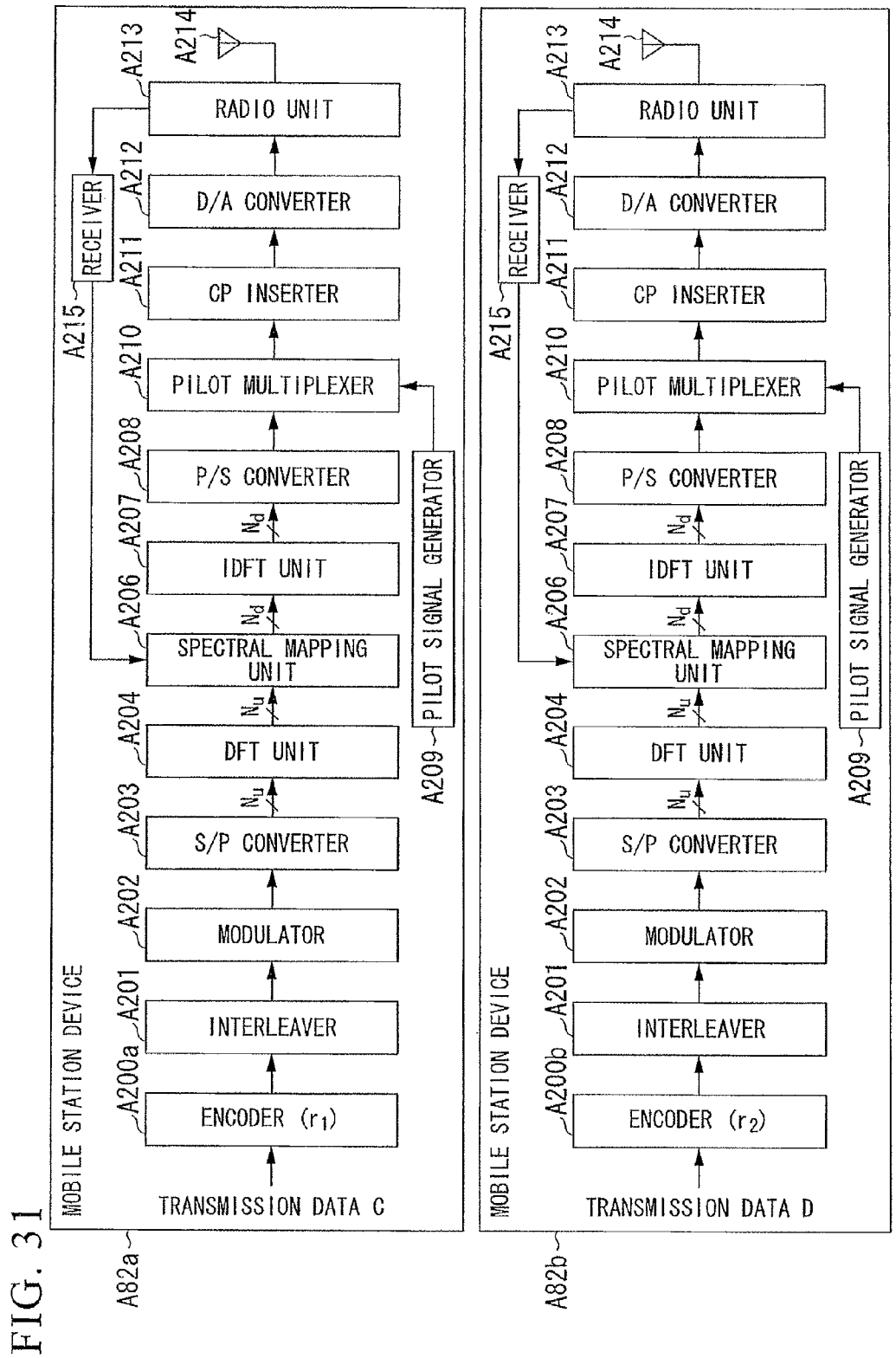
FIG. 31 is a schematic block diagram illustrating configurations of mobile station devices 82a and 82b according to a ninth embodiment of the present invention.

The ninth embodiment explains a detection method using cancelling without repeated operations. A radio communication system according to the ninth embodiment includes a base station device A72 that is a reception device, and two mobile station devices A82a and A82b that are transmission devices. FIG. 31 is a schematic block diagram illustrating configurations of the mobile station devices A82a and A82b according to the ninth embodiment. In the ninth embodiment, the base station device A72 does not perform interference cancelling on a signal to be firstly detected. For this reason, the mobile station device A82a of the two mobile station devices A82a and A82b, which transmits the signal to be firstly detected by the base station device A72, uses an encoding rate having strong resistance to interference and noise.

The mobile station device A82a shown in FIG. 31 includes an encoder A200a, an interleaver A201, a modulator A202, an S/P converter A203, a DFT unit A204, a spectral mapping unit A206, an IDFT unit A207, an P/S converter A208, a pilot generator A209, a pilot demultiplexer A210, a CP inserter A211, a D/A converter A212, a radio unit A213, an antenna A214, and a receiver A215. The reference numerals A200a, A201, A202, A203, A204, A206, A207, A208, A209, A210, A211, A212, A213, A214, and A215 shown in FIG. 31 correspond to the reference numerals A1, A2, A3, A4, A5, A6, A7, A8, A9, A10, A11, A12, A13, A14, and A42, respectively. Therefore, explanations thereof are omitted here.

As shown in FIG. 31, the encoders A200a and A200b of the mobile station devices A82a and A82b use the different encoding rates between the two devices. When $r_1$ and $r_2$ denote encoding rates for transmission data pieces C and D, which are used by the encoders A200a and A200b of the mobile station devices A82a and A82b, respectively, it is assumed that $r_1<r_2$. Since the encoding rate used for channel encoding with respect to the transmission data C is small, the encoding rate has large resistance to noise and interference. For this reason, if the base station device A72 decodes the transmission data C first with the signals of the transmission data D kept as interference signals, when detecting the transmission data D, the base station device A72 generates interference replicas based on results of decoding the transmission data C, cancel the generated interference replicas from received signals, and thereby can detect the transmission data D.

Figure 32:
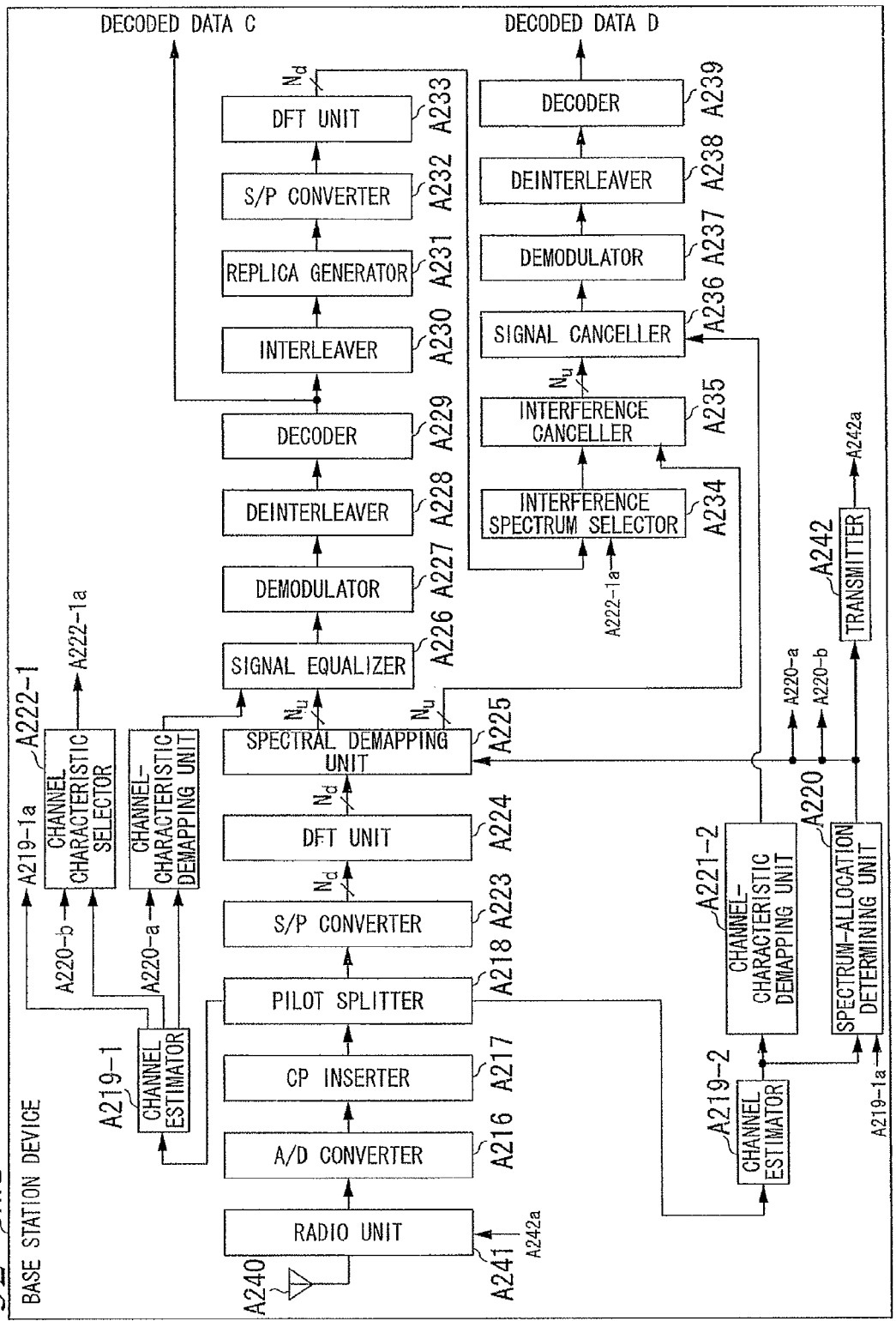
FIG. 32 is a schematic block diagram illustrating a configuration of a base station device 72 according to the ninth embodiment.

FIG. 32 is a schematic block diagram illustrating a configuration of the base station device A72 according to the ninth embodiment. The base station device A72 includes an antenna A240, a radio unit A241, an A/D converter A216, a CP remover A217, a pilot demultiplexer A218, channel estimators A219-1 and A219-2, a spectrum-allocation determining unit A220, channel-characteristic demapping units A221-1 and A221-2, a channel-characteristic selector A222-1, a first S/P converter A223, a first DFT unit A224, a spectral demapping unit A225, a first signal equalizer A226, a first demodulator A227, a first deinterleaver A228, a first decoder A229, an interleaver A230, a replica generator A231, a second S/P converter A232, a second DFT unit A233, an interference spectrum selector A234, an interference signal canceller A235, a second signal equalizer A236, a second demodulator A237, a second deinterleaver A238, a second decoder A239, and a transmitter A242. Although there are two circuits (A226 to A229, and A236 to A239) required for detecting each transmission data, those two circuits may be changed to one circuit so as to serially detect each transmission data piece.

The antenna A240 to the spectral demapping unit A225 shown in FIG. 32 are the same as those of the seventh and eighth embodiments, and therefore explanations thereof are omitted here. It is assumed here that the encoding rate for transmission data C is smaller. In this case, received signals corresponding to the transmission data C have stronger resistance to interference and noise. For this reason, the transmission data C is decoded first, and signals corresponding to the transmission data C are cancelled as interference when the transmission data D is detected. Accordingly, only the channel-characteristic selector A222-1 that extracts elements interfering with the transmission data D is included, and a channel-characteristic selector that extracts elements interfering with the transmission data C is not included. This is because the signals corresponding to the transmission data D are unknown interference signals when the transmission data C is detected, and therefore cancelling is not required. The channel-characteristic selector that extracts elements interfering with the transmission data D may be provided after the channel estimator A219-2.

Hereinafter, detection of signals is explained. With respect to frequency-domain received signals corresponding to respective transmission data pieces output from the spectral demapping unit A225, a received signal of a subcarrier including the transmission data C is input to the first signal equalizer A226 to detect the transmission data C first. Then, operations up to one performed by the first decoder A229 are performed similarly to the seventh and eighth embodiments to output determination values or LLRs of respective bits. In this case, some subcarriers of the received signals corresponding to the transmission data C interfere with signals corresponding to transmission data D, but are regarded as unknown interference to detect the transmission data C.

The determination value of each bit output from the decoder A229 is processed as decoded data C as it is. At the same time, the decoded data is interleaved by the interleaver A230 to generate interference replicas for detecting transmission data D. Then, the interleaved data is input to the replica generator A231, and thereby frequency-domain signal replicas are generated through the S/P converter A232 and the second DFT unit A233. The frequency-domain signal replicas are converted by the S/P converter A232 into parallel replicas. Then, the DFT unit A233 performs DFT to convert the parallel replicas into frequency-domain signal replicas.

The interference spectrum selector A234 multiplies the frequency-domain signal replicas by a complex gain of a channel corresponding to the number of an interference subcarrier input from the channel-characteristic selector A222-1 to generate interference replicas. The interference signal canceller A235 removes the generated interference replicas from received signals of subcarriers including transmission data D input from the spectral demapping unit A225 to cancel only interference elements. The received signals from which interference has been cancelled are equalized by the second signal equalizer A236 and converted by the second demodulator A237 into respective encoded bits. Then, arrangement of the encoded bits is returned by the second deinterleaver A238 to the original arrangement. Then, the rearranged encoded bits are subjected to the error correction decoding performed by the second decoder A239, and thereby decoded data D can be obtained.

According to the ninth embodiment, the mobile station devices A82a and A82b on the transmitting side preliminarily process one group of signals so as to be easily decoded. Then, the base station device A72 preferentially detects signals that are easier to be decoded. The detected signals are regarded as known interference when the other group of signals is detected, and thereby both groups of signals can be detected. Additionally, not all subcarriers are used for generating interference replicas, and only subcarriers causing the interference are extracted by the interference spectrum selector A234, thereby reducing the amount of calculation required.

As operations to enable easy decoding on the receiving side, not only the encoding rate, but also a modulation scheme or transmission power may be controlled on the transmitting side. Additionally, the base station device A72 may determine the encoding rate, the modulation scheme, and the transmission power as well as the spectrum allocation, and transit these items to the mobile station devices A82a and A82b. Although it has been explained in the ninth embodiment that the two mobile station devices A82a and A82b have different configurations, one mobile station device may include multiple transmission antennas and perform the same operations.

Tenth Embodiment

The seventh to ninth embodiments have explained the transmission device that perform DFT to spread signals to the frequency domain, performs IDFT to convert the frequency-domain signals into time-domain signals, and transmits the time-domain signals, and the reception device corresponding to the transmission device. A tenth embodiment explains a system performing not DFT, but frequency spreading by multiplying transmitted signals by spreading codes. When orthogonal codes indicated by phase rotations are used as spreading codes, the same signals as in the case of spreading by DFT are generated, thereby reducing PAPR characteristics and peak powers of transmitted signals. If the peak power is so high as to exceed a performance limit of an amplifier when amplifying transmitted signals to obtain transmission powers, waveforms are distorted. However, the peak power is reduced in this manner, thereby enabling a reduction in distortion of waveforms at the time of amplification. The tenth embodiment explains a case where frequency spreading is performed using phase-rotation orthogonal spreading codes.

Figure 33:
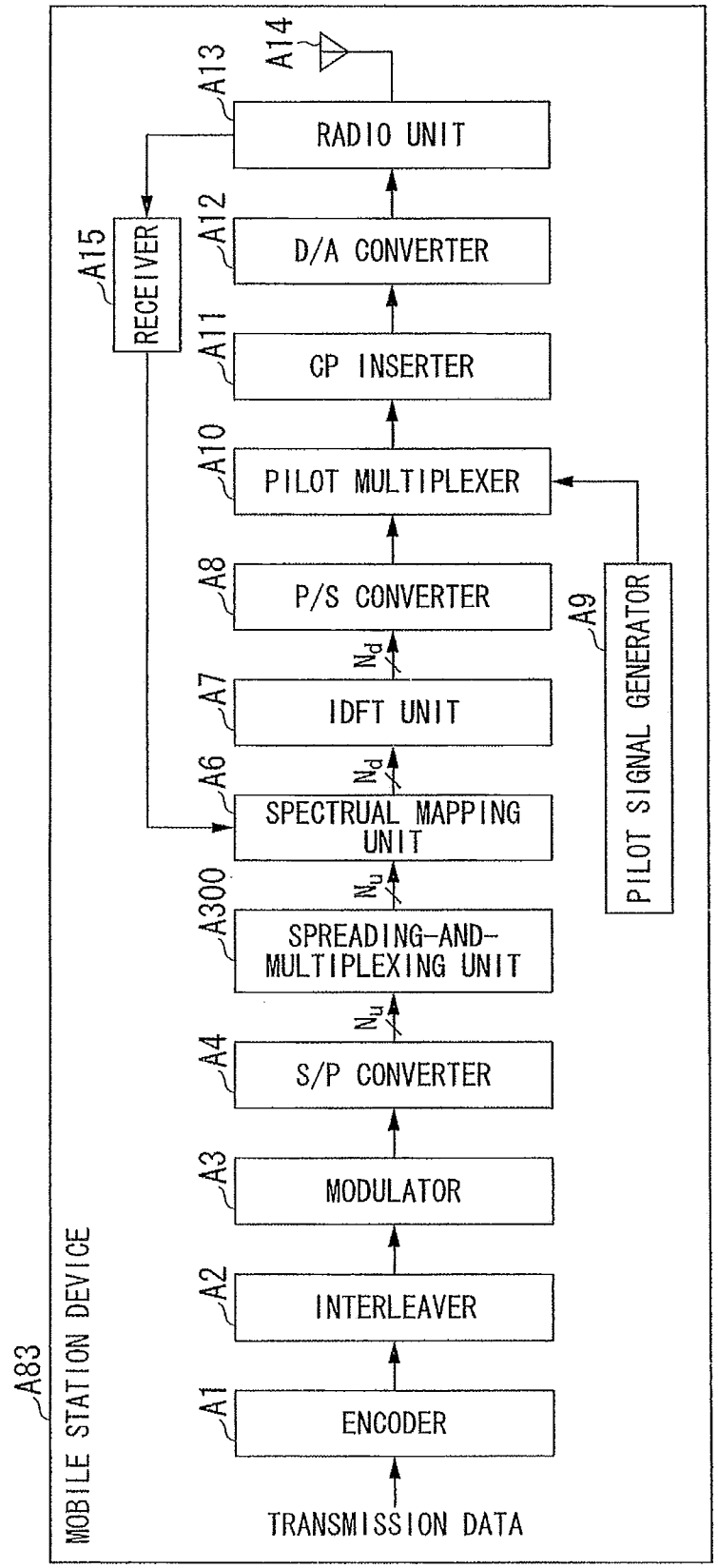
FIG. 33 is a schematic block diagram illustrating a configuration of a mobile station device 83 according to a tenth embodiment of the present invention.
Figure 34:
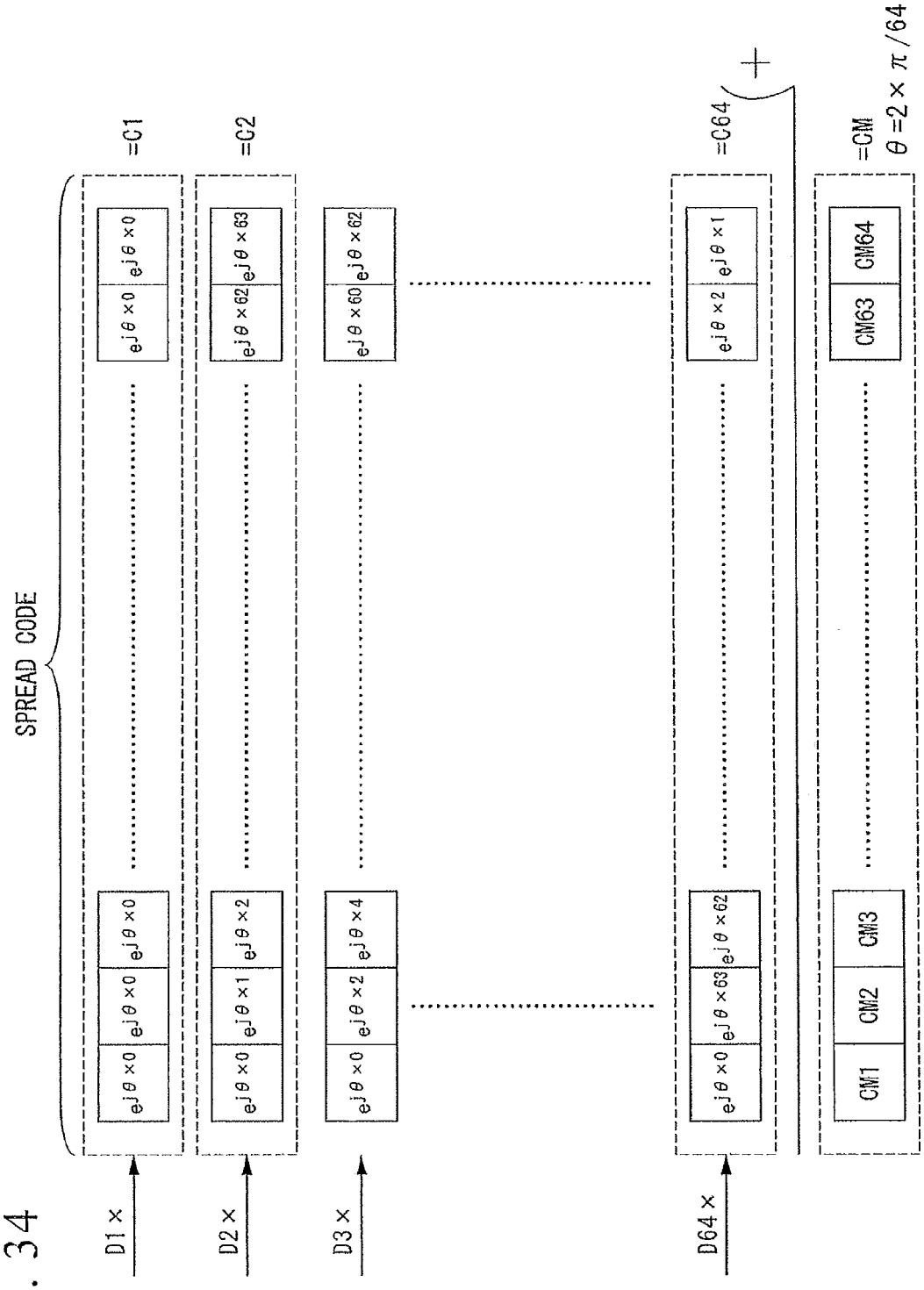
FIG. 34 illustrates an operation performed by a spreading-and-multiplexing unit 300 according to the tenth embodiment.

FIG. 33 is a schematic block diagram illustrating a configuration of a mobile station device A83 that is a transmission device according to the tenth embodiment. Except that the DFT unit A5 of the mobile station device A80 of the seventh embodiment shown in FIG. 28 is replaced with a spreading-and-multiplexing unit A300, other elements (A1, A2, A3, A4, A5, A6, A7, A8, A9, A10, A11, A12, A13, A14, and A42) of the mobile station device A83 shown in FIG. 33 have the same configurations as those of the mobile station device A80a shown in FIG. 28. The spreading-and-multiplexing unit A300 performs spreading and multiplexing as shown in FIG. 34. It is assumed here that the spreading code length is 64, and 64 phase-rotation orthogonal spreading codes are used. Accordingly, the number subcarriers used by one user (mobile station device A83) is also 64.

C1 to C64 shown in FIG. 34 denote spreading codes. Each element (chip) of the spreading code is a value indicated by phase rotation, such as $e^{j\theta \times 0}$, $e^{j\theta \times 1}$, and $e^{j\theta \times 2}$. e denotes the Napier number that is the base of natural logarithm. j denotes an imaginary unit. Modulation signals D1, D2, . . . , D64 are outputs of the S/P converter A4, which are modulated by the modulator A3, and then converted into parallel signals. The spreading-and-multiplexing unit A300 multiplies the modulation signals D1, D2, . . . , and D64 by the spreading codes C1, C2, . . . , and C64. In this case, the modulation signals D1 to D64 are copied for the code length (64 in this case) and multiplied by the respective chips of the spreading codes. Then, the results of these multiplications are added for the respective chips, and the resultant codes are multiplied, the result of which becomes an output of the spreading-and-multiplexing unit A300.

Also when phase-rotation orthogonal spreading codes are used instead of DFT, signals similar to ones in the case of DFT can be generated, thereby enabling transmission of the present invention with spectrum allocation in which some overlapping subcarriers are shared with another user. Accordingly, the reception device may be the base station device A70 having the configuration shown in FIG. 29 even when the mobile station device A83 includes the spreading-and-multiplexing unit A300. The DFT units A35-1 and A35-2 for generating replicas in the case of FIG. 29 may be replaced with the aforementioned spreading-and-multiplexing unit A300.

As explained above, the tenth embodiment has explained the case where orthogonal codes indicated by phase rotations are used for frequency spreading. However, the present invention is not limited thereto, and other orthogonal codes may be used for frequency spreading.

Eleventh Embodiment

It has been explained in FIG. 27 that the reliability of each bit is extracted from subcarriers free of interference. Accordingly, up to how many same-numbered subcarriers of subcarriers to which signals subjected to frequency spreading are to be allocated multiple transmission devices can select, i.e., a rate of overlapping subcarriers shared with multiple users (mobile station devices) can be determined. This determination is performed with use of received SNR (unknown interference power is assumed to be included in N) that is the ratio of desired signals and (unknown) interference signals to noise power by the spectrum-allocation determining unit A20 of the base station device A70 in the case of the seventh embodiment, by the spectrum-allocation determining unit A127 of the base station device A71 in the case of the eighth embodiment, or by the spectrum-allocation determining unit A220 of the base station device A72 in the case of the ninth embodiment. The unknown interference power indicates the power of interference which is caused by neighboring cells or another system using the same frequency band, and which cannot be cancelled.

Regarding an overlapping-subcarrier rate determining method using received SNR according to the present embodiment, specifically, some thresholds regarding received SNR are preliminarily set, while the thresholds are correlated with the number of subcarriers allowed to overlap. The greater the threshold is, a greater value is set to the number of overlapping subcarriers. Then, a received SNR of each user (average with respect to the band or some subcarriers) is measured. Then, it is determined in which range of one of the preliminarily set thresholds a result of the measurement is included, and thereby the number of overlapping subcarriers is calculated. In this case, if there is a big difference in received SNR among multiple users, the smallest SNR may be compared to the threshold to determine the rate of overlapping subcarriers. Thus, the smallest received SNR among multiple users is regarded as a reference, and thereby the reception device can properly demodulate signals transmitted from each user while preventing the number of overlapping subcarriers from increasing.

Apart from this, the rate of overlapping subcarriers can be determined using the input-output relationship of the mutual information amounts between the signal equalizers A27-1 and A27-2 of the seventh embodiment and the input-output relationship of the mutual information amounts between the decoders A30-1 and A30-2 of the seventh embodiment. Also in the eighth embodiment, the rate can be similarly determined using the signal equalizer A112 and the decoder A115. Hereinafter, as a method of determining the rate of overlapping subcarriers using the input-output relationship of the mutual information amounts, a determining method using an EXIT (Extrinsic Information Transfer) chart for analyzing internal repeated operations such as the turbo principle is explained.

Figure 35:
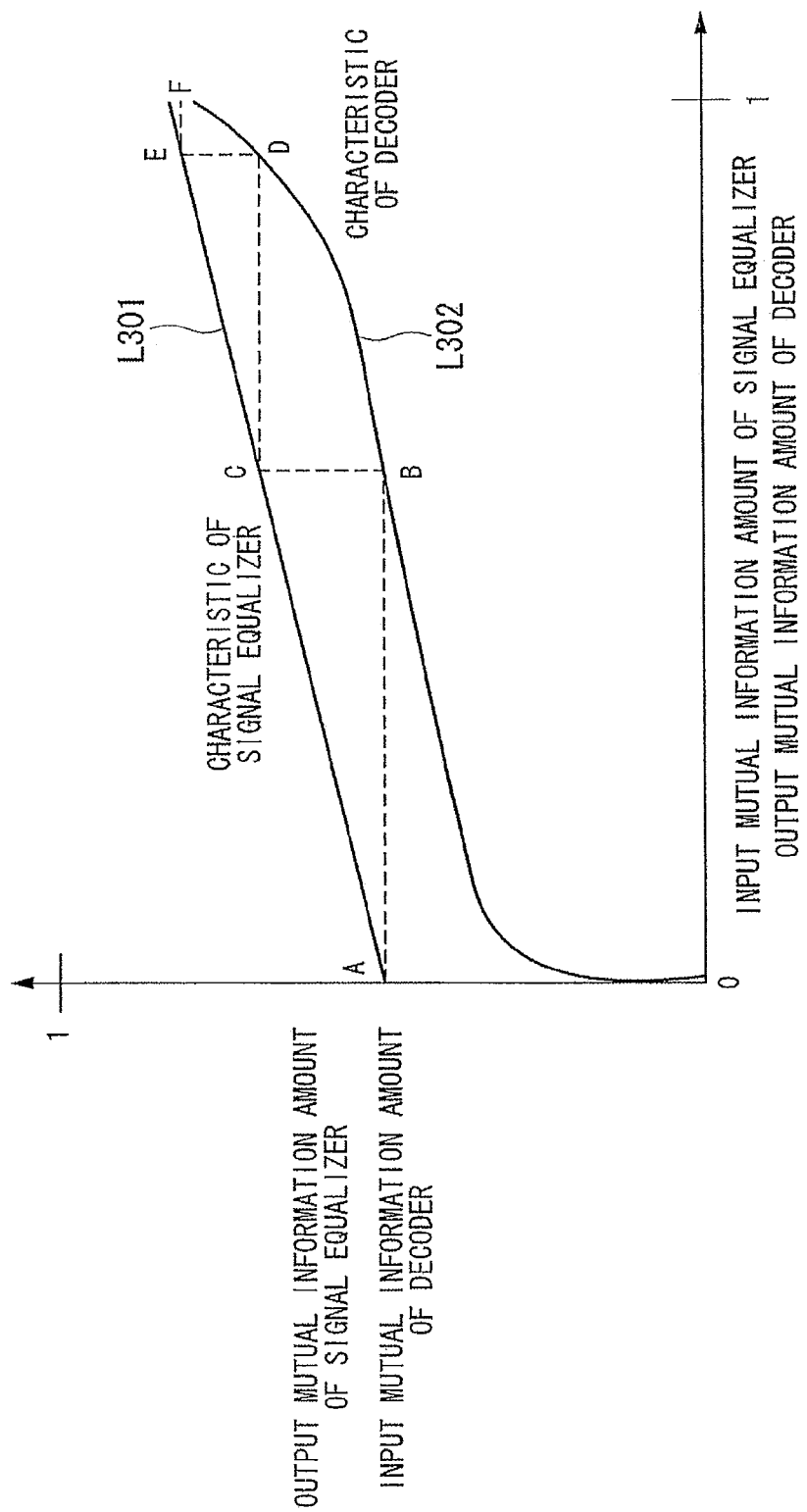
FIG. 35 illustrates an EXIT chart used for a method of determining the rate of overlapping subcarriers according to an eleventh embodiment of the present invention.

FIG. 35 illustrates an example of the EXIT chart. The horizontal and vertical axes shown in FIG. 35 denote the input mutual information amount of the signal equalizer and the output mutual information amount of the signal equalizer, respectively. Since the mutual information amount output from the signal equalizer is input to the decoder in the repeated operations, the vertical axis indicates the input mutual information amount of the decoder. Since the output of the decoder is the input mutual information amount of the signal equalizer, the horizontal axis indicates the mutual information amount of the decoder. The mutual information amount is the maximum information amount that can be obtained with respect to a signal X from a received signal Y when the signal X is transmitted and then the received signal Y is obtained. Since the mutual information amount is the maximum value of the information amount with respect to X obtained from the log likelihood rate Y in the case of analysis based on the EXIT chart, the maximum value is fixed to 1.

As shown in FIG. 35, a curve L301 denotes the input-output relationship of the mutual information amount of the decoder where the horizontal and vertical axes denote an output and an input, respectively. Since the larger power is required as the encoding rate increases, the curve shifts upward. On the other hand, a curve L302 denotes the input-output relationship of the mutual information amount of the signal equalizer where the horizontal and vertical axes denote an input and an output, respectively. Although the characteristics of the decoder (curve L301) are uniquely defined based on the encoding rate, the characteristics of the signal equalizer (curve L302) shift upward and downward, and therefore the encoding rate of, for example, 1% is used.

A viewpoint of FIG. 35 is explained here. Explanations are given with an example of a series of repeated operations from the operation of the signal canceller A26-1 to the operation of the interference spectrum selector A36-1. Since the input mutual information amount of the signal equalizer A27-1 is 0 in the first operation, the mutual information amount at the point A can be obtained as the output (this point is called a start point).

Then, since the output mutual information amount of the signal equalizer A27-1 is the input mutual information amount of the decoder A30-1, the output mutual information amount of the decoder A30-1 shifts as indicated by the doted line, and then shifts to a point B. After similar operations are repeated, the mutual information amount shifts to points C, D, E, and F (F is called an end point), and thus the internal state during the repeated operations is illustrated. The end point when a value on the horizontal axis is 1 indicates that all of other interference elements are cancelled, and the value is the rate of the received power of only the desired signals to noise power.

In other words, even if other signals are multiplexed at the time of transmission, the other signals are cancelled by means of interference replicas. Accordingly, perfect demultiplexing can be performed irrespective of other signals. The dotted line indicating this movement is called an EXIT locus. In this case, it can be determined whether or not transmission data can be detected by the repeated operations. If the curve of the decoder does not cross the line of the signal equalizer and is under the line of the signal equalizer as shown in FIG. 35, the EXIT locus reaches the end point where the horizontal value is 1, which is a desirable state.

Figure 36:
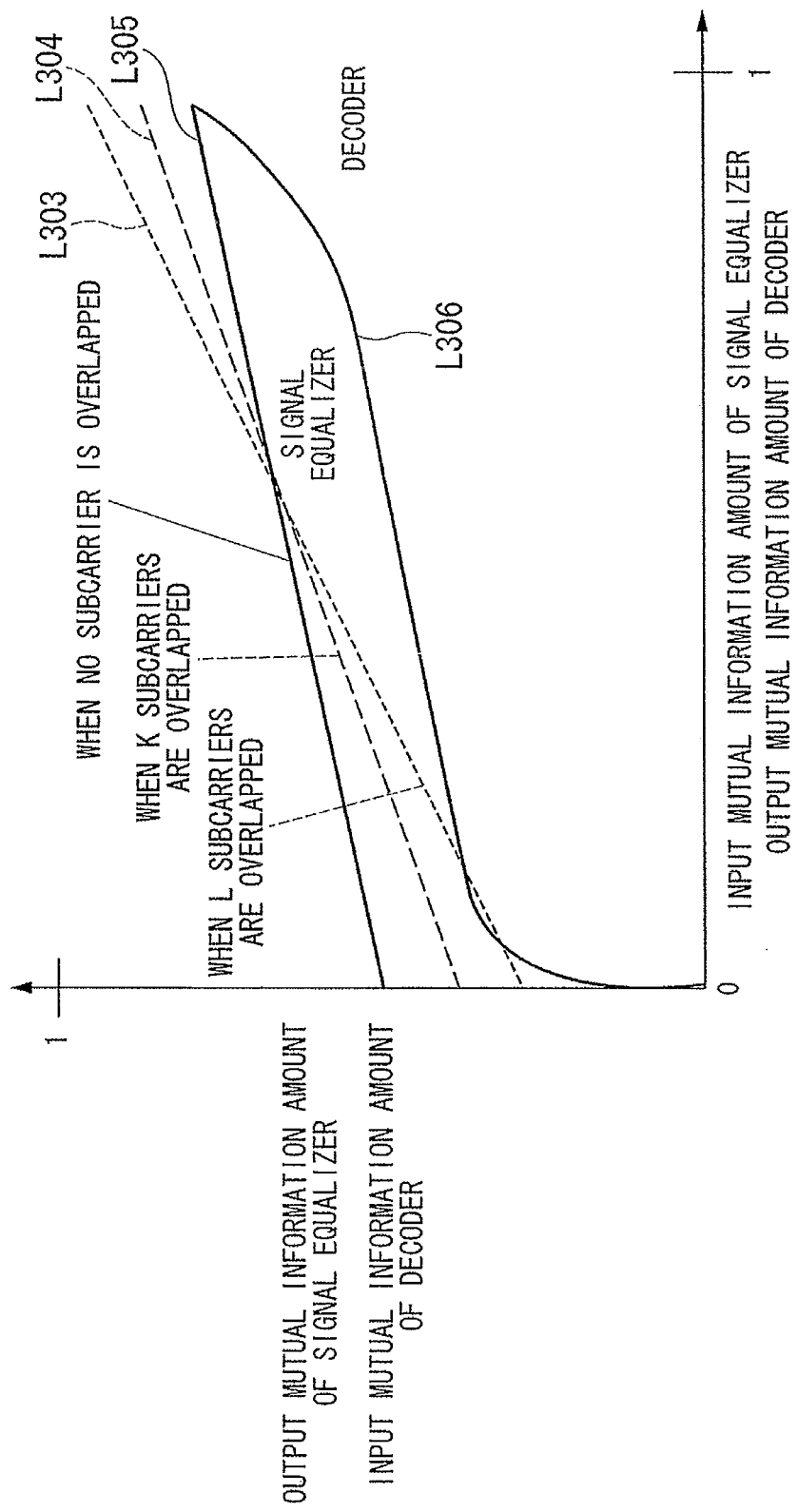
FIG. 36 illustrates an EXIT chart when the number of subcarriers is changed according to the eleventh embodiment.

FIG. 36 illustrates the EXIT chart when the number of subcarriers to be used by multiple users varies. In FIG. 36, a curve L303 denotes the characteristic of the signal equalizer when no subcarrier overlaps. A curve L304 denotes the characteristic of the signal equalizer when K subcarriers overlap. A curve L305 denotes the characteristic of the signal equalizer when L subcarriers overlap. A curve L306 denotes the characteristic of the decoder. It is assumed here that L>K. Also in FIG. 36, the mutual information amount finally obtained increases as the mutual information amount input to the signal equalizer increases. As will be explained in a twelfth embodiment, this is because subcarriers having good channel gains can be selected while the predetermined number of subcarriers (K and L subcarriers in this case) is allowed to overlap. For this reason, each transmission terminal can perform transmission using subcarriers having better channel conditions, i.e., received powers of desired signals finally obtained becomes large. On the other hand, the mutual information amount to be obtained decreases as the input mutual information amount decreases. This is because interference caused by overlapping subcarriers are not cancelled in the first stage, and therefore the interference have to be processed as unknown interference, which corresponds to the first operation of the seventh embodiment shown in FIG. 35.

In the case of FIG. 36, lines for up to K overlapping subcarriers are above the line L306 of the decoder, and therefore these overlapping subcarriers can be demultiplexed by the repeated operations. On the other hand, the line L303 for the L overlapping subcarriers crosses the curve L306 of the decoder. In this case, even if the EXIT locus is drawn, the locus ends at the cross point, and therefore the characteristic cannot be improved. In other words, the interference is too strong to be cancelled by extracting the reliability. Accordingly, a threshold allowing up to K subcarriers to overlap can be set in this case.

On the other hand, if L subcarriers are required to overlap, the curve L306 of the decoder is shifted downward. To implement this, the encoding rate may be reduced, and the resistance to the interference in the early stage of the repeated operations may be enhanced.

Thus, when the encoding rate is fixed, the number of overlapping subcarriers can be changed, and an EXIT locus is drawn, and thereby the number of overlapping subcarriers can be determined. On the other hand, when the number of overlapping subcarriers is limited, the encoding rate of the decoder is reduced so that a line of the decoder shifts downward. Therefore, the encoding rate or an encoding method (such as turbo coding or convolution coding) may be changed. Consequently, flexibility can be enhanced when the system design is optimized.

When the repeated operations are not performed as in the case of the ninth embodiment, the operation ends at the point B shown in FIG. 35. For this reason, the precision of signals to be detected first is enhanced if a value of the point B on the horizontal axis (output mutual information amount of the decoder) is set closer to 1, thereby making detection of signals to be detected later easier.

Twelfth Embodiment

Figure 37:
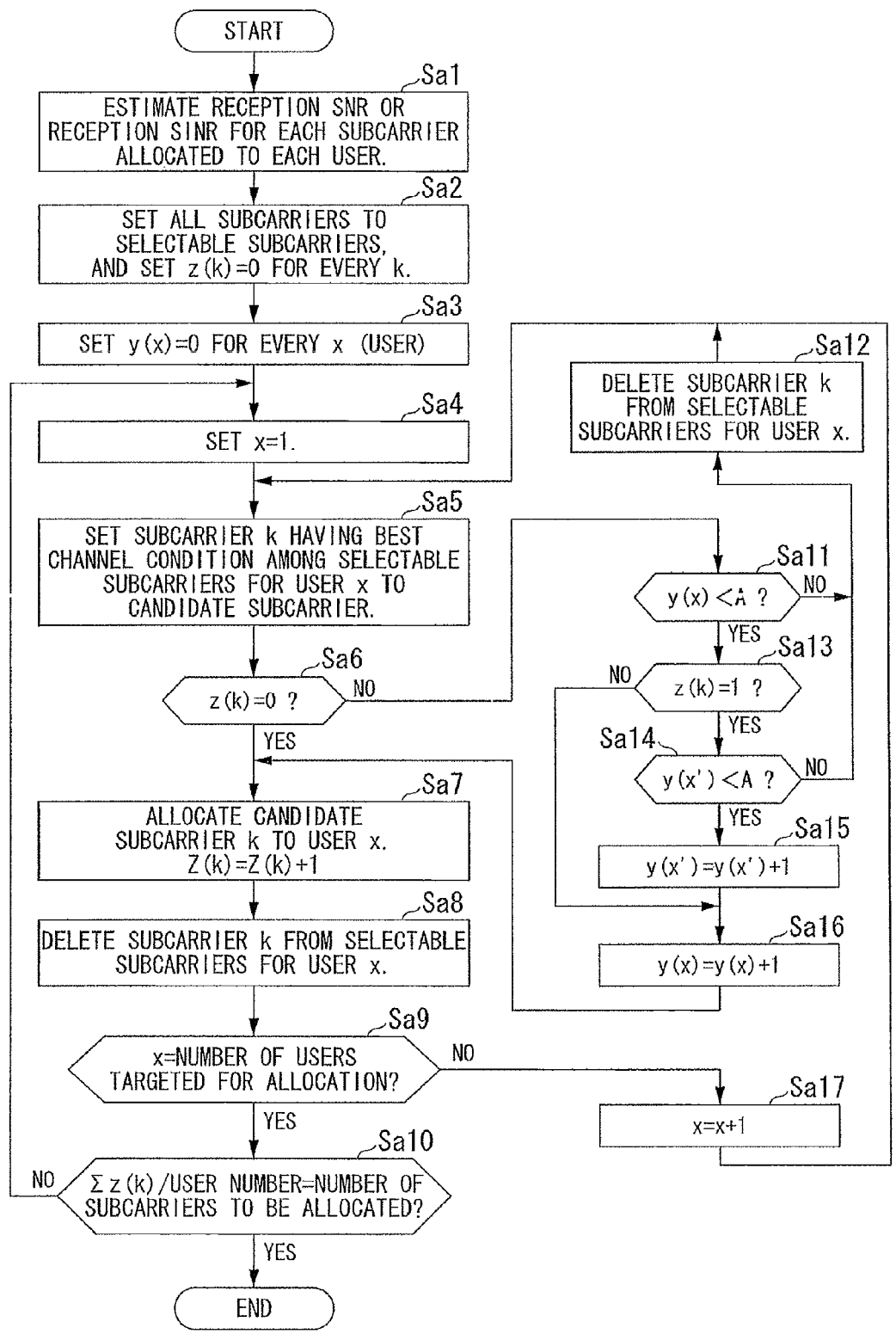
FIG. 37 is a flowchart illustrating an operation of spectrum-allocation determination according to a twelfth embodiment of the present invention.

FIG. 37 is a flowchart illustrating a scheduling (subcarrier-allocation determining) method when a communication method in which some of subcarriers used by respective users overlap, i.e., the scheduling operation of the spectrum-allocation determining unit A20 of the base station device A70 in the case of the seventh embodiment, the scheduling operation of the spectrum-allocation determining unit A127 of the base station device A71 in the case of the eighth embodiment, and the scheduling operation of the spectrum-allocation determining unit A220 of the base station device A72 in the case of the ninth embodiment. In the present embodiment, FIG. 37 illustrates the case where the same number of subcarriers is equally allocated to all users.

Regarding the scheduling method of the present embodiment shown in FIG. 37, received SNR or SINR of each subcarrier is measured for each user (Sa1). Since an uplink scheduling method is targeted in the present embodiment, the measurement in step S1 is performed by the base station device. In step Sa2, all subcarriers are set as selectable subcarriers that can be selected by all users (mobile station devices). Additionally, z(k)=0 for all subcarriers k (k denotes the subcarrier number).

z(k) denotes a function indicative of the number of spectra (signals) overlapping each subcarrier. In step Sa3, y(x)=0 for all users x (x denotes the user number). y(x) denotes a function indicative of the number of overlapping subcarriers shared by user x and another user. In the twelfth embodiment, scheduling is performed such that y(x) is equal to or less than the predetermined number of subcarriers (for example, the number set in the eleventh embodiment, which is denoted as A).

In the present embodiment, each user sequentially selects a subcarrier one by one. In the following operations, a subcarrier corresponding to the user number "x" is selected. In step Sa4, however, x=1 for the first operation, and then a subcarrier corresponding to the user number "1" is selected. Then, a subcarrier having the highest received SNR or SINR among selectable subcarriers corresponding to the user number "x" is set as a candidate subcarrier, as shown in step Sa5. When the number of subcarrier set as the candidate subcarrier is k, it is determined in step Sa6 whether or not the value of the function z(k) for the candidate subcarrier k is 0.

If z(k)=0, i.e., if the candidate subcarrier k is not selected by any user, the routine proceeds to step Sa7 in which the candidate subcarrier k is allocated to the user corresponding to the user number "x", and 1 is added to z(k). If z(k)≠0, i.e., if the candidate subcarrier k is selected by another user, the routine proceeds to step Sa1 in which it is determined whether or not y(x) is smaller than the predetermined subcarrier number A. If y(x)≥A as a result of the determination in step Sa11, the user corresponding to the user number "x" cannot share the overlapping subcarrier used by the other user any more, and therefore the routine proceeds to step Sa12 in which the candidate subcarrier k is deleted from the selectable subcarriers corresponding to the user number "x". Then, the routine returns to step Sa5 in which a subcarrier having the highest received SNR or SINR among the selectable subcarriers other than the candidate subcarrier deleted in step Sa12 is set as a candidate subcarrier for another allocation to be tried.

On the other hand, if y(x)<A as the result of the determination in step Sa11, the user corresponding to the user number "x" can share the overlapping subcarrier used by the other user. Then, the routine proceeds to step Sa13 in which it is determined whether or not the number of users already allocated to the candidate subcarrier k (users having already selected the candidate subcarrier k) is 1. If the number of users already allocated to the candidate subcarrier k is not 1 (i.e., equal to or greater than 2), 1 is added to y(x) in step Sa16, the candidate subcarrier k is allocated to the user corresponding to the user number "x" in step Sa1, and then 1 is added to z(k).

If it is determined in step Sa13 that the number of users already allocated to the candidate subcarrier k is 1, the routine proceeds to step Sa14 in which it is determined whether or not y(x') with respect to the user x' already allocated to the candidate subcarrier k is smaller than the predetermined number of subcarriers A. If y(x')≥A, the user corresponding to the user number x' cannot share the overlapping subcarrier used by the other user any more, the user corresponding to the user number x, who wants to share the candidate subcarrier k with the other user corresponding to the user number x', cannot select the candidate subcarrier k. Therefore, the routine proceeds from step Sa14 to step Sa12 in which the candidate subcarrier k is deleted from the selectable subcarriers with respect to the user number x, then returns to step S5 in which another subcarrier allocation is tried.

If y(x')<A in step Sa14, the user x' can share an overlapping subcarrier with other users (user x in this case). Therefore, 1 is added to y(x') and y(x) in step Sa15 and Sa16, and then the routine proceeds to step Sa7 in which the candidate subcarrier k is allocated to the user corresponding to the user number x.

After subcarriers are allocated in step Sa7, the candidate subcarrier k is deleted from the selectable subcarriers with respect to the user x in step Sa8. Then, the user number corresponding to a user currently targeted for allocation in step Sa9 is compared to the number of all users to determine whether or not one cycle of allocation to every user is performed. If the user number corresponding to the user currently targeted for allocation in step Sa9 is not identical to the number of all users, one cycle of allocation to every user has not yet been performed, and there are users who have not yet selected the same number of subcarriers other users have already selected. Therefore, the user number is updated in step Sa17, and then the routine returns to step Sa5.

If the user number corresponding to the user currently targeted for allocation in step Sa9 is identical to the number of all users, it indicates that one cycle of allocation to every user has already been performed. Therefore, the routine proceeds to step Sa11) in which z(k) are added for all the subcarriers, and then divided by the number of all users, and then it is determined whether or not the calculated number is identical to the number of subcarriers to be allocated to each user. If those numbers are identical to each other, it indicates that all subcarriers to be allocated have already been allocated. Then, the scheduling of the twelfth embodiment ends. If those numbers are not identical to each other, it indicates that all subcarriers to be allocated have not yet been allocated. Therefore, the routine returns to step Sa4 in which allocation is sequentially performed from the user 1 once again.

Conventionally, even if subcarriers having good received SNR or SINR are included in a transmittable band, and if the subcarriers are used by another device, the subcarriers cannot be used. For this reason, scheduling for determining which subcarrier is to be allocated to which transmission device is determined based on the usage of the other device, thereby making the scheduling algorithm complex.

According to the scheduling of the present embodiment, however, allocation can be performed in which the predetermined number of subcarriers or less can be shared with other users. Accordingly, scheduling can be performed without much consideration of the usage of subcarriers allocated to other users, thereby expanding a range of selectable subcarriers, and therefore achieving communication using subcarriers having better channel conditions. Additionally, the number of users to be simultaneously transmitted might be increased. For this reason, this scheduling may be called flexible scheduling in which limited resources can be efficiently used.

Thirteenth Embodiment

Figure 38A:
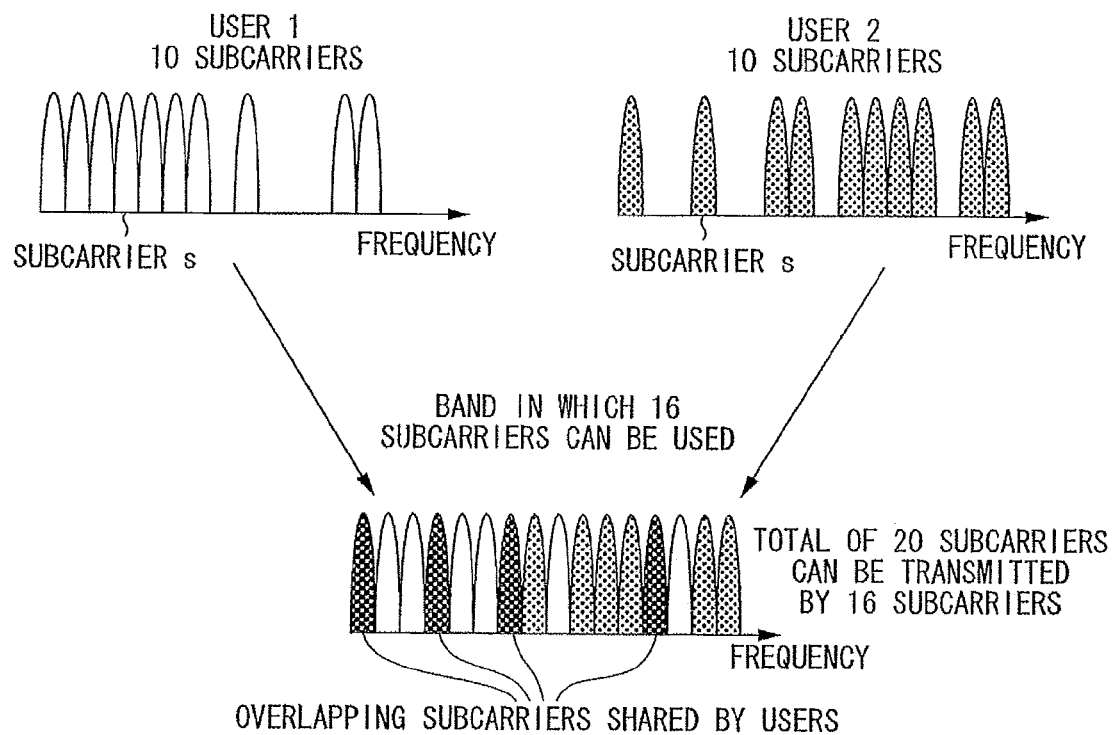
FIG. 38A illustrates an example of spectrum allocation when transmission is performed using subcarriers some of which are shared by users according to a thirteenth embodiment of the present invention.
Figure 38B:
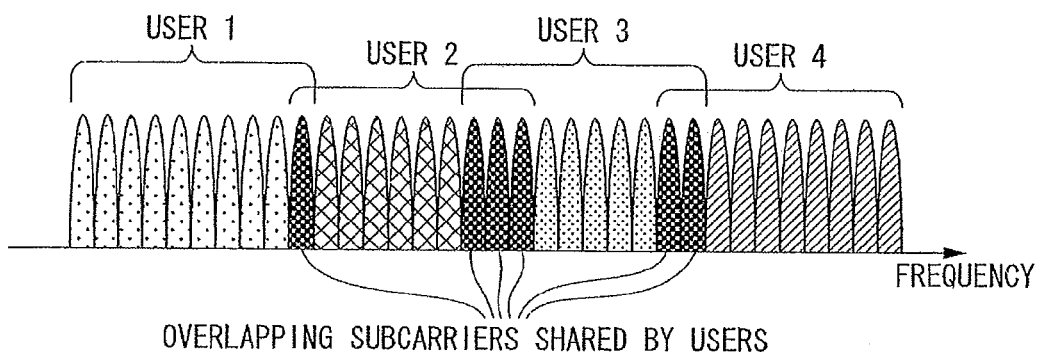
FIG. 38B illustrates an example of spectrum allocation when transmission is performed using subcarriers some of which are shared by users according to the thirteenth embodiment.

FIGS. 38A and 38B illustrate examples of spectrum allocation when transmission is performed using some overlapping subcarriers shared with multiple users according to the present invention. FIG. 38A illustrates spectrum allocation when each of two users has selected ten subcarriers achieving good reception characteristics, which are included in a band including 16 available subcarriers. It is assumed here that the predetermined number of overlapping subcarriers that can be shared among multiple users is 4. When overlapping subcarriers can be shared among users, information corresponding to 20 subcarriers in total can be transmitted using 16 subcarriers as shown in FIG. 38A. When the predetermined number of subcarriers is P, and the number of subcarriers available in the entire band is $N_d$, it indicates that $(N_d+P)/2$ subcarriers can be used by, for example, two users. Consequently, the present invention can be expected to greatly improve the transmission capacity.

Although FIG. 38A illustrates the case where subcarriers to be used by multiple users with use of SC-ASA are mixed, and arbitral overlapping subcarriers are shared with the users, alternatively, positions of overlapping subcarriers may be limited to some extent, not as in the case of SC-ASA where each user can use arbitral subcarriers. Such a case is shown in FIG. 38B. FIG. 38B illustrates a case where each of four users shares some overlapping subcarriers with other users. All subcarriers used by a user are continued. The overlapping subcarriers shared with the other users are edge subcarriers used by each user. Thus, users can be multiplexed by frequency division in which some subcarriers are allowed to overlap. According to the configuration, transmission efficiency can be greatly improved compared to the system in which frequencies are fully divided among users.

Fourteenth Embodiment

Figure 39:
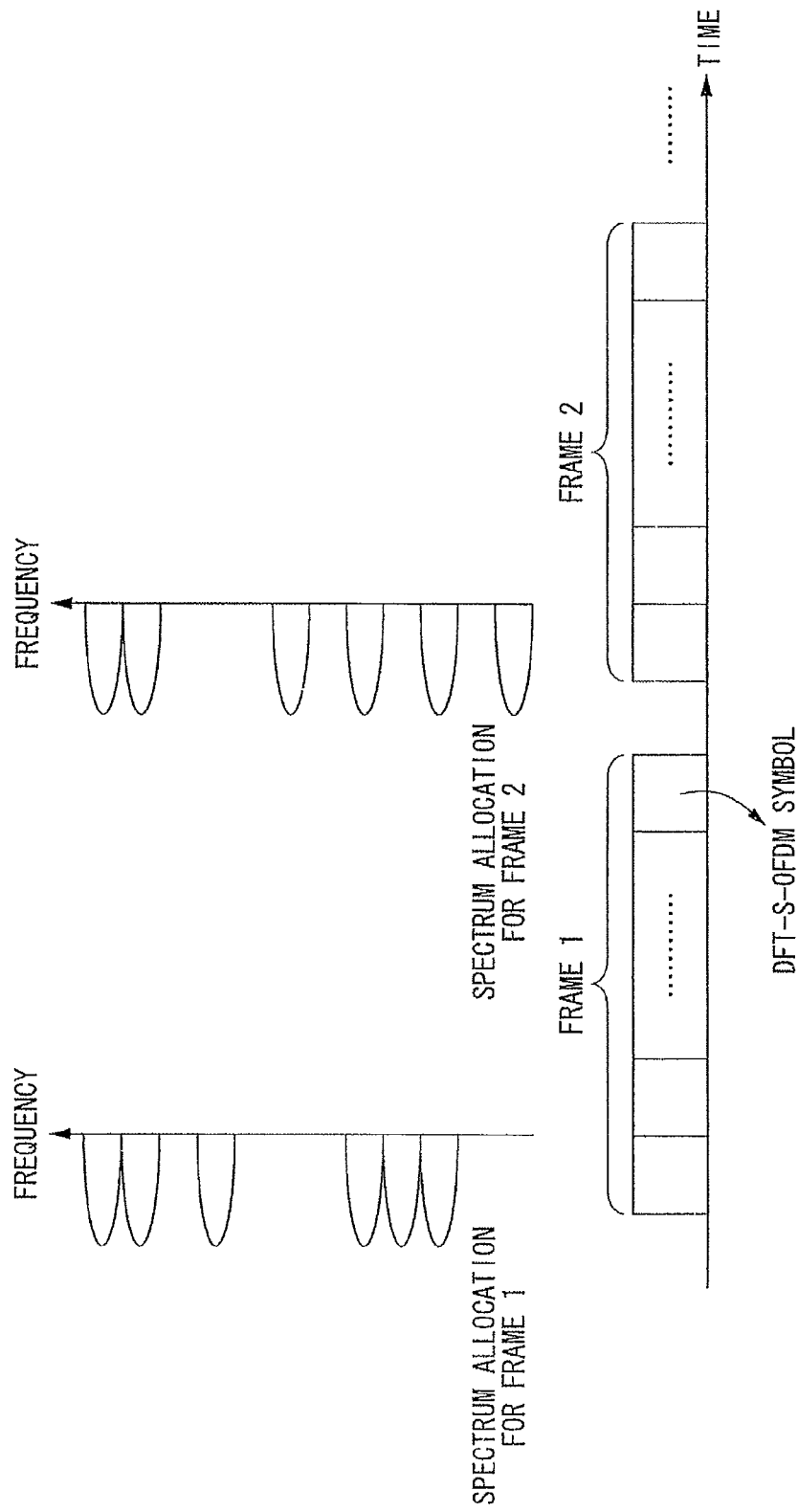
FIG. 39 schematically illustrates a case where transmission per frame is performed according to a fourteenth embodiment of the present invention.
Figure 40:
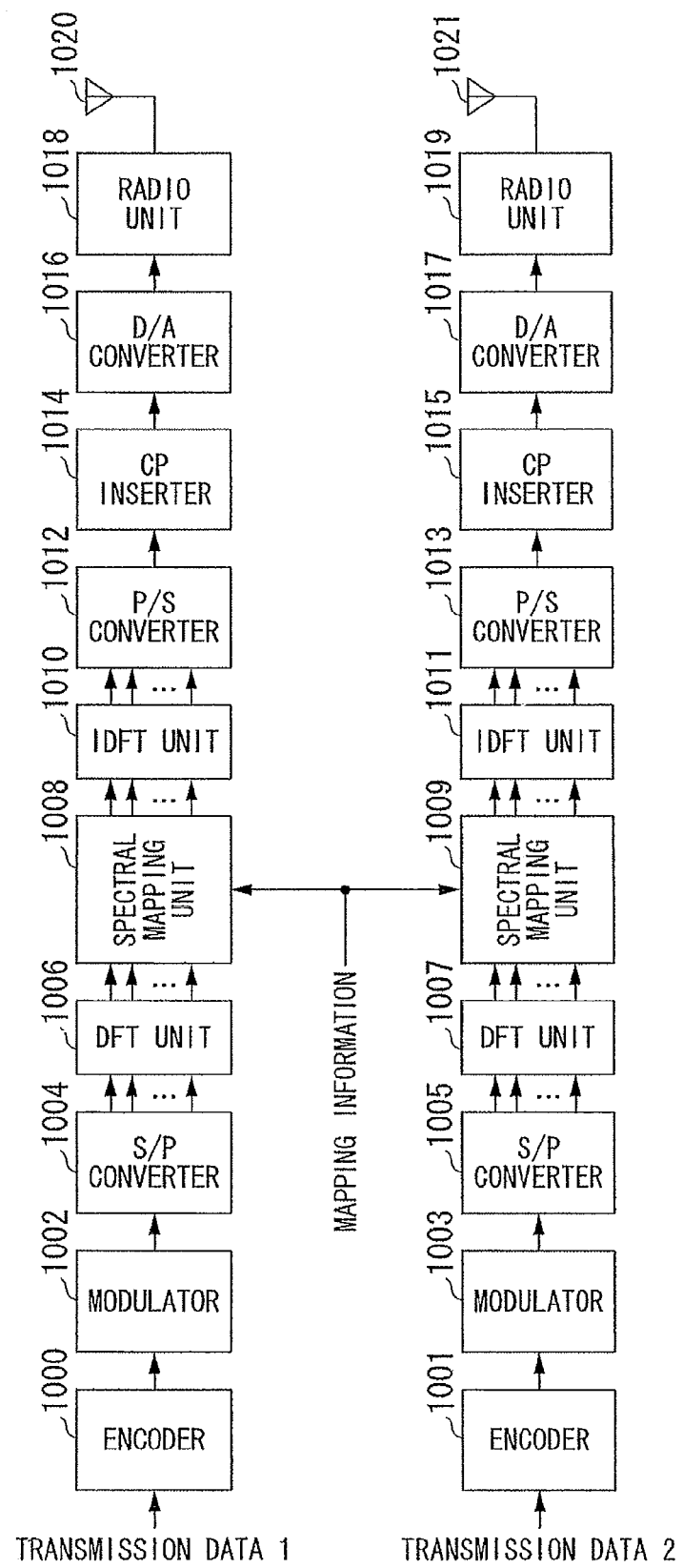
FIG. 40 is a schematic block diagram illustrating a configuration of a transmission device performing MIMO transmission using conventional SC-ASA.
Figure 41A:
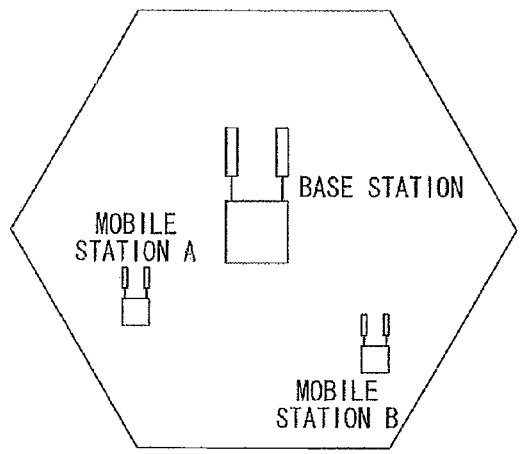
FIG. 41A schematically illustrates a radio communication system performing MIMO transmission using the conventional SC-ASA.
Figure 41B:
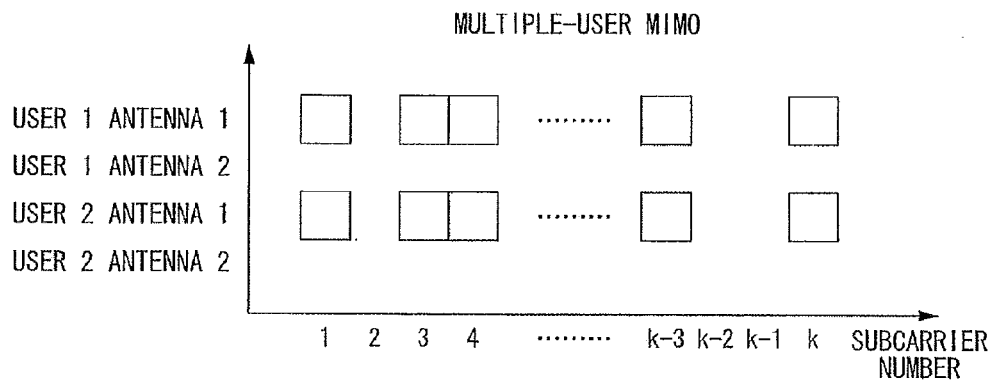
FIG. 41B illustrates a first example of subcarrier selection performed by the radio communication system performing MIMO transmission using the conventional SC-ASA.
Figure 41C:
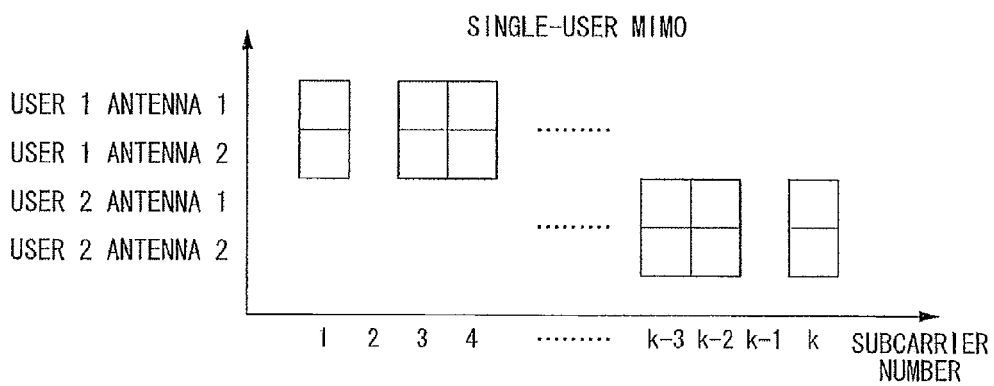
FIG. 41C illustrates a second example of subcarrier selection performed by the radio communication system performing MIMO transmission using the conventional SC-ASA.
Figure 42:
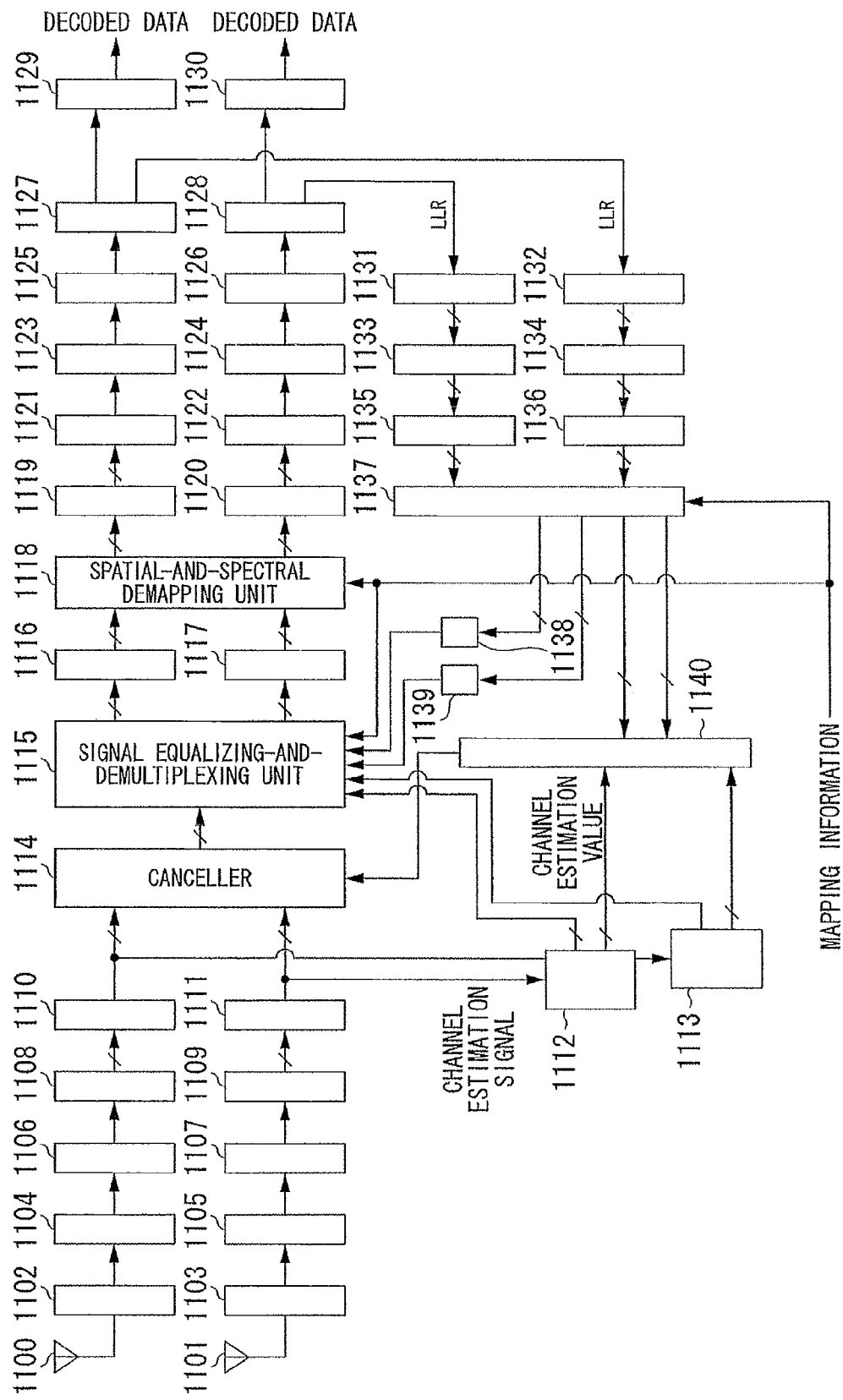
FIG. 42 is a schematic block diagram illustrating a configuration of a reception device performing MIMO transmission using the conventional SC-ASA.
Figure 43:
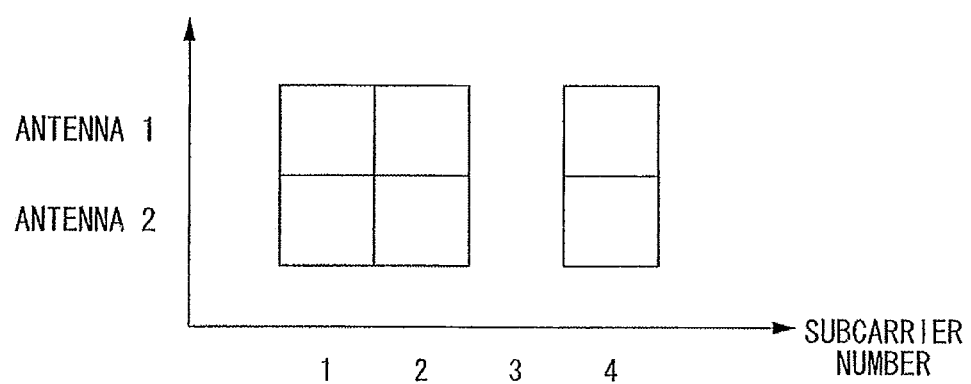
FIG. 43 illustrates an example of subcarrier selection performed by the radio communication system performing MIMO transmission using the conventional SC-ASA.
Figure 44A:
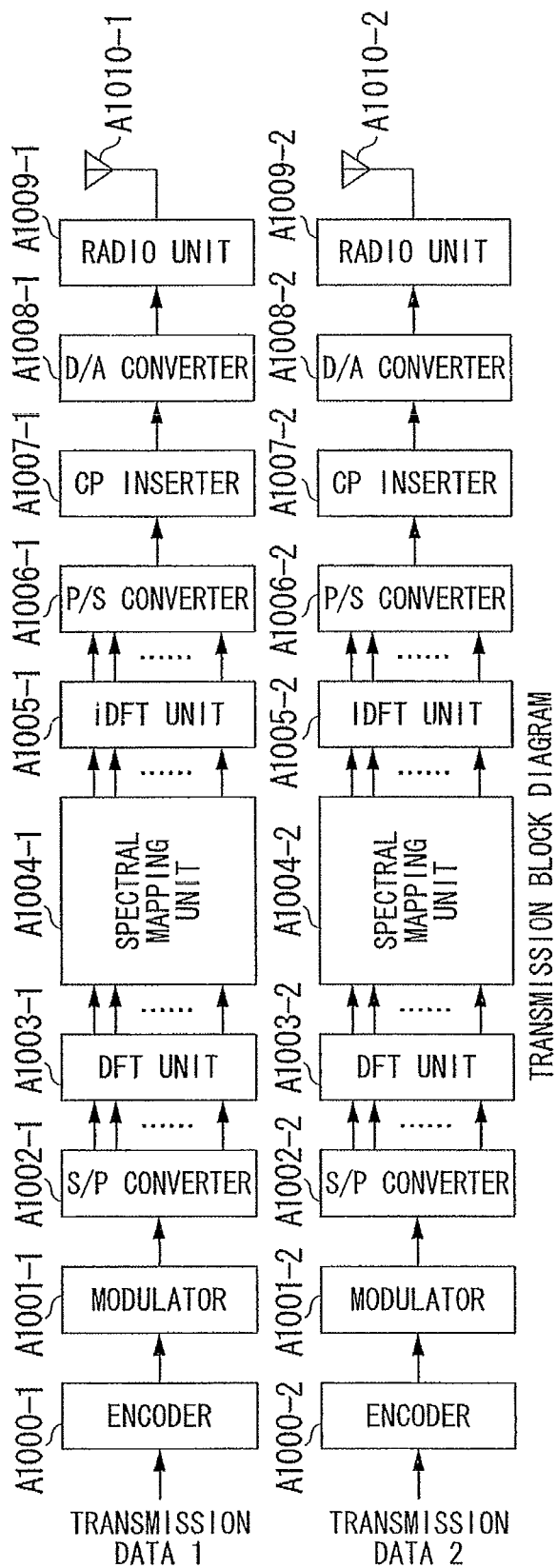
FIG. 44A is a schematic block diagram illustrating a configuration of a transmission device when two transmission stations perform user multiplexing using the conventional SC-ASA.
Figure 44B:
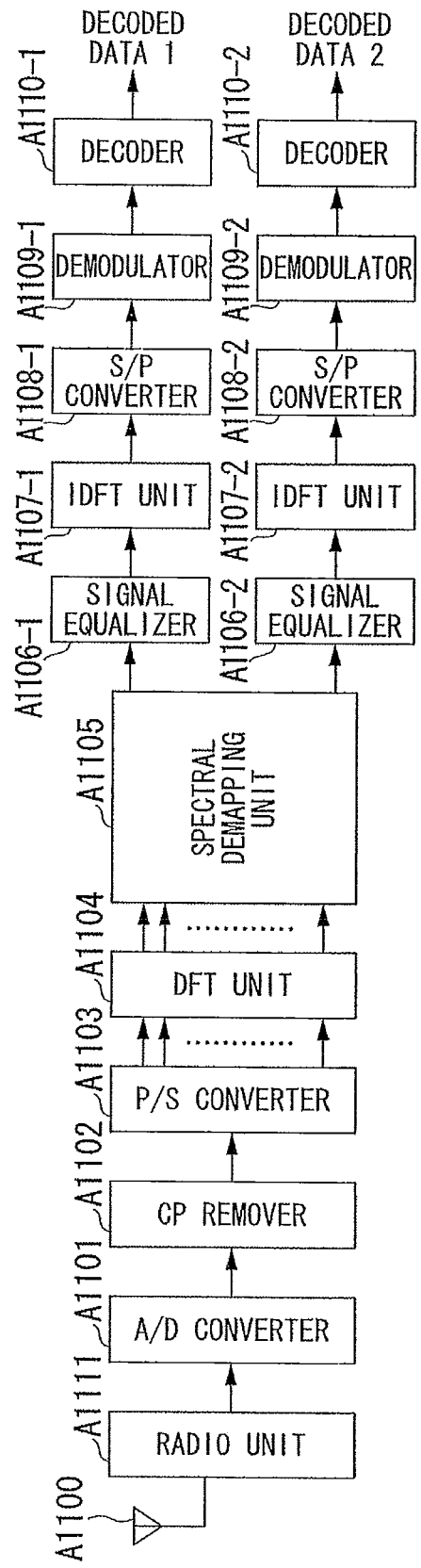
FIG. 44B is a schematic block diagram illustrating a configuration of a reception device when two transmission stations perform user multiplexing using the conventional SC-ASA.
Figure 45:
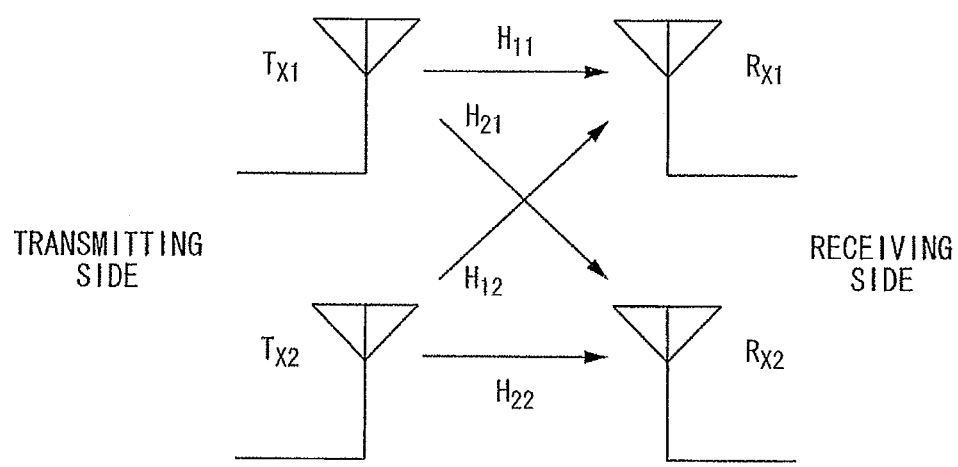
FIG. 45 illustrates transmission-and-reception channels for conventional MIMO transmission.

Generally, in a radio communication system, such as a cellular system, frames are formed by time-multiplexing multiple DFT-S-OFDM symbols (hereinafter called DFT-S-OFDM symbols) and then are transmitted. FIG. 39 schematically illustrates the case of transmission per frame. Spectrum allocation per frame is also shown in FIG. 39. As shown in FIG. 39, regarding scheduling of the present invention, selection of subcarriers may be changed in units of frames when each of the spectrum-allocation determining unit A20 of the base station device A70 of the seventh embodiment, the spectrum-allocation determining unit A127 of the base station device A71 of the eighth embodiment, or the spectrum-allocation determining unit A220 of the base station device A72 of the ninth embodiment selects subcarriers in good conditions for each user, and transmission using overlapping subcarriers is performed. According to the configuration, interference from neighboring cells varying in units of frames is prevented in single-cell frequency reuse system, thereby enabling higher transmission efficiency.

As shown in FIG. 39, selection of subcarriers is not required to be changed in units of frames, and may be changed for each user only when received SNR or SINR greatly varies. According to the configuration, the amount of control information required for communicating selected subcarriers can be reduced while subcarriers are selected correspondingly to the channel conditions.

Although it has been explained in the seventh to fourteenth embodiments that the radio communication system includes two mobile station devices that are transmission devices, the number of mobile station devices may be greater than 2. In this case, the maximum number of mobile station devices that can simultaneously allocate signals to one subcarrier is two in the case of the above configuration of each base station device. However, for example, if the number of groups each including the reference numerals A19-1, A21-1, A22-1, A26-1, A27-1, A28-1, A29-1, A30-1, A31-1, A32-1, A33-1, A34-1, A35-1, A36-1, and A37-1 is increased, the maximum number of mobile station devices that can be simultaneously allocated can be increased up to the increased number of the groups.

It has been assumed in the seventh to fourteenth embodiments that each radio communication system is one in which the mobile station device is the transmission device, and the reception device is the base station device. However, the radio communication system may be one using wireless LAN in which the reception device is a base station, and a transmission device is a terminal including the spectrum-allocation determining unit.

Programs for implementing the functions of the encoder 1, the converter 2, the S/P converter 3, the DFT units 4-1 and 4-2, the mapping units 5-1 and 5-2, the IDFT units 6-1 and 6-2, the GI inserters 7-1 and 7-2, and the P/S converters 8-1 and 8-2, which are shown in FIG. 3, may be stored in a computer-readable recording medium, and thereby operations of the respective units may be performed by a computer system reading the programs.

Programs for implementing the functions of the encoder 1, the modulator 2, the S/P converter 3, the DFT unit 4-1, the mapping unit 5-3, the IDFT units 6-1 and 6-2, the GI inserters 7-1 and 7-2, and the P/S converters 8-1 and 8-2, which are shown in FIG. 5, may be stored in a computer-readable recording medium, and thereby operations of the respective units may be performed by a computer system reading the programs.

Programs for implementing the functions of: CP removers 106 and 107; S/P converters 108, 109, 135, and 136; DFT units 110, 111, 116, 117, 137, 138, 139, and 140; channel estimators 112 and 113; a canceller 114; signal equalizing-and-demultiplexing unit 115; a spatial-and-spectral demapping unit 118; IDFT units 119, 120, 121, 122, 142, and 143; P/S converters 123 and 124; demodulators 125 and 126; decoders 127 and 128; repetition controllers 129 and 130; determining units 131 and 132; replica generators 133 and 134; a spatial-and-spectral mapping unit 141; a channel multiplier 144; a channel reconfiguring unit 145; a spectrum determining unit 146; an interference-power estimator 147; and a transmitter 148, which are shown in FIG. 6, may be stored in a computer-readable recording medium, and thereby operations of the respective units may be performed by a computer system reading the programs.

Programs for implementing the functions of: CP removers 106 and 107; S/P converters 108, 109, 135, and 136; DFT units 110, 111, 116, 117, 137, 138, 139, and 140; channel estimators 112 and 113; a canceller 114; signal equalizing-and-demultiplexing unit 115; a spatial-and-spectral demapping unit 118; IDFT units 119, 120, 121, and 122; P/S converters 123 and 124; demodulators 125 and 126; decoders 127 and 128; repetition controllers 129 and 130; determining units 131 and 132; replica generators 133 and 134; a spatial-and-spectral mapping unit 141; a channel multiplier 144; a channel reconfiguring unit 145; a spectrum determining unit 146; an interference-power estimator 147; and a transmitter 148, which are shown in FIG. 9, may be stored in a computer-readable recording medium, and thereby operations of the respective units may be performed by a computer system reading the programs.

Programs for implementing the functions of: CP removers 106, 107, 316, and 317; S/P converters 108, 109, 318, 319, 135, and 136; DFT units 110, 111, 320, 321, 137, 138, 139, and 140; channel estimators 112, 113, 322, and 323; a canceller 114; signal equalizing-and-demultiplexing unit 300; a spatial-and-spectral demapping unit 301; IDFT units 119, 120, 121, and 122; P/S converters 123 and 124; demodulators 125 and 126; decoders 127 and 128; repetition controllers 129 and 130; determining units 131 and 132; replica generators 133 and 134; a spatial-and-spectral mapping unit 141; a channel multiplier 144; a channel reconfiguring unit 302; a spectrum determining unit 146; an interference-power estimator 147; and a transmitter 148, which are shown in FIG. 12, may be stored in a computer-readable recording medium, and thereby operations of the respective units may be performed by a computer system reading the programs.

Programs for implementing the functions of: DFT units 110 and 111; channel estimators 112 and 113; IDFT units 119, 120, 121, and 122; P/S converters 123 and 124; demodulators 125 and 126; decoders 127 and 128; repetition controllers 129 and 130; determining units 131 and 132; replica generators 133 and 134; S/P converters 135 and 136; DFT units 137, 138, 139, and 140; a spatial-and-spectral mapping unit 141; a channel multiplier 144; a channel reconfiguring unit 145; signal equalizing-and-demultiplexing units 201-1 and 201-2; and a spatial-and-spectral demapping unit 500, which are shown in FIG. 15, may be stored in a computer-readable recording medium, and thereby operations of the respective units may be performed by a computer system reading the programs.

Programs for implementing the functions of: the DFT units 110 and 111; the channel estimators 112 and 113; the canceller 200; the signal equalizing-and-demultiplexing unit 201; the channel reconfiguring unit 221; the channel multiplier 220; the spatial-and-spectral demapping unit 501; the spatial-and-spectral mapping unit 502; the IDFT unit 115 and 117; the P/S converter 120; the demodulator 122; the decoder 124; the repetition controller 205; the determining unit 207; the replica generator 210; the S/P converter 212; and the DFT units 215 and 216, which are shown in FIG. 19, may be stored in a computer-readable recording medium, and thereby operations of the respective units may be performed by a computer system reading the programs.

Programs for implementing the functions of the encoder 1, the modulator 2, the S/P converter 3, the spreading-and-multiplexing units 50-1 and 50-2, the mapping unit 5-1 and 5-2, the IDFT units 6-1 and 6-2, the GI inserters 7-1 and 7-2, the P/S converters 8-1 and 8-2, and the receiver 11, which are shown in FIG. 24, may be stored in a computer-readable recording medium, and thereby operations of the respective units may be performed by a computer system reading the programs.

Programs for implementing the functions of: the encoder A1; the interleaver A2; the modulator A3; the S/P converter A4; the DFT unit A5; the spectral mapping unit A6; the IDFT unit A7; the P/S converter A8; the pilot signal generator A9; the pilot multiplexer A10; and the CP inserter A11, which are shown in FIG. 28, may be stored in a computer-readable recording medium, and thereby operations of the respective units may be performed by a computer system reading the programs.

Programs for implementing the functions of: the CP remover A17; the pilot demultiplexer A18; the channel estimator A19-1 and A19-2; the spectrum-allocation determining unit A20; the channel-characteristic demapping units A21-2 and A21-2; the channel characteristic selectors A22-1 and A22-2; the S/P converter A23; the DFT unit A24; the spectral demapping unit A25; the signal cancellers A26-1 and A26-2; the signal equalizers A27-1 and A27-2; the demodulators A28-1 and A28-2; the deinterleavers A29-1 and A29-2; the signal equalizers A27-1 and A27-2; the demodulators A28-1 and A28-2; the deinterleavers A29-1 and A29-2; the decoders A30-1 and A30-2; the repeated number controllers A31-1 and A31-2; the interleavers A32-1 and A32-2; the replica generators A33-1 and A33-2; the S/P converters A34-1 and A34-2; the DFT units A35-1 and A35-2; and the interference spectrum selectors A36-1 and A36-2, which are shown in FIG. 29, may be stored in a computer-readable recording medium, and thereby operations of the respective units may be performed by a computer system reading the programs.

Programs for implementing the functions of: the CP remover A102; the pilot demultiplexer A103; the channel estimators A104-1 and A104-2; the channel-characteristic demapping-and-selecting units A105-1 and A105-2; the interference signal canceller A107; the S/P converter A108; the DFT unit A109; the spectral demapping unit A110; the desired signal canceller A111; the signal equalizer A112; the demodulator A113; the deinterleaver A114; the decoder A115; the repeated number controller A116; the interleaver A117; the replica generator A118; the S/P converter A119; the DFT unit A120; the interference spectrum selector A121; the spectral mapping unit A122; the IDFT unit A123; the P/S converter A124; the determining unit A125; and the spectrum-allocation determining unit A127, which are shown in FIG. 30, may be stored in a computer-readable recording medium, and thereby operations of the respective units may be performed by a computer system reading the programs.

Programs for implementing the functions of: the encoders A200a and A200b; the interleaver A202; the modulator A202;

the S/P converter A203; the DFT unit A205; the spectral mapping unit A206; the IDFT unit A207; the P/S converter A208; the pilot signal generator A209; the pilot multiplexer A210; the CP inserter A211; and the D/A converter A212, which are shown in FIG. 31, may be stored in a computer-readable recording medium, and thereby operations of the respective units may be performed by a computer system reading the programs.

Programs for implementing the functions of: the CP remover A217; the pilot demultiplexer A218; the channel estimators A219-1 and A219-2; the spectrum-allocation determining unit A220; the channel-characteristic demapping units A221-1 and A221-2; the channel-characteristic selector A222-1; the S/P converter A223; the DFT unit A224; the spectral demapping unit A225; the signal equalizer A226; the demodulator A227; the deinterleaver A228; the decoder A229; the interleaver A230; the replica generator A231; the S/P converter A232; the DFT unit A233; the interference spectrum selector A234; the interference signal canceller A235; the signal equalizer A236; the demodulator A237; the deinterleaver A238; and the decoder A239, which are shown in FIG. 32, may be stored in a computer-readable recording medium, and thereby operations of the respective units may be performed by a computer system reading the programs.

Programs for implementing the functions of: the encoder A1; the interleaver A2; the modulator A3; the S/P converter A3; the spreading-and-multiplexing unit A300; the spectral mapping unit A6; the IDFT unit A7; the P/S converter A8; the pilot signal generator A9; the pilot multiplexer A10; and the CP inserter A11, which are shown in FIG. 33, may be stored in a computer-readable recording medium, and thereby operations of the respective units may be performed by a computer system reading the programs.

The "computer system" described here includes OS and hardware, such as peripheral devices. The "computer-readable recording medium" includes a portable medium, such as flexible disk, an optical disc, an ROM, a CD-ROM, and the like, and a storage device such as a hard disk installed in a computer system. The "computer-readable recording medium" includes a medium dynamically storing a program for a short period, such as a communication line when a program is transmitted through a network such as the Internet or a communication line such as a telephone line. Additionally, the "computer-readable recording medium" includes a medium storing a program for a given period, such as volatile memory in a computer system of a server or a client in the above case. The program may be one for implementing a part of the aforementioned functions or one for implementing the aforementioned functions by combining another program stored in the computer system.

As explained above, embodiments of the present invention has been explained with reference to the drawings. The specific configuration is not limited to these embodiments, and various modifications can be made without departing from the scope of the present invention.

INDUSTRIAL APPLICABILITY

The present invention is suitable to, but not limited to, a mobile communication system performing uplink communication from a mobile station device to a base station device using SC-ASA.

The invention claimed is:

1. A base station device comprising:
a radio unit configured to transmit a first information indicating a first set of subcarriers composed of two or more continuously subcarriers for assigning to a first communication device and a second information indicating a second set of subcarriers composed of two or more continuously subcarriers for assigning to a second communication device; and
one or more reception antennas configured to receive a first Discrete Fourier Transform-spread-OFDM (DFT-S-OFDM) signal from the first communication device and a second Discrete Fourier Transform-spread-OFDM (DFT-S-OFDM) signal from the second communication device, wherein
at least a portion of the second set of subcarriers overlaps with a portion of the first set of subcarriers.

2. The base station device according to claim 1, wherein the first DFT-S-OFDM signal is generated by the first communication device converting a first time-domain signal into a first plurality of frequency-domain signals and allocating the first plurality of frequency-domain signals onto a plurality of subcarriers indicated by the first information and the second DFT-S-OFDM signal is generated by the second communication device converting a second time-domain signal into a second plurality of frequency-domain signals and allocating the second plurality of frequency-domain signals onto a plurality of subcarriers indicated by the second information.

3. The base station device according to claim 1, wherein the number of the reception antennas is less than the total number of the first communication device and one or more other communication devices including at least the second communication device transmitting transmission signals using one or more subcarriers of the first set of subcarriers simultaneously.

4. The base station device according to claim 1, wherein the first set of subcarriers is specified referring to a channel capacity of each subcarrier of a third set of subcarriers including at least the first set of subcarriers, in order to transmit the first information to the first communication device.

5. The base station device according to claim 1, wherein the first set of subcarriers is specified referring to a ratio of received signal power to an interference-and-noise power of each of subcarriers of a third set of subcarriers including at least the first set of subcarriers, in order to transmit the first information to the first communication device.

6. The base station device according to claim 1, wherein the first set of subcarriers is specified referring to a channel capacity of each of subcarriers of a third set of subcarriers including at least the first set of subcarriers, in order to transmit the first information to the first communication device.

7. The base station device according to claim 6, wherein the channel capacity is given by:

$$C_m(k) = \log_2\left(1 + \frac{E_S}{N_T}\xi_m^H(k)\xi_m(k)\sum_m^{-1}(k)\right)$$

where m is a number allocated to each of a plurality of transmission antennas, k is a number allocated to each of the first set of subcarriers, $N_T$ is the number of the plurality of transmission antennas, $E_S$ is a transmission energy of the communication device, $\zeta_m(k)$ is a channel vector for a first subcarrier allocated with k, the first subcarrier is transmitted from a transmission antenna allocated with m, and $\Sigma_m(k)$ is an interference noise power for the first set of subcarriers.

8. The base station device according to claim 2, further comprising:
a canceller configured to cancel a predetermined signal from reception signal; and
an equalizing unit configured to perform a first equalization process on the reception signal from which the predetermined signal is cancelled.

9. The base station device according to claim 8, wherein the canceller is configured to cancel a portion of the first plurality of frequency-domain signals in a case where the number of translation stream is composed of at least the first plurality of frequency-domain signals and the second plurality of frequency-domain signals is less than the number of the reception antennas.

10. The base station device according to claim 8, wherein the canceller is configured to cancel a portion of the first plurality of frequency-domain signals based on characteristics of the first plurality of frequency-domain signals and the second plurality of frequency-domain signals.

11. The base station device according to claim 8, wherein the equalizing unit is configured to perform the first equalization process using a first reliability of a first equalized signals which are associated with the first DFT-S-OFDM signals and a second reliability of a second equalized signals which are associated with the first DFT-S-OFDM signals on the reception signal from which the predetermined signal is cancelled.

12. The base station according to claim 11, wherein the equalizing unit is configured to perform the first equalization process, in order to detect either the first or second DFT-S-OFDM signals associated with a higher reliability and thereafter to perform a second equalization process, in order to detect either the first or second DFT-S-OFDM signals associated with a lower reliability.

13. The base station according to claim 8, further comprising:
a channel estimating unit configured to calculate a plurality of channel estimation values for a plurality of channels between the first and second communication devices and the base station; and
a channel reconfiguring unit configured to generate a virtual sub-channel including the first set of subcarriers transmitted from one of the first and second communication devices, and the channel reconfiguring unit being configured to extract a channel estimation value for the virtual sub-channel among the plurality of the channel estimation values,
wherein the equalizing unit is configured to perform the first equalization process using the channel estimation value extracted.

14. The base station device according to claim 1, wherein
a first portion of the first set of subcarriers overlaps with a first portion of the second set of subcarriers,
the first portion of the first set of subcarriers does not overlaps with a second portion of the second set of subcarriers,
a second portion of the first set of subcarriers does not overlaps with the first portion of the second set of subcarriers, and
the second portion of the first set of subcarriers does not overlaps with the second portion of the second set of subcarriers.

15. The base station device according to claim 1, wherein
a first portion of the first set of subcarriers overlaps with all of the second set of subcarriers, and
a second portion of the first set of subcarriers does not overlaps with the second set of subcarriers.

16. A communication device comprising:
a reception antenna configured to receive information indicating a first set of subcarriers composed of two or more subcarriers from a base station; and
a Discrete Fourier Transform (DFT) unit configured to perform a Discrete Fourier Transform to convert a transmission data which is a first time-domain signal into a plurality of frequency-domain signals;
a spectrum mapping unit configured to allocate the plurality of frequency-domain signals to a first set of subcarriers, at least a portion of the first set of subcarriers overlapping in frequency at least a portion of a second set of subcarriers allocated to at least one other communication device; and
an Inverse Discrete Fourier Transform (IDFT) unit configured to perform an Inverse Discrete Fourier Transform to convert the plurality of frequency-domain signals allocated into a second time-domain signal, the plurality of frequency-domain signals allocated is signals allocated the first set of subcarriers by the spectrum mapping unit.

17. The communication device according to claim 16, wherein
the spectrum mapping unit is configured to group the transmission data into at least two groups, and allocate each of the at least two groups to the first set of subcarriers.

18. A wireless communication method for a base station device, the wireless communication method comprising:
transmitting a first information indicating a first set of subcarriers composed of two or more continuously subcarriers for assigning to a first communication device and a second information indicating a second set of subcarriers composed of two or more continuously subcarriers for assigning to a second communication device; and
receiving a first Discrete Fourier Transform-spread-OFDM (DFT-S-OFDM) signal from the first communication device and a second Discrete Fourier Transform-spread-OFDM (DFT-S-OFDM) signal from the second communication device;
wherein at least a portion the second set of subcarriers overlaps with at least a portion of the first set of subcarriers.

19. A wireless communication method for a communication device, the wireless communication method comprising:
receiving information indicating a first set of subcarriers composed of two or more subcarriers from a base station; and
performing a Discrete Fourier Transform to convert a transmission data which is a first time-domain signal into a plurality of frequency-domain signals;
allocating the plurality of frequency-domain signals to a first set of subcarriers, at least a portion of the first set of subcarriers overlapping in frequency at least a portion of a second set of subcarriers allocated to at least one other communication device; and
perform an Inverse Discrete Fourier Transform to convert the plurality of frequency-domain signals allocated into a second time-domain signal, the plurality of frequency-domain signals allocated is signals allocated the first set of subcarriers by the spectrum mapping unit.

20. A wireless communication system comprising:
a reception device;
a first transmission device; and
a second transmission device, wherein
the reception device comprises:
a radio unit configured to transmit a first information indicating a first set of subcarriers composed of two or more continuously subcarriers for assigning to the first transmission device and a second information indicating a second set of subcarriers composed of two or more continuously subcarriers for assigning to a second transmission device; and
one or more reception antennas configured to receive a first Discrete Fourier Transform-spread-OFDM (DFT-S-OFDM) signal from the first transmission device and a second Discrete Fourier Transform-spread-OFDM (DFT-S-OFDM) signal from the second transmission device,
wherein at least a portion of the second set of subcarriers overlaps with at least a portion of the first set of subcarriers,
the first transmission device comprises:
a first reception antenna configured to receive the first information indicating the first set of subcarriers from the reception device, and
the second transmission device comprises:
a second reception antenna configured to receive the second information indicating the second set of subcarriers from the reception device.

* * * * *